(12) United States Patent
Xi et al.

(10) Patent No.: US 12,534,479 B2
(45) Date of Patent: Jan. 27, 2026

(54) TRIAZINE COMPOUND AND COMPOSITION AND USE THEREOF

(71) Applicant: FINDCURE BIOSCIENCES (ZHONGSHAN) CO., LTD., Zhongshan (CN)

(72) Inventors: Ning Xi, Beijing (CN); Shimin Xu, Beijing (CN); Tingjin Wang, Beijing (CN)

(73) Assignee: Findcure Biosciences (Zhongshan) Co., Ltd., Zhongshan (CN)

( * ) Notice: Subject to any disclaimer, the term of this patent is extended or adjusted under 35 U.S.C. 154(b) by 402 days.

(21) Appl. No.: 18/015,381

(22) PCT Filed: Jul. 9, 2021

(86) PCT No.: PCT/CN2021/105385
§ 371 (c)(1),
(2) Date: Jan. 10, 2023

(87) PCT Pub. No.: WO2022/007921
PCT Pub. Date: Jan. 13, 2022

(65) Prior Publication Data
US 2023/0279024 A1    Sep. 7, 2023

(30) Foreign Application Priority Data
Jul. 10, 2020 (CN) .......................... 202010662669.2

(51) Int. Cl.
C07D 519/00 (2006.01)
A61K 45/06 (2006.01)

(52) U.S. Cl.
CPC ............ C07D 519/00 (2013.01); A61K 45/06 (2013.01)

(58) Field of Classification Search
CPC . A61K 45/06; A61P 1/12; A61P 35/00; A61P 3/10; A61P 7/02; A61P 11/08; A61P 17/02; A61P 21/00; A61P 31/12; A61P 35/02; A61P 37/06; A61P 11/00; A61P 11/02; A61P 11/06; A61P 17/00; A61P 17/06; A61P 29/00; A61P 31/14; A61P 31/16; A61P 31/20; A61P 37/08; Y02A 50/30
See application file for complete search history.

(56) References Cited

FOREIGN PATENT DOCUMENTS

| CN | 101365454 A | 2/2009 |
|---|---|---|
| CN | 109348715 A | 2/2019 |
| CN | 110627796 A | 12/2019 |
| CN | 111689991 A | 9/2020 |
| WO | WO2008086014 A2 | 7/2008 |
| WO | WO2009047514 A1 | 4/2009 |
| WO | 20120118632 A1 | 9/2012 |
| WO | 20130180949 A1 | 12/2013 |
| WO | 2014022116 A2 | 2/2014 |
| WO | 2015164161 A1 | 10/2015 |
| WO | WO2018121228 A1 | 7/2018 |
| WO | WO2019067594 A1 | 4/2019 |
| WO | 2019223704 A1 | 11/2019 |
| WO | 2020047184 A1 | 3/2020 |

OTHER PUBLICATIONS

Danziger, Automated site-directed drug design: a general algorithm for knowledge acquisition about hydrogen-bonding regions at protein surfaces, Proc. R. Soc. Lond., 1989, 236, pp. 101-113 (Year: 1989).*
Simone, Oncology: Introduction, Textbook of Medicine, 1997, 14, pp. 1004-1010 (Year: 1997).*
ISR for International Application PCT/CN2021/105385 mailed Oct. 14, 2021 and English Translation.
Written Opinion for International Application PCT/CN2021/105385 mailed Oct. 14, 2021 and English Translation.
Rosa. M. Sudrez et al; Inhibitors of the TAM subfamily of tyrosine kinases: synthesis and biological evaluation; European Journal of Medicinal Chemistry; 61 (2013) 2-25; available online Jun. 12, 2012.
Notice of Reasons for Refusal dated Mar. 12, 2024 for application JP 2023-501631.
Decision to Grant a Patent dated Sep. 3, 2024 for application JP 2023-501631.

* cited by examiner

Primary Examiner — Renee Claytor
Assistant Examiner — Andrew P Lee
(74) Attorney, Agent, or Firm — Ladas & Parry LLP

(57) ABSTRACT

The present invention relates to the field of medicine, and specifically relates to a triazine compounds as represented by formula (I), or a stereoisomer, a tautomer, a nitrogen oxide, a solvate, or a pharmaceutically acceptable salt thereof, a pharmaceutical composition containing the compound, and use of the compound and the pharmaceutical composition thereof in the preparation of drugs for treating and/or preventing proliferative disease, autoimmune diseases, allergic diseases, inflammatory diseases, transplant rejection, cancers, viral infectious diseases, or other diseases in mammals. The compound provided by the present invention exhibits excellent inhibitory activity and kinase selectivity against a target kinase.

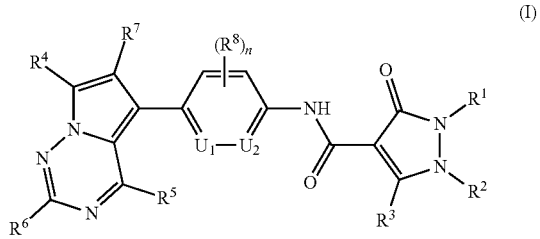

(I)

4 Claims, No Drawings

TRIAZINE COMPOUND AND COMPOSITION AND USE THEREOF

CROSS REFERENCE TO RELATED APPLICATIONS

This application is a U.S. National Stage Application under 35 U.S.C. § 371 of International Application No. PCT/CN2021/105385 which was filed on 9 Jul. 2021, which claims priority from Chinese Application No. 202010662669.2 filed 10 Jul. 2020 the disclosures of which are incorporated in their entirety by reference herein.

FIELD OF THE INVENTION

The present invention relates to the field of medicinal chemistry. Provided herein are a new class of triazine compounds, or pharmaceutically acceptable salts, or pharmaceutical compositions comprising said compounds. These compounds are useful for the treatment of preventing proliferative diseases, autoimmune diseases, allergic diseases, inflammatory diseases, transplant rejection, cancer, viral infectious diseases or other diseases in mammals. Disclosed compounds exhibit excellent inhibitory activity and kinase selectivity. Specifically, disclosed compounds can regulate the activity of AXL kinase, and then regulate the signal transduction inside and outside the cell.

BACKGROUND

Protein kinase family contains a major category of structurally related enzymes that controls intracellular signal transduction and catalyzes the phosphorylation of target protein substrates. Aberrant cellular responses triggered by protein kinase-mediated events are associated with various diseases including benign and malignant hyperplastic diseases, improperly activated immune system diseases, allograft rejection, graft versus host diseases, autoimmune diseases, inflammatory diseases, bone diseases, metabolic diseases, neurological disorders and neurodegenerative diseases, cancer, cardiovascular diseases, allergy and asthma, alzheimer's diseases, and hormone related diseases. Accordingly, protein kinase inhibitors that are effective in the treatment of said diseases have been developed in the medical field.

Kinase is divided into multiple families by its phosphorylated substrates (e.g., protein-tyrosine, protein-serine/threonine, lipids, etc.). Tyrosine phosphorylation is one of the central events regulating various biological processes such as cell proliferation, migration, differentiation and survival. Receptors and nonreceptor tyrosine kinases from more than one family, catalyzing phosphate from ATP to tyrosine groups of specific cellular protein targets. As present, the general corresponding motifs of each of these kinase families have been identified (Hanks et al., FASEB J., 1995, 9, 576-596; Knighton et. al., Science, 1991, 253, 407-414; Garcia-Bustos en al. EMBO J., 1994, 13:2352-2361). Examples of kinases in the protein kinase family include, but are not limited to, Aurora, Axl, abl, Akt, bcr-abl, Blk, Brk, Btk, c-Met, c-src, c-fms, CDK1, CDK2, CDK3, CDK4, CDK5, CDK6, CDK7, CDK8, CDK9, CDK10, cRaf1, CSF1R, CSK, EGFR, ErbB2, ErbB3, ErbB4, Erk, Flt-3, Fak, fes, FGFR1, FGFR2, FGFR3, FGFR4, FGFR5, Fgr, Fyn, AXL, IGF-1R, INS-R, KDR, Lck, Lyn, MEK, Mer, p38, PDGFR, PIK, PKC, PYK2, ros, Tie, Tie-2, TRK, Yes, Tyro3 and Zap70 (Robinson, D. R.; Wu, Y. M.; Lin, S. F. The protein tyrosine kinase family of the human genome. Oncogene 2000, 19, 5548-5557).

Cancer (and other hyperproliferative diseases) is characterized by uncontrolled cell proliferation. The activity of many protein kinases is elevated in human tumors compared with normal tissue, and this increased activity is due to a number of factors, including elevated kinase levels and mutated expression of co-activator or inhibitory proteins.

AXL is a member of TAM (Tyro3, AXL, and MER) family of transmembrane receptor tyrosine kinases. TAM family is characterized by containing two immunoglobulin-like domains, two fibronectin type III (FNIII) domains and the corresponding tyrosine intracellular kinase domains (Linger, R. M. et al., TAM receptor tyrosine kinases: biologic functions, signaling, and potential therapeutic targeting in human cancer. Advances in cancer research 2008, 100, 35-83.). TAM receptor tyrosine kinase-mediated signaling is involved in cell growth, migration, recruitment and apoptosis in a variety of normal cells. Gas6 (growth arrest specific gene 6) and protein S (ProS) are the known ligands for TAM family of receptor. Binding of Gas6 to AXL results in receptor dimerization and AXL autophosphorylation (Stitt, T. N. et al., The anticoagulation factor protein S and its relative, Gas6, are ligands for the Tyro 3/Axl family of receptor tyrosine kinases. Cell 1995, 80 (4), 661-70.). AXL is present in a bariety of organs and cells, including epithelial cells, mesenchymal and hematopoietic cells, and undifferentiated cells.

AXL kinase overexpression or activation has been observed in many human cancers, such as Ovarian cancer, melanoma, renal cell carcinoma, uterine leiomyoma, endometrial cancer, thyroid cancer, gastric cancer, breast cancer, NSCLC, CML, AML, colon cancer, prostate cancer, various lymphomas, and esophageal cancer. Recent studies have shown that AXL overexpression is particularly serious in drug resistant cancer cells that after chemotherapy and receptor tyrosine kinase inhibitor (TKI) treatment, which is one of the important reasons for the drug resistance (Zhang, Z.; Lee, J. C.; Lin, L.; et al Activation of the AXL kinase causes resistance to EGFR-targeted therapy in lung cancer. Nat. Genet. 2012, 44, 852-860). As present, the development of drug resistance is a difficulty in cancer therapy, and the inhibition of AXL can enhance the sensitivity of chemotherapy and delay the development of drug resistance. Therefore, AXL oncogene is an attractive and valuable target for the discovery and development of new therapeutic agents.

Immunotherapy is a method to artificially enhance or inhibit the immune function of the body in order to treat disease. There are many methods of immunotherapy, and it is applicable to the treatment of many diseases. Tumor immunotherapy aims to activate the immune system, which relies on the autoimmunity to kill cancer cells and tumor tissues (Myers et al. Molecular Cancer, 2019, 18:94). Unlike previous surgery, chemotherapy, radiotherapy and targeted therapy, immunotherapy does not target tumor cells and tissues, but the own immune system.

Protein kinase inhibitors have attracted much attention as new immunomodulators, anti-inflammatory agents and anticancer agents. Thus, new or modified protein kinase inhibitors, such as AXL inhibitor, could be used as immunomodulators in organ transplantation, antitumor agents, analgesics, antifibrotic agents, and also could be used to prevent and/or treat autoimmune diseases (e.g. Multiple sclerosis, psoriasis, rheumatoid arthritis, asthma, type 1 diabetes, inflammatory bowel disease, Crohn's disease, polycythemia vera, primary thrombocytosis, myelofibrosis, autoimmune thyropathy, alzheimer's disease), involving excessive activation of inflammation disease (for example, eczema), allergies, chronic obstructive pulmonary disease (copd), bronchitis, (for example, stomach, liver fibrosis, and cancer, lung cancer, colorectal cancer, prostate cancer, acute myeloid leukemia, chronic myelogenous leukemia, acute lymphoblastic leukemia, leukaemia, multiple myeloma), and other treatment caused by immune reaction (for example, skin rashes, contact dermatitis, or diarrhea), chronic and acute pain, or the pain is related to cancer, surgical procedures, fractures, bone pain caused by metastatic tumors, osteoarthritis, silver shoulder arthritis, rheumatoid arthritis, interstitial cystitis, chronic pancreatitis, visceral pain, migraine, chronic low back pain, bladder pain syndrome, or neuropathic pain, etc.

TAM receptor tyrosine kinases Tyro3, Axl and Mer and their ligands Protein S and Gas6 promote the phagocytosis and clearance of apoptotic cells in immune, nervous and reproductive system. They stimultaneously drive a critical negative feedback loop that down-regulates host innate immune responses mediated by Toll-like receptor (TLR) and type I interferon signaling pathways. TAM receptor-ligand interactions have also been implicated in facilitating cellular entry of enveloped viruses: ectopic introduction of one or more TAM receptor into infection-resistant cell lines has been found to enhance filoviral and lentiviral infections. In addition to binding to TAM receptors via a carboxyl-terminal domain, both TAM ligand protein S and Gas6 contain glutamate-rich Gla domains at their amino termini that bind to phosphatidylserine (PtdSer) exposed to apoptotic cells and membrane-coated viral particles (G. Lemke, C. V. Rothlin, Nat Rev Immunol 8, 327 (May, 2008); G. Lemke, T. Burstyn-Cohen, Ann N Y Acad Sci 1209, 23 (October, 2010).).

Enveloped viruses contain high levels of PtdSer on the surfaces and bind to TAM ligand protein S and Gas6 through PtdSer-Gla domain interactions. During enveloped virus infection, the function of TAM receptor-ligand interactions is thought to be limited to facilitating viral binding to target cells and thus viral infection. Membrane-bound TAM ligands are significantly more effective than free ligands in activating TAM receptor signaling, suggesting that TAM ligand binding PtdSer via Gla domain alters the effect of ligand on TAM signaling. AXL kinase inhibitor block the interaction between AXL ligands and PtdSer in membranes. Therefore, new or modified protein kinase inhibitors, such as AXL inhibitor, could be used as therapeutic and/or prophylactic agents for viral infections diseases, such as against Zika virus (iScience, 2019, 13, 339-350), Coronavirus, new coronavirus (such as covid-19 etc.) and hepatitis B virus (HBV) (Journal of Hepatology 2015 vol. 63 j670-678).

The compounds, compositions and methods described in the present invention correspond directly to these needs and other purposes. Specifically, the present invention provides a class of compounds that inhibit, regulate and/or modulate AXL kinase activity for the treatment and/or prevention of proliferative diseases, autoimmune diseases, allergic diseases, inflammatory diseases, pain, fibrosis, graft rejection, or viral infectious diseases or their complications. Compared with the existing similar compounds, compounds of the present invention have better pharmacological activity, specifically, compounds of the present invention show excellent inhibitory activity and kinase selectivity against the target kinase. In addition, compounds of the invention also have excellent permeable membrane properties and show excellent pharmacokinetic properties in animals. Indeed, the compounds of the present invention show good stability in the liver microsomal system, and have little inhibition or induction of CPY450 enzyme. Therefore, compounds of the invention have a good development prospect.

SUMMARY OF THE INVENTION

Detailed Description

Certain embodiments of the invention are described in detail, examples of which are illustrated by the accompanying chemical structure and formulae. The present invention is intended to cover all alternatives, modifications and equivalent technical solutions, which are included within the scope of the present invention. Those skilled in the art must recognize that many methods and materials similar or equivalent to those described herein could be used in the practice of the patent. The present invention is not limited to the methods and materials described herein. In the event that one or more of the incorporated literature, patents, and similar materials differs from or contradicts this application (including, but not limited to, defined terms, term usage, described techniques, etc.), subject to this application.

The terms "Stereoisomers" as used herein refers to compounds which have the same chemical structure, but different arrangement of the atoms or groups. And the stereoisomers include enantiomers, diastereomers, conformers (rotamers), geometric isomers (cis/trans) isomers, atropisomers, etc.

As described, the compounds of the present invention can be optionally substituted by one or more substituents, such as the general formula, or certain embodiments in the patent containing specific examples, subclasses, and classes of compounds.

The term "optionally substituted" and the term "substituted or unsubstituted" are used interchangeably. In general, the term "substituted" refers to the replacement of one or more hydrogen atoms in the chemical structure with specified substituent. Unless indicated otherwise, "optionally" means that optional substituent can be substituted at each substitutable position of the group. And when more than one position can be substituted by one or more particular group, the substituents can be substituted at the same or different position.

The term "optionally . . . substituted" can be used interchangeably with the term "unsubstituted or be substituted by . . . ". The structure of compounds is unsubstituted or substituted with one or more substituents described herein. The substituents include but not limited to H, D, oxo (=O), F, Cl, Br, —OH, —CN, —NO$_2$, —NR$^c$R$^d$, —C(=O)R$^9$, —OC(=O)R$^9$, —C(=O)OR$^{9a}$, —S(=O)$_{0-2}$R$^9$, —OS(=O)$_{1-2}$R$^9$, —S(=O)$_{1-2}$OR$^{9a}$, —N(R$^{10a}$)C(=O)R$^{10}$, —C(=O)NR$^{10a}$R$^{10}$, —OC(=O)NR$^{10a}$R$^{10}$, —N(R$^{10a}$)S(=O)$_{1-2}$R$^{10}$, —S(=O)$_{1-2}$NR$^{10a}$R$^{10}$, —N(R$^{10a}$)C(=O)NR$^{10a}$R$^{10}$, C$_{1-6}$ alkyl, C$_{2-6}$ alkenyl, C$_{2-6}$ alkynyl, C$_{1-6}$ haloalkyl, C$_{1-6}$ hydroxyalkyl, C$_{1-6}$ aminoalkyl, C$_{1-6}$ cyanoalkyl, C$_{1-6}$ alkoxy, C$_{1-6}$ alkylamino, C$_{3-8}$ cycloalkyl, C$_{3-8}$ cycloalkyl C$_{1-6}$ alkyl, C$_{2-7}$ heterocyclyl, C$_{2-7}$ heterocyclyl C$_{1-6}$ alkyl, C$_{6-12}$ aryl, C$_{6-12}$ aryl C$_{1-6}$ alkyl, C$_{1-9}$ heteroaryl, or C$_{1-9}$ heteroaryl C$_{1-6}$ alkyl. Each as mentioned, C$_{3-8}$ cycloalkyl, C$_{3-8}$ cycloalkyl C$_{1-6}$ alkyl, C$_{2-7}$ heterocyclyl, C$_{2-7}$ heterocyclyl C$_{1-6}$ alkyl, C$_{6-12}$ aryl, C$_{6-12}$ aryl C$_{1-6}$ alkyl, C$_{1-9}$ heteroaryl, or C$_{1-9}$ heteroaryl C$_{1-6}$ alkyl is independently substituted by 0, 1, 2, 3, or 4 of substituents which independently include: H, D, oxo (=O), F, Cl, Br, —OH, —NH$_2$, —CN, —NO$_2$, C$_{1-6}$ alkyl and C$_{1-6}$ alkoxy. Wherein, R$^c$, R$^d$, R$^9$, R$^{9a}$, R$^{10}$ and R$^{10a}$ have the meanings as described in the present invention.

In each part of this specification, the substituents of the compounds disclosed in the present invention are according to the type or range of the group. Specifically, the invention includes each individual subgroup of categories and ranges of these substituents. For example, the term "$C_1$-$C_6$ alkyl" specifically refers to independently disclosed methyl, ethyl, $C_3$ alkyl, $C_4$ alkyl, $C_5$ alkyl, and $C_6$ alkyl.

"Alkyl" or "alkyl group" refers to a straight or branched hydrocarbon chain radical consisting of one to twenty carbon atoms. Wherein, the alkyl group can be optionally substituted by one or more substituents described in the present invention. In one exemplification, alkyl contains 1-12 carbon atoms. In another exemplification, alkyl contains 1-6 carbon atoms. In another exemplification, alkyl contains 1-4 carbon atoms. And alkyl contains 1-3 carbon atoms in the other exemplification. And the alkyl group can be optionally substituted by one or more substituents described in the present invention.

Exemplary alkyl groups include, but are not limited to methyl (Me, —$CH_3$), ethyl (Et, —$CH_2CH_3$), propyl (n-Pr, —$CH_2CH_2CH_3$), isopropyl (i-Pr, —$CH(CH_3)_2$), n-butyl (n-Bu, —$CH_2CH_2CH_2CH_3$), i-butyl (i-Bu, —$CH_2CH(CH_3)_2$), s-butyl (s-Bu, —$CH(CH_3)CH_2CH_3$), t-butyl (t-Bu, —$C(CH_3)_3$), n-pentyl (—$CH_2CH_2CH_2CH_2CH_3$), 2-pentyl (—$CH(CH_3)CH_2CH_2CH_3$), 3-pentyl (—$CH(CH_2CH_3)_2$), 2-methyl-2-butyl (—$C(CH_3)_2CH_2CH_3$), 3-methyl-2-butyl (—$CH(CH_3)CH(CH_3)_2$), 3-methyl-1-butyl (—$CH_2CH_2CH(CH_3)_2$), 2-methyl-1-butyl (—$CH_2CH(CH_3)CH_2CH_3$), n-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), 2-methyl-2-pentyl (—$C(CH_3)_2CH_2CH_2CH_3$), 3-methyl-2-pentyl (—$CH(CH_3)CH(CH_3)CH_2CH_3$), 4-methyl-2-pentyl (—$CH(CH_3)CH_2CH(CH_3)_2$), 3-methyl-3-pentyl (—$C(CH_3)(CH_2CH_3)_2$), 2-methyl-3-pentyl (—$CH(CH_2CH_3)CH(CH_3)_2$), 2,3-dimethyl-2-butyl (—$C(CH_3)_2CH(CH_3)_2$), 3,3-dimethyl-2-butyl (—$CH(CH_3)C(CH_3)_3$), n-heptyl, n-octyl, etc.

The term "alkenyl" as used herein refers to an unsaturated straight or branched hydrocarbon containing 2-12 carbon atoms in which there is one site of unsaturation, that is, one carbon-carbon $sp^2$ double bond, consisting of the isomers: "cis" and "trans", or "E" and "Z". In one exemplification, alkenyl contains 2-8 carbon atoms. In another exemplification, alkenyl contains 2-6 carbon atoms. And the alkenyl contains 2-4 carbon atoms in the other exemplification. Exemplary alkenyl groups include, but are not limited to vinyl (—$CH=CH_2$), allyl(—$CH_2CH=CH_2$), etc. And the alkenyl group can be optionally substituted by one or more substituents described in the present invention.

The term "alkynyl" refers to an unsaturated straight or branched hydrocarbon containing 2-12 carbon atoms in which there is one site of unsaturation, that is, one carbon-carbon sp triple bond. In one exemplification, alkynyl contains 2-8 carbon atoms. In another exemplification, alkynyl contains 2-6 carbon atoms. And the alkynyl contains 2-4 carbon atoms in the other exemplification. Exemplary alkynyl groups include, but are not limited to ethynyl (—C≡CH), propargyl (—$CH_2$C≡CH), 1-propynyl (—C≡C—$CH_3$), etc. And the alkynyl group can be optionally substituted by one or more substituents described in the present invention.

The term "alkoxy" refers to alkyl is attached to the rest of the molecule through an oxygen atom, wherein the alkyl group has the definition as described in the present invention. Unless otherwise specified, the alkoxy group contains 1-12 carbon atoms. In some embodiments, the alkyl group has 1 to 6, 1 to 4, or 1 to 3 carbon atoms. And the alkoxy group can be optionally substituted by one or more substituents.

Example alkoxy groups include, but are not limited to, methoxy (MeO, —$OCH_3$), ethoxy (EtO, —$OCH_2CH_3$), 1-propoxy (n-PrO, n-Propoxy, —$OCH_2CH_2CH_3$), 2-propoxy (i-PrO, i-Propoxy, —$OCH(CH_3)_2$), 1-butoxy (n-BuO, n-Butoxy, —$OCH_2CH_2CH_2CH_3$), 2-methyl-1-propoxy (i-BuO, i-Butoxy, —$OCH_2CH(CH_3)_2$), 2-butoxy (s-BuO, s-Butoxy, —$OCH(CH_3)CH_2CH_3$), 2-methyl-2-propoxy (t-BuO, t-Butoxy, —$OC(CH_3)_3$), 1-pentyloxy (n-Pentyloxy, —$OCH_2CH_2CH_2CH_2CH_3$), 2-pentyloxy (—$OCH(CH_3)CH_2CH_2CH_3$), 3-pentyloxy (—$OCH(CH_2CH_3)_2$), 2-methyl-2-butoxy (—$OC(CH_3)_2CH_2CH_3$), 3-methyl-2-butoxy (—$OCH(CH_3)CH(CH_3)_2$), 3-methyl-1-butoxy (—$OCH_2CH_2CH(CH_3)_2$), 2-methyl-1-butoxy (—$OCH_2CH(CH_3)CH_2CH_3$), etc.

The terms "haloalkyl" and "haloalkoxy" refer to an alkyl group of haloalkyl or haloalkoxy having from one or more halogen atoms. The example groups include, but are not limited to, trifluoromethyl (—$CF_3$), trifluoromethoxy (—$OCF_3$), difluoroethyl (—$CH_2CHF_2$, —$CF_2CH_3$, —$CHFCH_2F$), trifluoroethyl (—$CH_2CF_3$, —$CF_2CH_2F$, —$CFHCHF_2$), —$CF(CH_3)_2$, etc.

The terms "hydroxyl-alkyl" or "hydroxy substituted alkyl", and "hydroxyl-alkoxy" or "hydroxy substituted alkoxy" independently indicated alkyl or alkoxy which have been substituted by one or more hydroxy groups. Herein, "hydroxyalkyl" and "hydroxyl-alkyl" are used interchangeably. Some examples include, but are not limited to, hydroxymethyl (—$CH_2OH$), 2-hydroxyethyl (—$CH_2CH_2OH$), 1-hydroxyethyl (—$CH(OH)CH_3$), 2-hydroxypropan-2-yl (—$COH(CH_3)_2$), 2-hydroxy-2-methyl-propyl (—$CH_2COH(CH_3)_2$), 3-hydroxypropyl (—$CH_2CH_2CH_2OH$), 2-hydroxypropyl (—$CH_2CH(OH)CH_3$), 2-hydroxy-2-methylpropyl (—$CH_2CH(OH)(CH_3)CH_3$), hydroxymethoxy (—$OCH_2OH$), etc.

The terms "cyano substituted alkyl" or "cyanoalkyl" refers to straight-chain or branched $C_{1-10}$ alkyl, which are optionally substituted by one or more cyano groups. In some embodiments, the cyanoalkyl refers to $C_{1-6}$ "the basic cyanoalkyl" are substituted by one or more cyano groups. In some embodiments, the cyanoalkyl refers to $C_{1-4}$ "the basic cyanoalkyl" are substituted by one or more cyano groups. Some examples include, but are not limited to, $CNCH_2$—, $CNCH_2CH_2$—, $CNCH_2CH_2CH_2$—, $CNCH_2CHCNCH_2$—, etc.

The term "alkylamino" includes "N-alkylamino" and "N,N-dialkylamino", wherein the amino groups are each independently substituted with one or two alkyl groups. In some embodiments, alkylamino is a basic alkylamino group with one or two $C_{1-6}$ alkyl groups attached to the nitrogen atom. In some other embodiments, the alkylamino group is a $C_{1-3}$ alkylamino group. Suitable alkylamino groups may be mono- or di-alkylamino, examples of which include, but are not limited to, N-methylamino, N-ethylamino, N,N-dimethylamino, N,N-Diethylamino, etc.

The term "aminoalkyl" refers to a straight or branched chain alkyl groups which consisting $C_{1-10}$ carbon atoms and substituted with one or more amino groups. In some embodiments, aminoalkyl has 1-6 carbon atoms and substituted by one or more amino groups. In some other embodiments, aminoalkyl has 1-4 carbon atoms and substituted by one or more amino groups. Example aminoalkyl groups include, but are not limited to, aminomethyl, aminoethyl, aminopropyl, aminobutyl and aminohexyl.

The term "cycloalkyl" refers to a monocyclic, bicyclic, or tricyclic groups that contains 3-12 carbon atoms, and can be saturated or partially unsaturated. Wherein, bicyclic cycloalkyls include spirobicycloalkyl, fused bicycloalkyl and bridged bicycloalkyl. In some embodiments, the cycloalkyl group has 3 to 12, 3 to 10, 3 to 8, 3 to 7, 3 to 6 carbon atoms. In some other embodiments, cycloalkyl groups include groups having from 7 to 12 carbon atoms, which include $C_7$-$C_{12}$ monocycloalkyl, $C_7$-$C_{12}$ bicycloalkyl (such as $C_7$-$C_{12}$ spirobicycloalkyl, $C_7$-$C_{12}$ fused bicycloalkane and $C_7$-$C_{12}$ bridged bicycloalkyl) or $C_7$-$C_{12}$ tricycloalkyl. And the cycloalkyl group can be optionally substituted by one or more substituents described in the present invention. The term "monocyclic cycloalkyl" or "monocycloalkyl" refers to a cycloalkyl group of a monocyclic ring system, its definition is as previously stated. The monocyclic cycloalkyl group can be independently unsubstituted or substituted with one or more substituents. Example cycloalkyl groups include, but are not limited to, cyclopropyl, cyclobutyl, cyclopentyl, 1-cyclopentyl-1-enyl, 1-cyclopentyl-2-enyl, 1-cyclopentyl-3-enyl, cyclohexyl, 1-cyclohexyl-1-enyl, 1-cyclohexyl-2-enyl, 1-cyclohexyl-3-enyl, cyclohexadienyl, cycloheptyl, cyclooctyl, cyclononyl, cyclodecyl, cycloundecyl, cyclododecyl, etc.

The term "cycloalkylalkyl" refers to cycloalkyl substituted alkyl groups. In some embodiments, a cycloalkylalkyl group refers to a "low grade cycloalkylalkyl" group, and it means a cycloalkyl group attached to a $C_{1-6}$ alkyl group. In some other embodiments, a cycloalkyl group refers to "phenylalkylene" which containing $C_{1-3}$ alkyl group. Example cycloalkylalkyl group include, but are not limited to, cyclopropylmethyl, cyclobutylmethyl, cyclopentylmethyl, cyclohexylmethyl, cyclopentylethyl, cyclohexylethyl, etc. The cycloalkyl group of the cycloalkylalkyl group may be further substituted with one or more substituents described herein.

The term "heterocyclyl," or alternatively, "heterocycle," refers to a monocyclic, bicyclic or tricyclic non-aromatic, saturated or unsaturated ring system containing 3 to 12 membered atoms and at least one ring atom selected from N, S, O. In some embodiments, the heterocyclyl group has 4 to 12, 5 to 12, 4 to 8, 3 to 8, 3 to 6, 4 to 7 ring atoms. Unless otherwise stated, the heterocyclyl group can be carbon- or nitrogen-based, and the —$CH_2$— group can optionally be replaced by —C(═O)—. Ring sulfur atoms can be optionally oxidized to S-oxides. Ring nitrogen atoms can be optionally oxidized to N-oxides. Heterocyclyl includes saturated heterocyclyl (heterocycloalkyl) and partially unsaturated heterocyclyl. Herein, heterocyclyl has one or more points of attachment to the rest of the molecule. Example heterocyclyl groups include, but are not limited to, oxiranyl, azetidinyl, oxetanyl, thietanyl, pyrrolidinyl, pyrrolinyl, pyrazolinyl, pyrazolidinyl, imidazolinyl, imidazolidinyl, tetrahydrofuryl, dihydrofuryl, tetrahydrothienyl, dihydrothienyl, 1,3-dioxolyl, dithiocyclopentyl, tetrahydropyranyl, dihydropyranyl, 2H-pyranyl, 4H-pyranyl, tetrahydrothiopyranyl, piperidinyl, morpholinyl, thiomorpholinyl, piperazinyl, dioxanyl, dithianyl, thioxanyl, homopiperazinyl, homopiperidinyl, oxepanyl, thiepanyl, azacycloheptane, oxazepinyl (eg, 1,4-oxazepinyl, 1,2-oxazepinyl), diazepinyl (eg, 1,4-diazepinyl, 1,2-diazepinyl), dioxazinyl (eg, 1,4-dioxazinyl, 1,2-dioxazinyl), thiazepinyl (eg, 1,4-thiazapine Heteroyl, 1,2-thiazepinyl), indolinyl, 1,2,3,4-tetrahydroisoquinolinyl, 1,3-benzodioxolyl, 2-oxa-5-azabicyclo[2.2.1]hept-5-yl, 2-azaspiro[4.4]nonyl, 1,6-dioxaspiro[4.4]nonyl, 2-azaspiro[4.5]decyl, 8-azaspiro[4.5]decyl, 7-azaspiro[4.5]decyl, 3-azaspiro[5.5]undecyl, 2-azaspiro[5.5]undecyl, octahydro-1H-isoindolyl, octahydrocyclopenta[c]pyrrolyl, dihydroindolyl, 1,2,3,4-tetrahydroisoquinolyl, hexahydrofuro[3,2-b]furyl and dodecahydroisoquinolinyl, etc. Examples of —$CH_2$— groups in heterocyclic groups replaced by —C(═O)— include, but are not limited to, 2-oxopyrrolidinyl, oxo-1,3-thiazolidinyl, 2-piperidinone and 3,5-dioxopiperidinyl. Examples of oxidized sulfur atoms in heterocyclic groups include, but are not limited to, sulfolane, 1,1-dioxothiomorpholinyl. Heterocyclyl groups may be optionally substituted with one or more substituents.

In some other embodiments, heterocyclyl groups refers to a monocyclic, or bicyclic non-aromatic, saturated or partial unsaturated ring system containing 4 to 7 membered atoms and at least one ring atom selected from N, S, O. Unless otherwise stated, the heterocyclyl group can be carbon- or nitrogen-based, and the —$CH_2$— group can optionally be replaced by —C(═O)—. Ring sulfur atoms can be optionally oxidized to S-oxides. Ring nitrogen atoms can be optionally oxidized to N-oxides. Heterocyclyl has one or more points of attachment to the rest of the molecule. Example of mono heterocyclyl ring include, but are not limited to, azetidinyl, oxetanyl, thietanyl, pyrrolidinyl, pyrrolinyl, pyrazolinyl, pyrazolidinyl, imidazolinyl, imidazolidinyl, tetrahydrofuranyl, dihydrofuryl, tetrahydrothiophenyl, dihydrothiophenyl, tetrahydropyranyl, dihydropyranyl, 2H-pyranyl, 4H-pyranyl, tetrahydrothiopyranyl, piperidinyl, morpholinyl, thiomorpholinyl, piperazinyl, dioxanyl, dithianyl, thiaxyl, 1,2-oxazinyl, 1,2-thiazinyl, hexahydropyridazinyl, homopiperazinyl, homopiperidinyl, oxycycloheptyl, thiazepane, oxazepinyl (1,4-oxazepinyl, 1,2-oxazepinyl), diazepinyl (1,4-diazepinyl, 1,2-diazepinyl) and thiazepinyl (1,4-thiazepinyl, 1,2-thiazepinyl), etc. Example of bicyclic heterocyclyl ring include, but are not limited to, 3-azabicyclo[3,2,0]heptane, 3-oxobicyclo[3,2,0]heptane, etc. Examples of —$CH_2$— group of heterocyclyl groups which consisting 4 to 7 ring atoms replaced by —C(═O)— include, but are not limited to, 2-oxopyrrolidinyl, oxo-1,3-thiazolidinyl, 2-piperidinonyl and 3,5-dioxopiperidinyl. Examples of oxidized sulfur atoms in heterocyclic groups include, but are not limited to, sulfolane, 1,1-dioxothiophene, 1,1-dioxothiopyran, 1,1-dioxothiomorpholinyl. Herein, 4-7 membered heterocyclyl can be optionally substituted with one or more substituents.

The term "heterocyclylalkyl" refers to heterocyclyl-substituted alkyl, wherein both heterocyclyl and alkyl have been defined above, such examples include, but are not limited to tetrahydrofuranylmethyl, pyrrole-2-yl-methyl, morpholin-4-yl-ethyl, piperazin-4-yl-ethyl, piperidin-4-yl-ethyl, etc.

The term "aryl" refers to a mono, bicyclic, or tricyclic carbocyclic ring systems containing 6-14, 6-12, or 6-10 membered ring atoms, wherein at least one ring is a stable aromatic ring. Each ring system membered 3-7 atoms and has one or more points of attachment to the rest of the molecule. The term "aryl" can be used interchangeably with the term "aromatic ring". Example of aryl groups include, but are not limited to phenyl, naphthyl, and anthracenyl. aryl groups can be optionally substituted with one or more substituents.

The term "arylalkyl" or "aralkyl" refer to aryl-substituted alkyl groups. In some embodiments, "low grade arylalkyl" means that aryl group bonded to a $C_{1-6}$ alkyl group. In some other embodiments, arylalkyl refer to "phenylene" which contains $C_{1-3}$ alkyl group. Specific examples thereof include, but are not limited to, benzyl, diphenylmethyl, phenethyl, etc. Arylalkyl groups can be optionally substituted with one or more substituents.

The term "heteroaryl" refer to 5- to 12-, 5- to 10-, or 5- to 6-membered monocyclic, bicyclic, or tricyclic ring systems, wherein at least one ring is a stable aromatic ring and 1 to 6 ring heteroatoms provided in the aromatic ring. Herein, each ring system contains 5-7 membered atoms and has one or more points of attachment to the rest of the molecule. The term "heteroaryl" can be used interchangeably with the terms "heteroaryl" or "heteroaromatic". In some embodiments, 5 to 12 membered heteroaryl independently contains 1, 2, 3, or 4 heteroatoms selected from O, S, and N; 5 to 10 membered heteroaryl independently contains 1, 2, 3, or 4 heteroatoms selected from O, S, and N; 5 to 6 membered heteroaryl independently contains 1, 2, 3, or 4 heteroatoms selected from O, S, and N. heteroaryl groups can be optionally substituted with one or more substituents.

Examples of heteroaryl group includes, but are not limited to, 2-furyl, 3-furyl, N-imidazolyl, 2-imidazolyl, 4-imidazolyl, 5-imidazolyl, 3-isoxazolyl, 4-isoxazolyl, 5-isoxazolyl, 2-oxazolyl, 4-oxazolyl, 5-oxazolyl, N-pyrrolyl, 2-pyrrolyl, 3-pyrrolyl, 2-pyridyl, 3-pyridyl, 4-pyridyl, 2-pyrimidinyl, 4-pyrimidinyl, 5-pyrimidinyl, pyridazinyl (such as 3-pyridazinyl), 2-thiazolyl, 4-thiazolyl, 5-thiazolyl, tetrazolyl (such as, 5-tetrazolyl), triazolyl (such as, 2-triazolyl, and 5-triazolyl), 2-thienyl, 3-thienyl, pyrazolyl (such as, 2-pyrazolyl), isothiazolyl, 1,2,3-oxadiazolyl, 1,2,5-oxadiazolyl, 1,2,4-oxadiazolyl, 1,2,3-triazolyl, 1,2,3-thiodiazolyl, 1,3,4-thiodiazolyl, 1,2,5-thiadiazolyl, pyrazinyl, 1,3,5-triazinyl; also includes the following bicyclic rings, but are not limited to, benzimidazolyl, benzofuryl, benzothienyl, indolyl (such as, 2-indolyl), purinyl, quinolinyl (such as 2-quinolyl, 3-quinolyl, 4-quinolyl), isoquinolinyl (such as, 1-isoquinolinyl, 3-isoquinolinyl or 4-isoquinolinyl), imidazo[1,2-a]pyridinyl, pyrazolo[1,5-a]pyridyl, pyrazolo[1,5-a]pyrimidinyl, imidazo[1,2-b]pyridazinyl, [1,2,4]triazolo[4,3-b]pyridazinyl, [1,2,4]triazolo[1,5-a]pyrimidinyl, [1,2,4]triazolo[1,5-a]pyridinyl, etc.

"Heteroaryl-alkyl" refers to alkyl substituted by one or more heteroaryl group, wherein alkyl and heteroaryl are as disclosed herein. Examples of heteroaryl-alkyl group includes, but are not limited to, pyridine-2-methyl, imidazol-2-methyl, furan-2-ethyl, indole-3-methyl, etc.

Halogen refers to F, Cl, Br, or I.

In certain embodiments, the pharmaceutically acceptable form is a pharmaceutically acceptable salt, which provided herein include those derived from suitable inorganic and organic acids and bases. Pharmaceutically acceptable salts are well known in the art, such as, as documented in S. M. Berge et al., describe pharmaceutically acceptable salts in detail in J. Pharmaceutical Sciences, 1977, 66: 1-19. Pharmaceutically acceptable non-toxic salts of acid formation include, but are not limited to, salts of an amino group formed with inorganic acids such as hydrochloride, hydrobromide, phosphate, sulfate, perchlorate or with organic acids such as acetate, oxalate, maleate, tartrate, citrate, succinate, malonate. Other Pharmaceutically acceptable salts include adipate, alginate, ascorbate, aspartate, besylate, benzoate, bisulfate, borate, butyrate, camphorate, camphorsulfonate, cyclopentyl propionate, digluconate, lauryl sulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, malonate, methanesulfonate, 2-naphthalenesulfonate, nicotinate, nitrate, oleate, palmitate, pamoate, pectate, persulfate, 3-phenylpropionate, picrate, pivalate, propionate, stearate, thiocyanate, p-toluenesulfonate, undecanoate, valerate, etc. The salts herein obtained with appropriate bases include alkali metal, alkaline earth metal, ammonium and $N^+(C_{1-4}$ alkyl$)_4$ salts. Quaternary ammonium salts of any group which containing N atoms are included in the present invention. Water-soluble, oil-soluble, or dispersed products can be obtained by quaternization. Alkali metal or alkaline earth metal salts include sodium, lithium, potassium, calcium, magnesium, etc. Pharmaceutically acceptable salts further include suitable, non-toxic ammonium, quaternary ammonium salt, amine cations formed by conflicting counterions, such as halides, hydroxides, carboxylates, sulfates, phosphates, nitrates, $C_{1-8}$ sulfonates and aromatic sulfonates.

The term "solvate" refers to pharmaceutically acceptable association formed by one or more solvent molecules and the compound of the present invention. And the solvate include, but are not limited to, water, isopropanol, ethanol, methanol, dimethylsulfoxide, ethyl acetate, acetic acid, and aminoethanol. Where the solvent is water, the solvate is a "hydrate".

Detailed Description of the Compounds

The invention discloses a class of novel compounds which can be used as inhibitors of protein kinase, especially AXL kinase inhibitors. These compounds are utilized to treatment and/or prevention of diseases, disorders, or inappropriate protein kinase activity as protein kinase inhibitors, particularly inappropriate AXL kinase activity. Compared to the existing similar compounds, compounds of the present invention have better pharmacological activity, excellent inhibitory activity and better kinase selectivity to the target kinase. In addition, the compound of the present invention also has excellent membrane-permeable properties, good pharmacokinetic properties in mammals, good stability in the liver microsome. And the compound does not inhibit or induce CPY450 enzyme. Therefore, the compounds of the present invention have very good development prospects.

Disclosed compounds exhibit potent inhibitory activity against one or more protein kinases. In one aspect, provided herein are compounds of Formula (I):

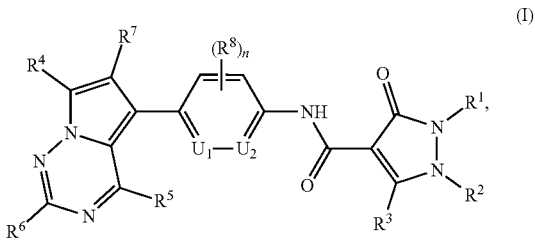

or its stereoisomers, tautomers, nitrogen oxides, solvates, or pharmaceutically acceptable form thereof;
wherein:
each of $U_1$ and $U_2$ is independently N or —$C(R^a)$—;
each of $R^1$ and $R^2$ is independently H, $C_{1-6}$ alkyl, $C_{1-6}$ haloalkyl, $C_{2-6}$ hydroxyalkyl, $C_{2-6}$ aminoalkyl, $C_{1-6}$ cyanoalkyl, $C_{3-10}$ cycloalkyl, $C_{3-10}$ cycloalkyl $C_{1-6}$ alkyl, $C_{2-7}$ heterocyclyl, $C_{2-7}$ heterocyclyl, $C_{1-6}$ alkyl, $C_{6-12}$ aryl, $C_{6-12}$ aryl $C_{1-6}$ alkyl, $C_{1-9}$ heteroaryl, or $C_{1-9}$ heteroaryl $C_{1-6}$ alkyl; wherein each $C_{1-6}$ alkyl, $C_{1-6}$ haloalkyl, $C_{2-6}$ hydroxyalkyl, $C_{2-6}$ aminoalkyl, $C_{1-6}$ cyanoalkyl, $C_{3-10}$ cycloalkyl, $C_{3-10}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, or $C_{1-9}$ heteroaryl $C_{1-6}$ alkyl is optionally substituted with 0, 1, 2, 3, or 4 substituents selected from $R^{11}$;

$R^4$ is H, D, F, Cl, Br, —OH, —CN, —NO$_2$, —NR$^c$R$^d$, $C_{1-6}$ alkyl, $C_{1-6}$ haloalkyl, $C_{1-6}$ hydroxyalkyl, $C_{1-6}$ aminoalkyl, $C_{1-6}$ cyanoalkyl, $C_{1-6}$ alkoxy, $C_{1-6}$ alkylamino, $C_{3-10}$ cycloalkyl, $C_{3-10}$ cycloalkyl $C_{1-6}$ alkyl, $C_{2-10}$ heterocyclyl, $C_{2-10}$ heterocyclyl $C_{1-6}$ alkyl, $C_{6-12}$ aryl, $C_{6-12}$ aryl $C_{1-6}$ alkyl, $C_{1-9}$ heteroaryl, or $C_{1-9}$ heteroaryl $C_{1-6}$ alkyl; wherein —NR$^c$R$^d$, $C_{1-6}$ alkyl, $C_{1-6}$ haloalkyl, $C_{1-6}$ hydroxyalkyl, $C_{1-6}$ aminoalkyl, $C_{1-6}$ cyanoalkyl, $C_{1-6}$ alkoxy, $C_{1-6}$ alkylamino, $C_{3-10}$ cycloalkyl, $C_{3-10}$ cycloalkyl $C_{1-6}$ alkyl, $C_{2-10}$ heterocyclyl, $C_{2-10}$ heterocyclyl $C_{1-6}$ alkyl, $C_{6-12}$ aryl, $C_{6-12}$ aryl $C_{1-6}$ alkyl, $C_{1-9}$ heteroaryl, and $C_{1-9}$ heteroaryl $C_{1-6}$ alkyl is optionally substituted with 0, 1, 2, 3, 4, or 5 substituents selected from $R^{11a}$;

each of $R^a$, $R^3$, $R^5$, $R^6$, $R^7$, and $R^8$ is independently H, D, F, Cl, Br, —OH, —CN, —NO$_2$, —NR$^c$R$^d$, $C_{1-6}$ alkyl, $C_{1-6}$ alkoxy, $C_{1-6}$ haloalkyl, $C_{1-6}$ hydroxyalkyl, $C_{1-6}$ aminoalkyl, $C_{1-6}$ cyanoalkyl, $C_{3-8}$ cycloalkyl, $C_{3-8}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, or $C_{1-9}$ heteroaryl $C_{1-6}$ alkyl; wherein —NR$^c$R$^d$, $C_{1-6}$ alkyl, $C_{1-6}$ alkoxy, $C_{1-6}$ haloalkyl, $C_{1-6}$ hydroxyalkyl, $C_{1-6}$ aminoalkyl, $C_{1-6}$ cyanoalkyl, $C_{3-8}$ cycloalkyl, $C_{3-8}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, and $C_{1-9}$ heteroaryl $C_{1-6}$ alkyl is optionally substituted with 0, 1, 2, 3, or 4 substituents selected from $R^{12}$;

or $R^2$, $R^3$, together with carbon atom and nitrogen atom connected thereto, optionally form a 4-12 membered heterocyclic ring, wherein the 4-12 membered heterocyclic optionally contain 1, 2, or 3 heteroatoms selected from N, O, and/or S and is optionally substituted with 0, 1, 2, 3, 4, or 5 substituents selected from $R^{13}$;

each of $R^{11}$, $R^{11a}$, $R^{12}$, and $R^{13}$ is independently H, D, oxo (=O), F, Cl, Br, —OH, —CN, —NO$_2$, —NR$^c$R$^d$, —C(=O)R$^9$, —OC(=O)R$^9$, —C(=O)OR$^{9a}$, —S(=O)$_{0-2}$R$^9$, —OS(=O)$_{1-2}$R$^9$, —S(=O)$_{1-2}$OR$^{9a}$, —N(R$^{10a}$)C(=O)R$^{10}$, —C(=O)NR$^{10a}$R$^{10}$, —OC(=O)NR$^{10a}$R$^{10}$, —N(R$^{10a}$)S(=O)$_{1-2}$R$^{10}$, —S(=O)$_{1-2}$NR$^{10a}$R$^{10}$, —N(R$^{10a}$)C(=O)NR$^{10a}$R$^{10}$, $C_{1-6}$ alkyl, $C_{2-6}$ alkenyl, $C_{2-6}$ alkynyl, $C_{1-6}$ haloalkyl, $C_{1-6}$ hydroxyalkyl, $C_{1-6}$ aminoalkyl, $C_{1-6}$ cyanoalkyl, $C_{1-6}$ alkoxy, $C_{1-6}$ alkyl amino, $C_{3-8}$ cycloalkyl, $C_{3-3}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, or $C_{1-9}$ heteroaryl $C_{1-6}$ alkyl; wherein —NR$^c$R$^d$, —C(=O)R$^9$, —OC(=O)R$^9$, —C(=O)OR$^{9a}$, —S(=O)$_{0-2}$R$^9$, —OS(=O)$_{1-2}$R$^9$, —S(=O)$_{1-2}$OR$^{9a}$, —N(R$^{10a}$)C(=O)R$^{10}$, —C(=O) NR$^{10a}$R$^{10}$, $C_{1-6}$ alkyl, $C_{2-6}$ alkenyl, $C_{2-6}$ alkynyl, $C_{1-6}$ haloalkyl, $C_{1-6}$ hydroxyalkyl, $C_{1-6}$ aminoalkyl, $C_{1-6}$ cyanoalkyl, $C_{1-6}$ alkoxy, $C_{1-6}$ alkyl amino, $C_{3-8}$ cycloalkyl, $C_{3-8}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, and $C_{1-9}$ heteroaryl $C_{1-6}$ alkyl is optionally substituted with 0, 1, 2, 3, or 4 substituents selected from H, D, oxo (=O), F, Cl, Br, —OH, —NH$_2$, —CN, —NO$_2$, $C_{1-6}$ alkyl, and $C_{1-6}$ alkoxy;

each of R$^c$, R$^d$, R$^9$, R$^{9a}$, R$^{10}$, and R$^{10a}$ is independently H, D, $C_{1-6}$ alkyl, $C_{1-6}$ haloalkyl, $C_{1-6}$ hydroxyalkyl, $C_{3-8}$ cycloalkyl, $C_{3-3}$ cycloalkyl $C_{1-6}$ alkyl, $C_{2-7}$ heterocyclyl, $C_{2-7}$ heterocycle $C_{1-6}$ alkyl, $C_{6-12}$ aryl, $C_{6-12}$ aryl $C_{1-6}$ alkyl, $C_{1-9}$ heteroaryl, or $C_{1-9}$ heteroaryl $C_{1-6}$ alkyl; wherein $C_{1-6}$ alkyl, $C_{1-6}$ haloalkyl, $C_{1-6}$ hydroxyalkyl, $C_{3-8}$ cycloalkyl, $C_{3-8}$ cycloalkyl $C_{1-6}$ alkyl, $C_{2-7}$ heterocyclyl, $C_{2-7}$ heterocycle $C_{1-6}$ alkyl, $C_{6-12}$ aryl, $C_{6-12}$ aryl $C_{1-6}$ alkyl, $C_{1-9}$ heteroaryl, and $C_{1-9}$ heteroaryl $C_{1-6}$ alkyl is optionally substituted with 0, 1, 2, 3, or 4 substituents selected from H, D, oxo (=O), F, Cl, Br, —OH, —NH$_2$, —CN, —NO$_2$, $C_{1-6}$ alkyl, and $C_{1-6}$ alkoxy; and n is 0, 1, or 2.

In some embodiments, the compound is represented by Formula (II) and (IIa):

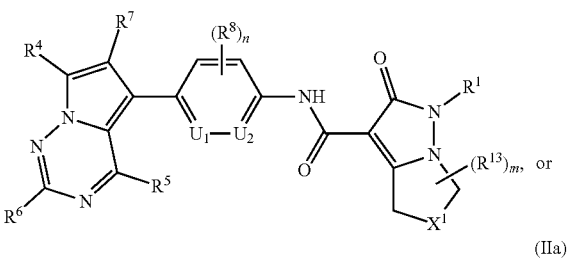

(II)

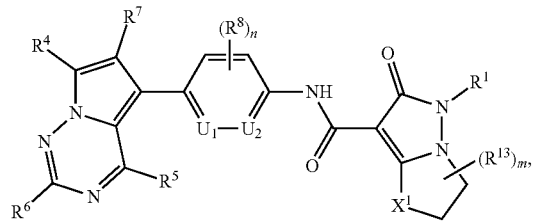

(IIa)

or its stereoisomers, tautomers, nitrogen oxides, solvates, or pharmaceutically acceptable form thereof;

wherein:

$X^1$ is O, S, —N(R$^{13a}$)—, —C(=O)—, —(CH$_2$)$_{t1}$—, —X$^2$—(CH$_2$)$_{t1}$—, or —(CH$_2$)$_1$—X$^2$—(CH$_2$)$_{t2}$—;

$X^2$ is O, S, —N(R$^{13a}$)—, or —C(=O)—;

R$^{13a}$ is each independently H, $C_{1-6}$ alkyl, $C_{3-8}$ cycloalkyl, $C_{3-8}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, $C_{1-9}$ heteroaryl $C_{1-6}$ alkyl, —C(=O)R$^9$, —C(=O)OR$^{9a}$, —S(=O)$_{0-2}$R$^9$, —S(=O)$_{1-2}$OR$^{9a}$, —S(=O)$_{1-2}$NR$^{10a}$R$^{10}$, or —C(=O)NR$^{10a}$R$^{10}$; wherein $C_{1-6}$ alkyl, $C_{3-8}$ cycloalkyl, $C_{3-8}$ cycloalkyl $C_{1-6}$ alkyl, $C_{2-7}$ heterocyclyl, $C_{2-7}$ heterocyclyl $C_{1-6}$ alkyl, $C_{6-12}$ aryl, $C_{6-12}$ aryl $C_{1-6}$ alkyl, $C_{1-9}$ heteroaryl, and $C_{1-9}$ heteroaryl $C_{1-6}$ alkyl is optionally substituted with 0, 1, 2, 3, or 4 substituents selected from H, D, oxo (=O), F, Cl, Br, —OH, —NH$_2$, —CN, —NO$_2$, $C_{1-6}$ alkyl, and $C_{1-6}$ alkoxy;

t1 and t2 is each independently 0, 1, 2, 3, or 4; and m is 0, 1, 2, 4, or 5.

In some embodiments, wherein $R^1$ is $C_{1-4}$ alkyl, $C_{1-4}$ haloalkyl, $C_{2-4}$ hydroxyalkyl, $C_{2-4}$ aminoalkyl, $C_{1-4}$ cyanoalkyl, $C_{3-8}$ cycloalkyl, phenyl, pyridyl, pyridazinyl, pyrazinyl, pyrimidinyl, pyrazolyl, or triazolyl; wherein each $C_{1-4}$ alkyl, $C_{1-4}$ haloalkyl, $C_{2-4}$ hydroxyalkyl, $C_{2-4}$ aminoalkyl, $C_{1-4}$ cyanoalkyl, $C_{3-8}$ cycloalkyl, phenyl, pyridyl, pyridazinyl, pyrazinyl, pyrimidinyl, pyrazolyl, and triazolyl is optionally substituted with 0, 1, 2, 3, or 4 substituents selected from $R^{11}$.

In some embodiments, wherein $R^2$ is H, $C_{1-4}$ alkyl, $C_{1-4}$ haloalkyl, $C_{2-4}$ hydroxyalkyl, $C_{2-4}$ aminoalkyl, or $C_{1-4}$ cyanoalkyl; wherein $C_{1-4}$ alkyl, $C_{1-4}$ haloalkyl, $C_{2-4}$ hydroxyalkyl, $C_{2-4}$ aminoalkyl, and $C_{1-4}$ cyanoalkyl is optionally substituted with 0, 1, 2, 3, or 4 substituents selected from $R^{11}$;

$R^3$ is H, D, F, —CN, $C_{1-4}$ alkyl, $C_{1-4}$ haloalkyl, $C_{1-4}$ hydroxyalkyl, $C_{1-4}$ aminoalkyl, or $C_{1-4}$ cyanoalkyl; wherein $C_{1-4}$ alkyl, $C_{1-4}$ haloalkyl, $C_{1-4}$ hydroxyalkyl, $C_{1-4}$ aminoalkyl, and $C_{1-4}$ cyanoalkyl is optionally substituted with 0, 1, 2, 3, or 4 substituents selected from $R^{12}$;

or $R^2$, $R^3$, together with carbon atom and nitrogen atom connected thereto, optionally form a 4-12 membered heterocyclic ring, wherein the 4-12 membered heterocyclic optionally contain 1, 2, or 3 heteroatoms selected from N, O, and/or S and is optionally substituted with 0, 1, 2, 3, 4, or 5 substituents selected from $R^{13}$.

In some embodiments, wherein $R^4$ is H, D, F, Cl, Br, —OH, —CN, —NO$_2$, —NR$^c$R$^d$, $C_{1-4}$ alkyl, $C_{1-4}$ haloalkyl, $C_{1-4}$ hydroxyalkyl, $C_{1-4}$ aminoalkyl, $C_{1-4}$ cyanoalkyl, $C_{1-4}$ alkoxy, $C_{1-4}$ alkylamino, $C_{3-6}$ cycloalkyl, $C_{3-6}$ cycloalkyl $C_{1-4}$ alkyl, $C_{3-6}$ heterocyclyl, $C_{3-6}$ heterocyclyl $C_{1-4}$ alkyl, $C_{6-10}$ aryl, $C_{6-10}$ aryl $C_{1-4}$ alkyl, $C_{1-9}$ heteroaryl, or $C_{1-9}$ heteroaryl $C_{1-4}$ alkyl; wherein —NR$^c$R$^d$, $C_{1-4}$ alkyl, $C_{1-4}$ haloalkyl, $C_{1-4}$ hydroxyalkyl, $C_{1-4}$ aminoalkyl, $C_{1-4}$ cyanoalkyl, $C_{1-4}$ alkoxy, $C_{1-4}$ alkylamino, $C_{3-6}$ cycloalkyl, $C_{3-6}$ cycloalkyl $C_{1-4}$ alkyl, $C_{3-6}$ heterocyclyl, $C_{3-6}$ heterocyclyl $C_{1-4}$ alkyl, $C_{6-10}$ aryl, $C_{6-10}$ aryl $C_{1-4}$ alkyl, $C_{1-9}$ heteroaryl, and $C_{1-9}$ heteroaryl $C_{1-4}$ alkyl is optionally substituted with 0, 1, 2, 3, 4, or 5 substituents selected from $R^{11a}$.

In some embodiments wherein
$R^4$ is

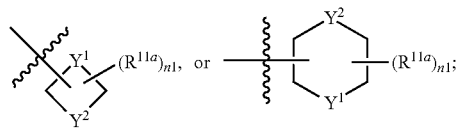

wherein, each of $Y^1$ and $Y^2$ is independently —C($R^{11a}$)$_2$)$_{n2}$—, O, S, —C(=O)—, —C(=O)N($R^{11b}$)—, or —N($R^{11b}$)—;

$R^{11b}$ is each independently H, —C(=O)C$_{1-6}$ alkyl, —C(=O)C$_{1-6}$ haloalkyl, —C(=O)C$_{1-6}$ hydroxyalkyl, —C(=O)C$_{3-6}$ cycloalkyl, —OC(=O)C$_{1-6}$ alkyl, —C(=O)O—C$_{1-4}$ alkyl, —S(=O)$_{1-2}$C$_{1-6}$ alkyl, —S(=O)$_{1-2}$C$_{3-6}$ cycloalkyl, C$_{1-6}$ alkyl, C$_{2-6}$ alkenyl, C$_{2-6}$ alkynyl, C$_{1-6}$ haloalkyl, C$_{1-6}$ hydroxyalkyl, C$_{1-6}$ aminoalkyl, C$_{1-6}$ cyanoalkyl, C$_{3-8}$ cycloalkyl, C$_{3-8}$ cycloalkyl C$_{1-6}$ alkyl, C$_{2-7}$ heterocyclyl, C$_{2-7}$ heterocyclyl C$_{1-6}$ alkyl, C$_{6-10}$ aryl, C$_{6-10}$ aryl C$_{1-6}$ alkyl, C$_{1-9}$ heteroaryl, or C$_{1-9}$ heteroaryl C$_{1-6}$ alkyl; wherein —C(=O)C$_{1-6}$ alkyl, —C(=O)C$_{1-6}$ haloalkyl, —C(=O)C$_{1-6}$ hydroxyalkyl, —C(=O)C$_{3-6}$ cycloalkyl, —OC(=O)C$_{1-6}$ alkyl, —C(=O)O—C$_{1-6}$ alkyl, —S(=O)$_{1-2}$C$_{1-6}$ alkyl, —S(=O)$_{1-2}$C$_{3-6}$ cycloalkyl, C$_{1-6}$ alkyl, C$_{2-6}$ alkenyl, C$_{2-6}$ alkynyl, C$_{1-6}$ haloalkyl, C$_{1-6}$ hydroxyalkyl, C$_{1-6}$ aminoalkyl, C$_{1-6}$ cyanoalkyl, C$_{3-8}$ cycloalkyl, C$_{3-8}$ cycloalkyl C$_{1-6}$ alkyl, C$_{2-7}$ heterocyclyl, C$_{2-7}$ heterocyclyl C$_{1-6}$ alkyl, C$_{6-10}$ aryl, C$_{6-10}$ aryl C$_{1-6}$ alkyl, C$_{1-9}$ heteroaryl, and C$_{1-9}$ heteroaryl C$_{1-6}$ alkyl is optionally substituted with 0, 1, 2, 3, or 4 substituents selected from H, D, oxo (=O), F, Cl, Br, —OH, —NH$_2$, —CN, —NO$_2$, C$_{1-6}$ alkyl and C$_{1-6}$ alkoxy;

n1 is 0, 1, 2, or 3; and n2 is 1, or 2.

In some embodiments, wherein
$R^4$ is

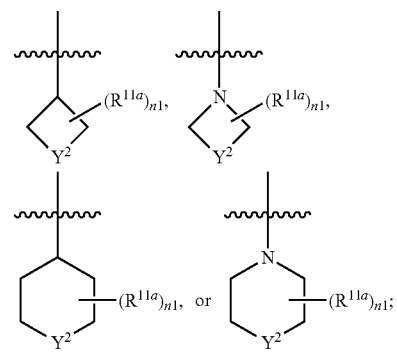

wherein, $Y^2$ is —CH$_2$—, —CH$_2$CH$_2$—, —CH$_2$O—, —CH$_2$CH$_2$O—, —CH$_2$OCH$_2$—, —CH$_2$—N(R$^{11b}$)—, —CH$_2$CH$_2$—N(R$^{11b}$)—, —CH$_2$—N(R$^{11b}$)—CH$_2$—, O, S, —C(=O)—, —C(=O)N(R$^{11b}$)—, or —N(R$^{11b}$)—;

$R^{11b}$ is each independently H, —C(=O)C$_{1-4}$ alkyl, —C(=O)C$_{1-4}$ haloalkyl, —C(=O)C$_{1-4}$ hydroxyalkyl, —C(=O)C$_{3-6}$ cycloalkyl, —OC(=O)C$_{1-4}$ alkyl, —C(=O)O—C$_{1-4}$ alkyl, —S(=O)$_{1-2}$C$_{1-4}$ alkyl, —S(=O)$_{1-2}$C$_{3-6}$ cycloalkyl, C$_{1-4}$ alkyl, C$_{2-4}$ alkenyl, C$_{2-4}$ alkynyl, C$_{1-4}$ haloalkyl, C$_{1-4}$ hydroxyalkyl, C$_{1-4}$ aminoalkyl, C$_{1-4}$ cyanoalkyl, C$_{3-6}$ cycloalkyl, C$_{3-6}$ cycloalkyl C$_{1-4}$ alkyl, C$_{3-6}$ heterocyclyl, C$_{3-6}$ heterocyclyl C$_{1-4}$ alkyl, C$_{6-10}$ aryl, C$_{6-10}$ aryl C$_{1-4}$ alkyl, C$_{1-9}$ heteroaryl, or C$_{1-9}$ heteroaryl C$_{1-6}$ alkyl; wherein —C(=O)C$_{1-4}$ alkyl, —C(=O)C$_{1-4}$ haloalkyl, —C(=O)C$_{1-4}$ hydroxyalkyl, —C(=O)C$_{3-6}$ cycloalkyl, —OC(=O)C$_{1-4}$ alkyl, —C(=O)O—C$_{1-4}$ alkyl, —S(=O)$_{1-2}$C$_{1-4}$ alkyl, —S(=O)$_{1-2}$C$_{3-6}$ cycloalkyl, C$_{1-4}$ alkyl, C$_{2-4}$ alkenyl, C$_{2-4}$ alkynyl, C$_{1-4}$ haloalkyl, C$_{1-4}$ hydroxyalkyl, C$_{1-4}$ aminoalkyl, C$_{1-4}$ cyanoalkyl, C$_{3-6}$ cycloalkyl, C$_{3-6}$ cycloalkyl C$_{1-4}$ alkyl, C$_{3-6}$ heterocyclyl, C$_{3-6}$ heterocyclyl C$_{1-4}$ alkyl, C$_{6-10}$ aryl, C$_{6-10}$ aryl C$_{1-4}$ alkyl, C$_{1-9}$ heteroaryl, or C$_{1-9}$ heteroaryl C$_{1-6}$ alkyl is optionally substituted with 0, 1, 2, 3, or 4 substituents selected from H, D, oxo (=O), F, Cl, Br, —OH, —NH$_2$, —CN, —NO$_2$, C$_{1-6}$ alkyl and C$_{1-6}$ alkoxy; and n1 is 0, 1, 2, or 3.

In some embodiments, wherein R⁴ is

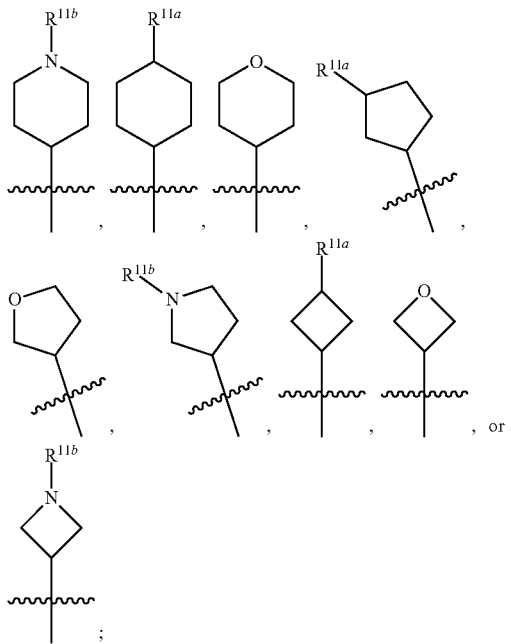

;

wherein, each of $R^{11a}$ and $R^{11b}$ is independently selected from the group consisting of H, D, F, CN, OH, Boc-, CH₃CH₂CH₂C(=O)—, CH₃(CH₃)CHC(=O)—, CH₃O—, CH₃CH₂O—, CH₃(CH₃)CHO—, t-Bu-C(=O)—, n-Bu-C(=O)—, i-Bu-C(=O)—, s-Bu-C(=O)—, CH₃(CH₃)CFC(=O)—, CH₃(CH₃)C(OH)C(=O)—, cyclopropyl-C(=O)—, cyclobutyl-C(=O)—, or cyclopentyl-C(=O)—.

In some embodiments, wherein
$R^{11a}$ is each independently selected from the group consisting of H, D, oxo (=O), F, Cl, Br, —OH, —CN, —NO₂, —NR$^c$R$^d$, —C(=O)C₁₋₄ alkyl, —C(=O)C₁₋₄ haloalkyl, —C(=O)C₁₋₄ hydroxyalkyl, —C(=O)C₃₋₆ cycloalkyl, —OC(=O)C₁₋₄ alkyl, —C(=O)O—C₁₋₄ alkyl, —S(=O)₁₋₂C₁₋₄ alkyl, —S(=O)₁₋₂C₃₋₆ cycloalkyl, C₁₋₄ alkyl, C₂₋₄ alkenyl, C₂₋₄ alkynyl, C₁₋₄ haloalkyl, C₁₋₄ hydroxyalkyl, C₁₋₄ aminoalkyl, C₁₋₄ cyanoalkyl, C₁₋₄ alkoxy, or C₁₋₄ alkylamino; wherein each —NR$^c$R$^d$, —C(=O)C₁₋₄ alkyl, —C(=O)C₁₋₄ haloalkyl, —C(=O)C₁₋₄ hydroxyalkyl, —C(=O)C₃₋₆ cycloalkyl, —OC(=O)C₁₋₄ alkyl, —C(=O)O—C₁₋₄ alkyl, —S(=O)₁₋₂C₁₋₄ alkyl, —S(=O)₁₋₂C₃₋₆ cycloalkyl, C₁₋₄ alkyl, C₂₋₄ alkenyl, C₂₋₄ alkynyl, C₁₋₄ haloalkyl, C₁₋₄ hydroxyalkyl, C₁₋₄ aminoalkyl, C₁₋₄ cyanoalkyl, C₁₋₄ alkoxy, and C₁₋₄ alkylamino is optionally substituted with 0, 1, 2, 3, or 4 substituents selected from H, D, oxo (=O), F, Cl, Br, —OH, —NH₂, —CN, —NO₂, C₁₋₆ alkyl and C₁₋₆ alkoxy.

In some embodiments, wherein
each of $R^a$, $R^3$, $R^5$, $R^6$, $R^7$ and $R^8$ is independently selected from the group consisting of H, D, F, Cl, Br, —OH, —CN, —NO₂, —NH₂, C₁₋₄ alkyl, C₁₋₄ alkoxy, C₁₋₄ haloalkyl, C₁₋₄ hydroxyalkyl, C₁₋₄ aminoalkyl, C₁₋₄ cyanoalkyl, C₃₋₆ cycloalkyl, C₃₋₆ cycloalkyl C₁₋₄ alkyl, C₃₋₆ heterocyclyl, C₃₋₆ heterocyclyl C₁₋₄ alkyl, C₆₋₁₀ aryl, C₆₋₁₀ aryl C₁₋₄ alkyl, C₁₋₉ heteroaryl, or C₁₋₉ heteroaryl C₁₋₄ alkyl; wherein C₁₋₄ alkyl, C₁₋₄ alkoxy, C₁₋₄ haloalkyl, C₁₋₄ hydroxyalkyl, C₁₋₄ aminoalkyl, C₁₋₄ cyanoalkyl, C₃₋₆ cycloalkyl, C₃₋₆ cycloalkyl C₁₋₄ alkyl, C₃₋₆ heterocyclyl, C₃₋₆ heterocyclyl C₁₋₄ alkyl, C₆₋₁₀ aryl, C₆₋₁₀ aryl C₁₋₄ alkyl, C₁₋₉ heteroaryl, and C₁₋₉ heteroaryl C₁₋₄ alkyl is optionally substituted with 0, 1, 2, 3, or 4 substituents selected from $R^{12}$.

In some embodiments, wherein R⁵ is NH₂.

In some embodiments, wherein
each of $R^{11}$, $R^{12}$, and $R^{13}$ is independently selected from the group consisting of H, D, oxo (=O), F, Cl, Br, —OH, —CN, —NO₂, —NR$^c$R$^d$, —C(=O)R⁹, —OC(=O)R⁹, —C(=O)OR$^{9a}$, —S(=O)₀₋₂R⁹, —OS(=O)₁₋₂R⁹, —S(=O)₁₋₂OR$^{9a}$, —N(R$^{10a}$)C(=O)R¹⁰, —C(=O)NR$^{10a}$R¹⁰, —OC(=O)NR$^{10a}$R¹⁰, —N(R$^{10a}$)S(=O)₁₋₂R¹⁰, —S(=O)₁₋₂NR$^{10a}$R¹⁰, —N(R$^{10a}$)C(=O)NR$^{10a}$R¹⁰, C₁₋₄ alkyl, C₂₋₄ alkenyl, C₂₋₄ alkynyl, C₁₋₄ haloalkyl, C₁₋₄ hydroxyalkyl, C₁₋₄ aminoalkyl, C₁₋₄ cyanoalkyl, C₁₋₄ alkoxy, or C₁₋₄ alkylamino, C₃₋₆ cycloalkyl, C₃₋₆ cycloalkyl C₁₋₄ alkyl, C₃₋₆ heterocyclyl, C₃₋₆ heterocyclyl C₁₋₄ alkyl, C₆₋₁₀ aryl, C₆₋₁₀ aryl C₁₋₄ alkyl, C₁₋₉ heteroaryl, or C₁₋₉ heteroaryl C₁₋₄ alkyl; wherein —NR$^c$R$^d$, —C(=O)R⁹, —OC(=O)R⁹, —C(=O)OR$^{9a}$, C₁₋₄ alkyl, C₂₋₄ alkenyl, C₂₋₄ alkynyl, C₁₋₄ haloalkyl, C₁₋₄ hydroxyalkyl, C₁₋₄ aminoalkyl, C₁₋₄ cyanoalkyl, C₁₋₄ alkoxy, or C₁₋₄ alkylamino, C₃₋₆ cycloalkyl, C₃₋₆ cycloalkyl C₁₋₄ alkyl, C₃₋₆ heterocyclyl, C₃₋₆ heterocyclyl C₁₋₄ alkyl, C₆₋₁₀ aryl, C₆₋₁₀ aryl C₁₋₄ alkyl, C₁₋₉ heteroaryl, or C₁₋₉ heteroaryl C₁₋₄ alkyl is optionally substituted with 0, 1, 2, 3, or 4 substituents selected from H, D, oxo (=O), F, Cl, Br, —OH, —NH₂, —CN, —NO₂, C₁₋₆ alkyl and C₁₋₆ alkoxy.

In some embodiments, each of $R^{11}$, $R^{12}$, and $R^{13}$ is independently H, D, oxo (=O), F, Cl, Br, —OH, —CN, —NO₂, methyl, ethyl, propyl, isopropyl, tert-butyl, methoxy, or ethoxy.

In some embodiments, the compound of the present invention is one of the following structures:

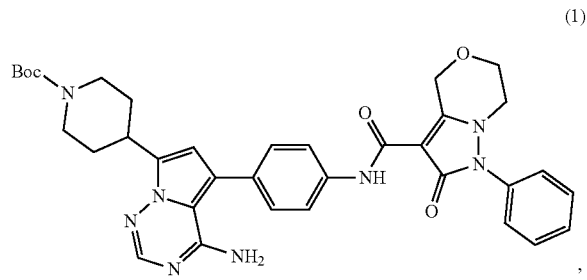

(1)

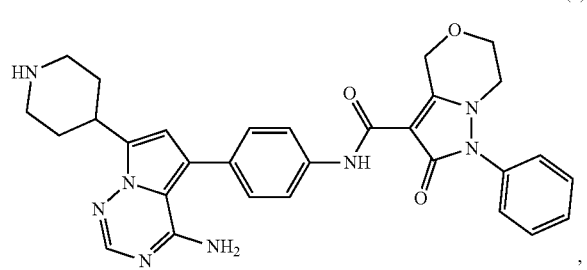

(2)

(3)
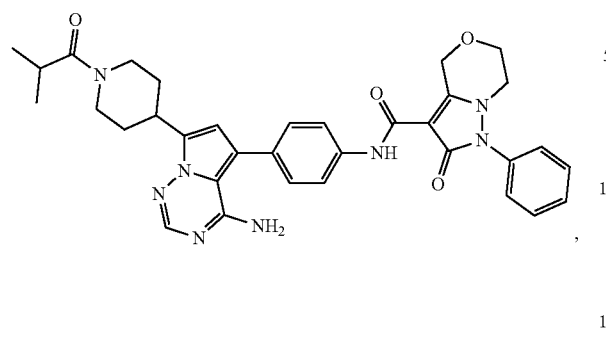
(4)
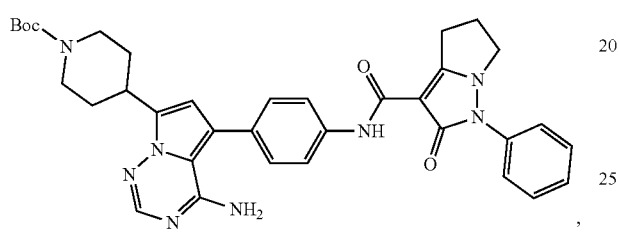
(5)
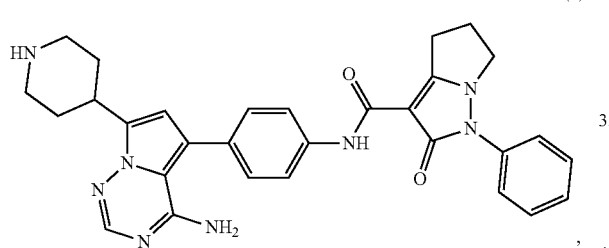
(6)
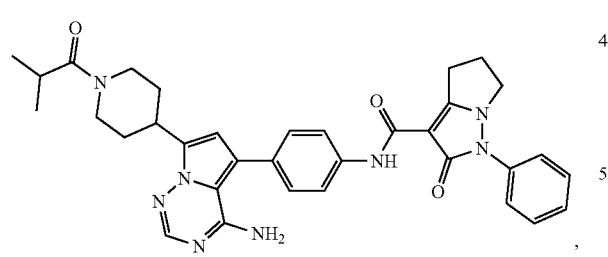
(7)
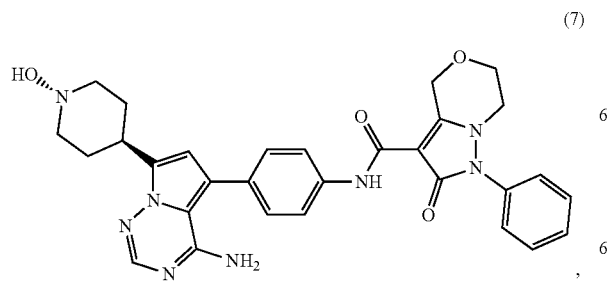
(8)
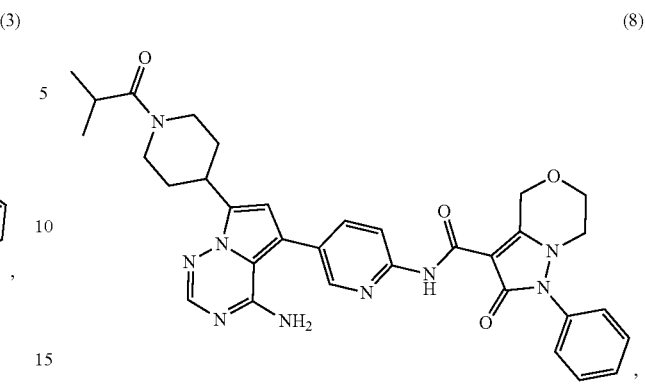
(9)
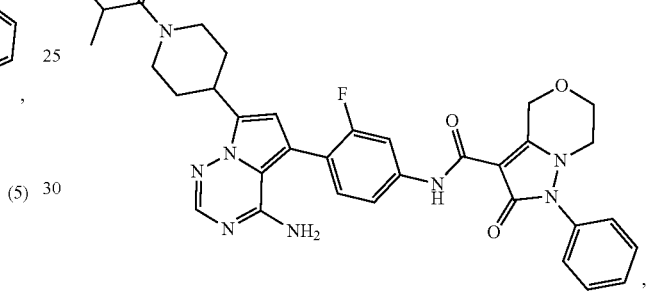
(10)
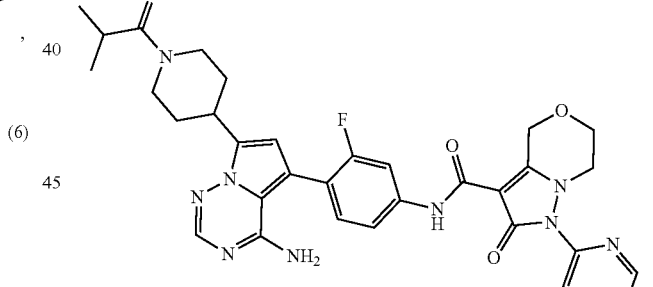
(11)
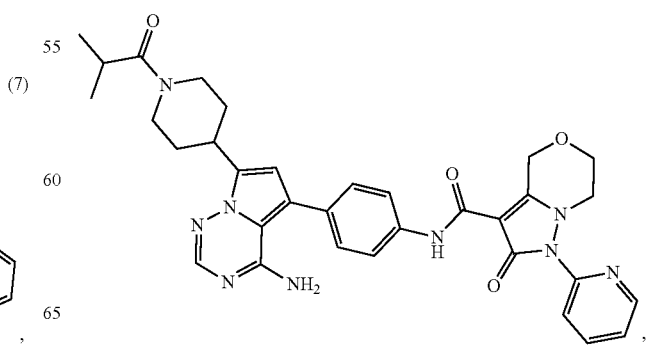

(12)
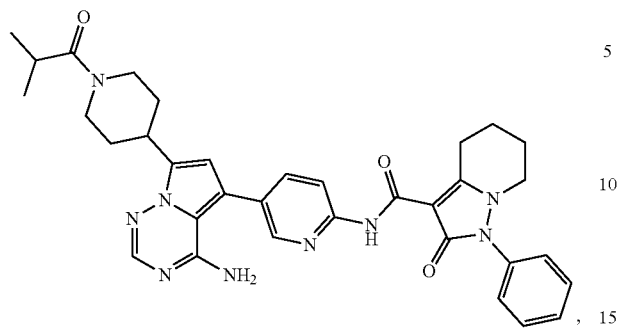
(16)
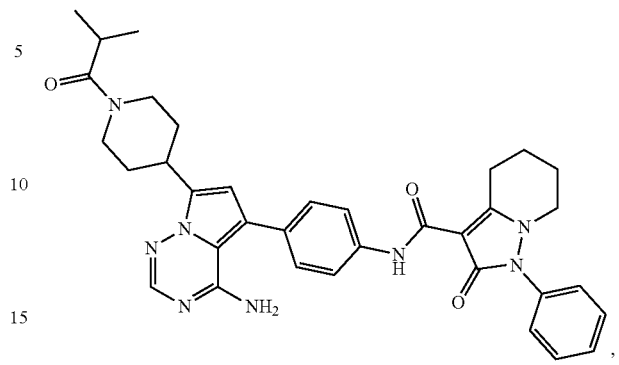
(13)
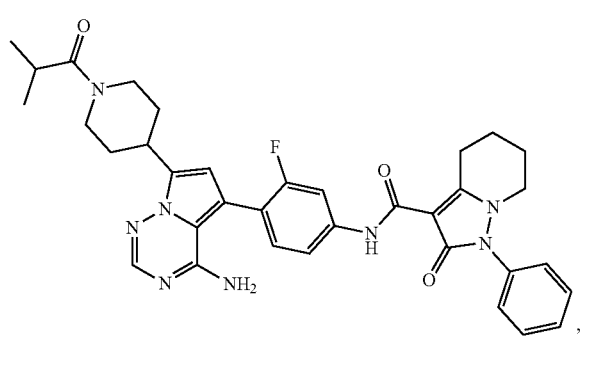
(17)
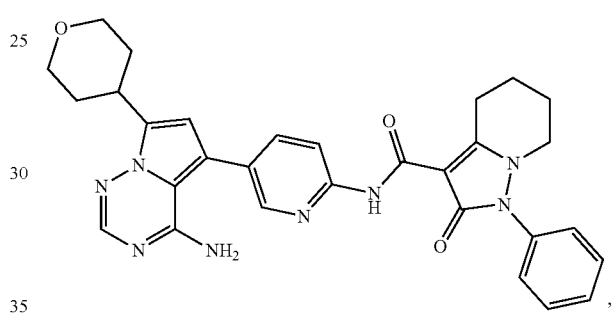
(14)
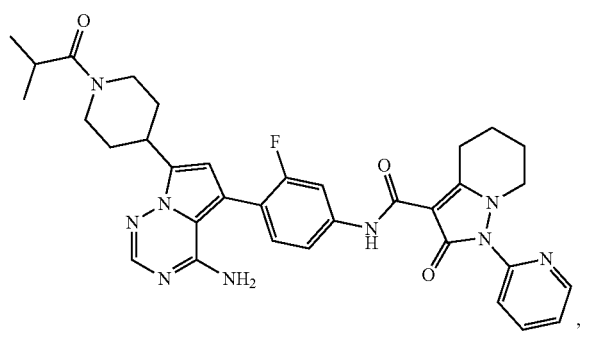
(18)
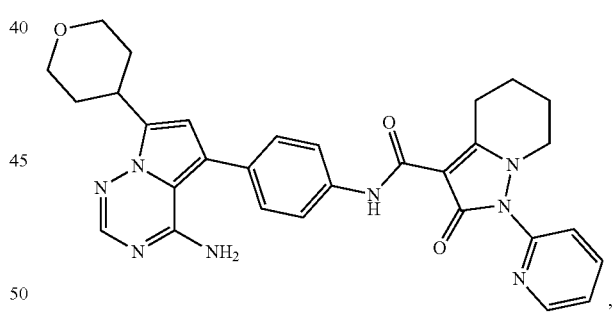
(15)
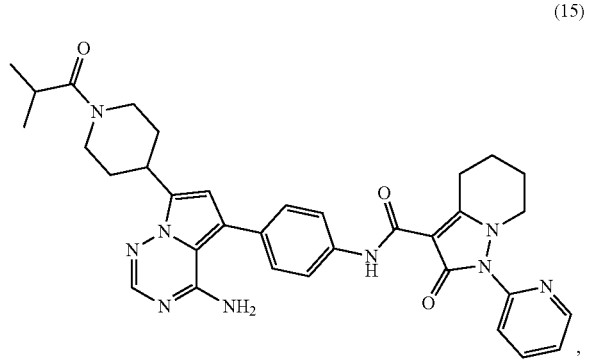
(19)
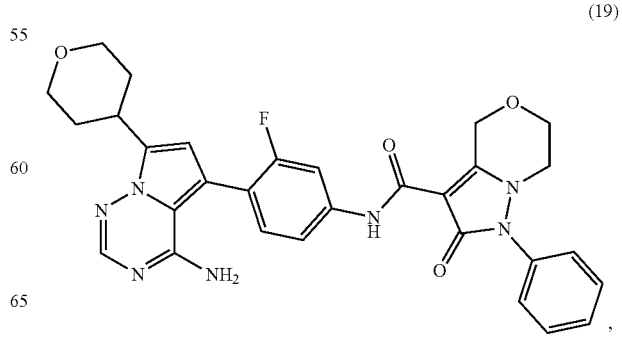

(20)
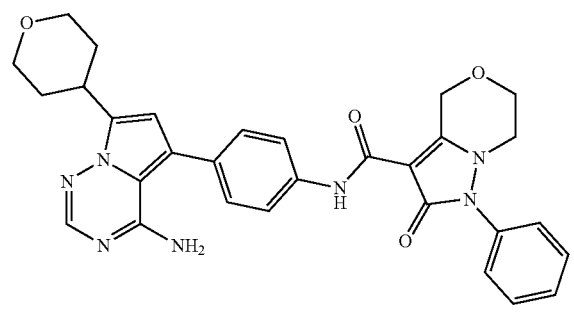
,
(21)
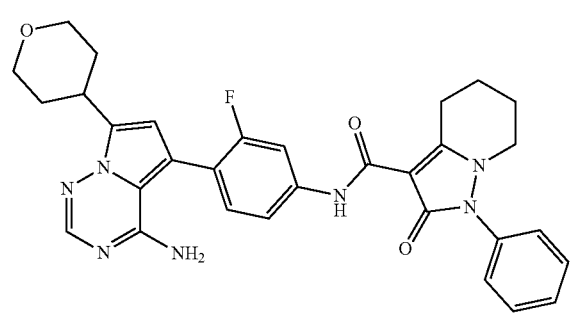
,
(22)
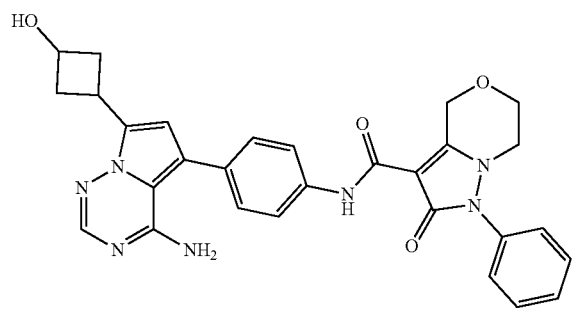
,
(23)
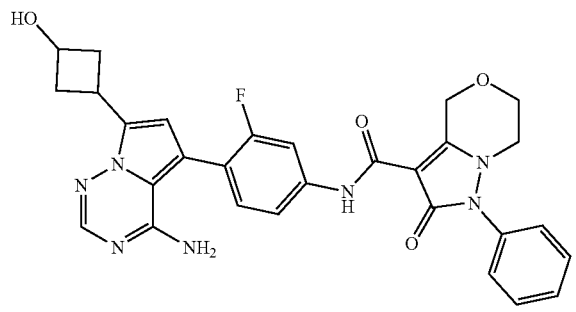
,
(24)
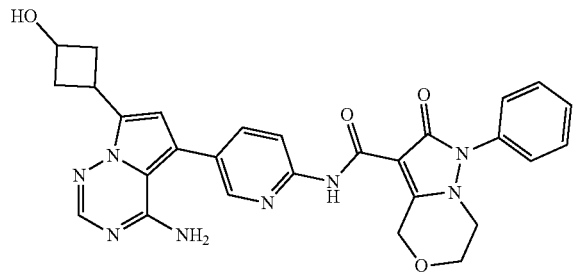
,
(25)
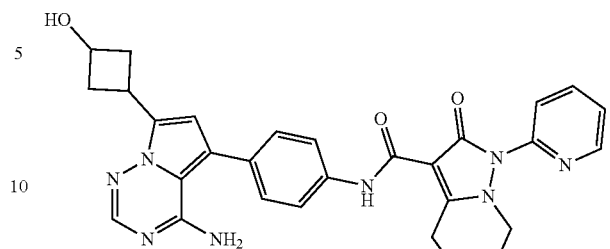
,
(26)
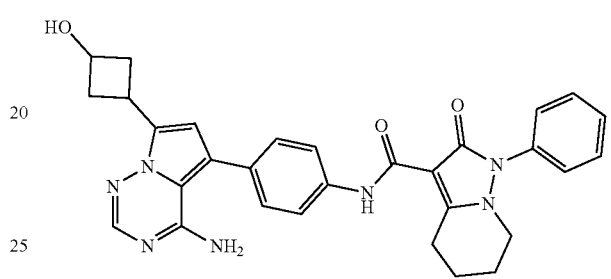
,
(27)
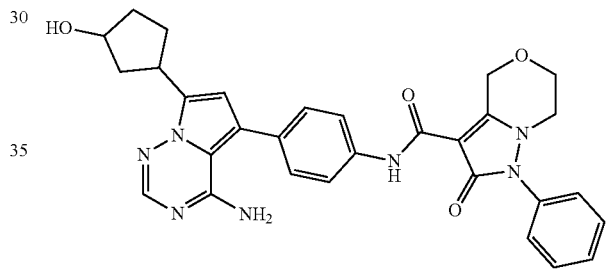
,
(28)
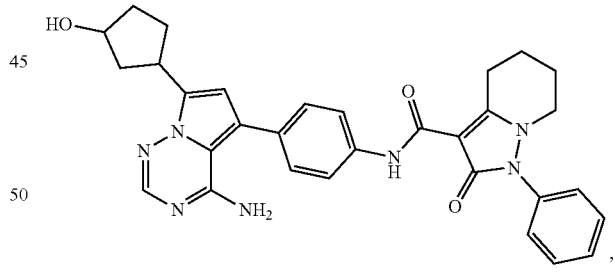
,
(29)
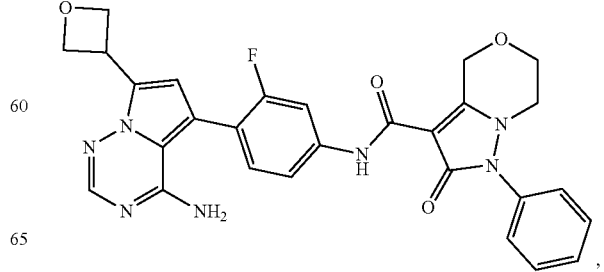
,

(30) 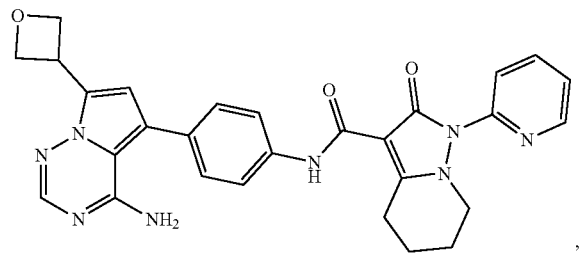
(31) 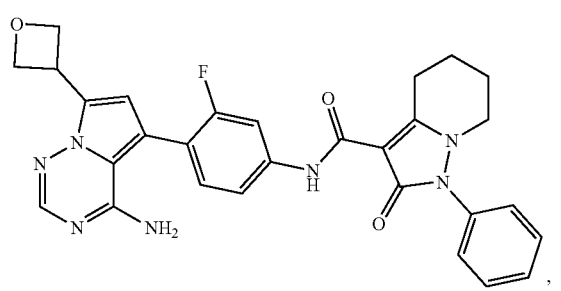
(32) 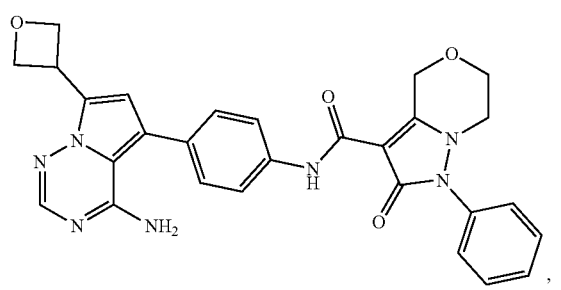
(33) 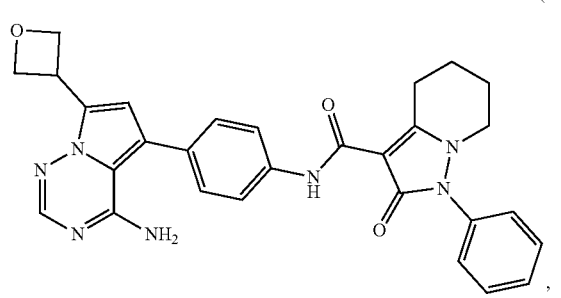
(34) 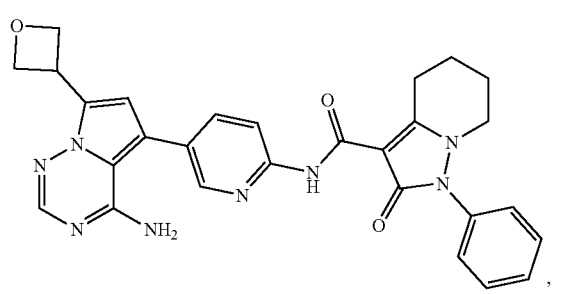
(35) 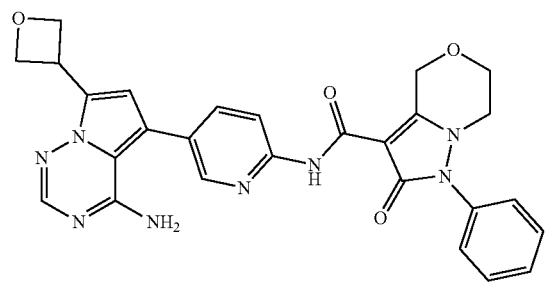
(36) 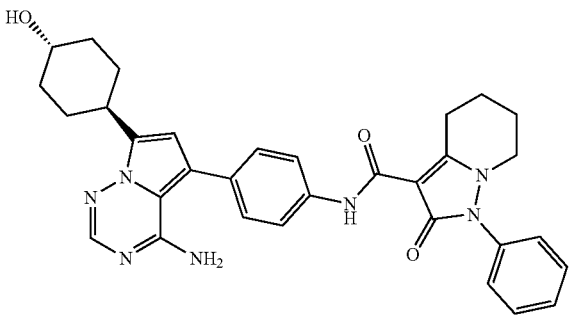
(37) 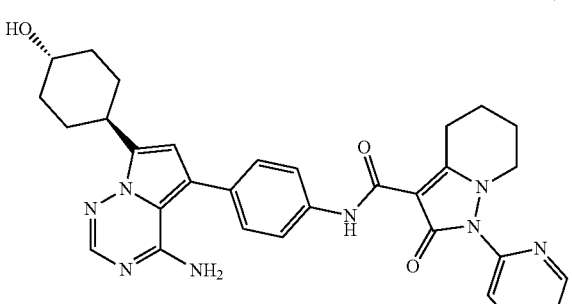
(38) 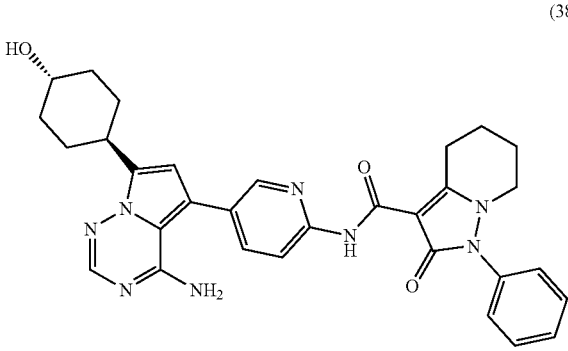
(39) 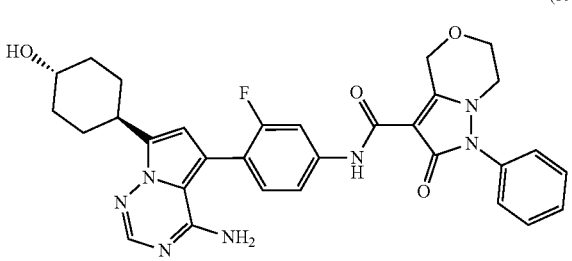

(40)
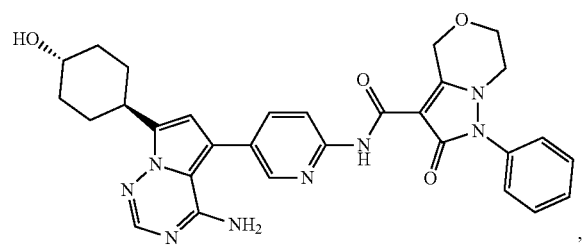
(41)
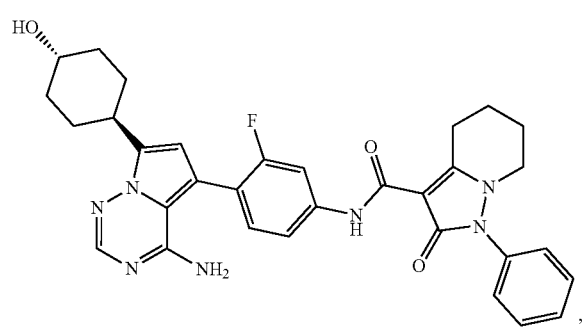
(42)
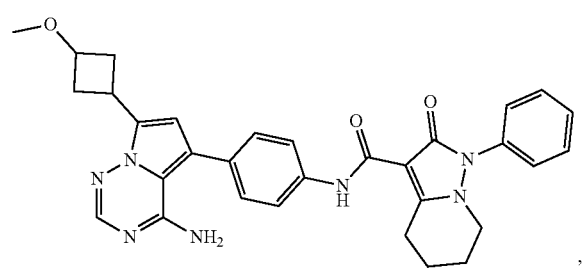
(43)
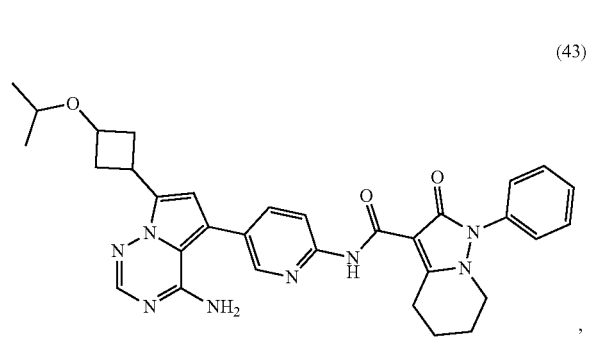
(44)
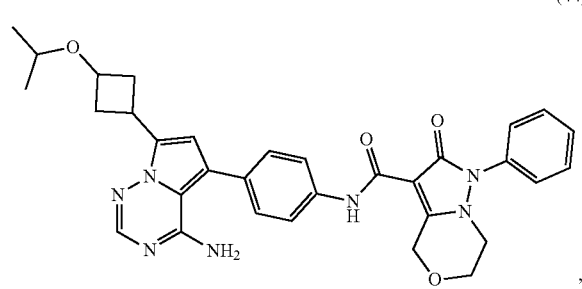
(45)
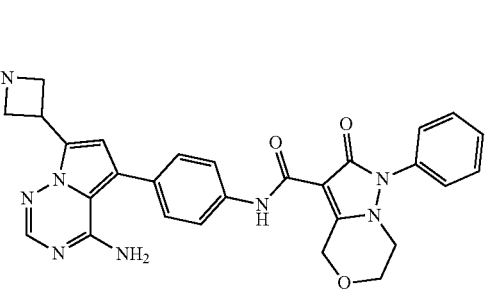
(46)
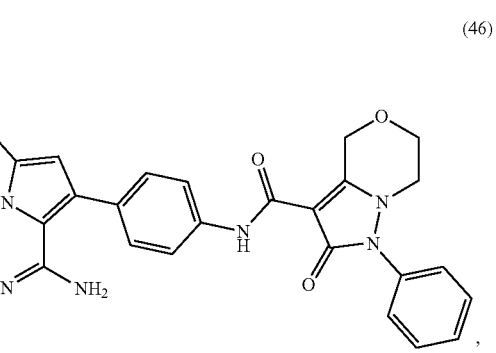
(47)
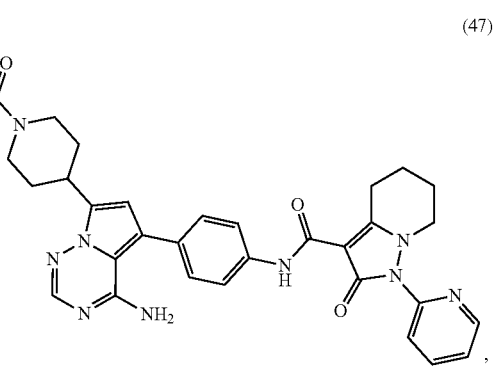
(48)
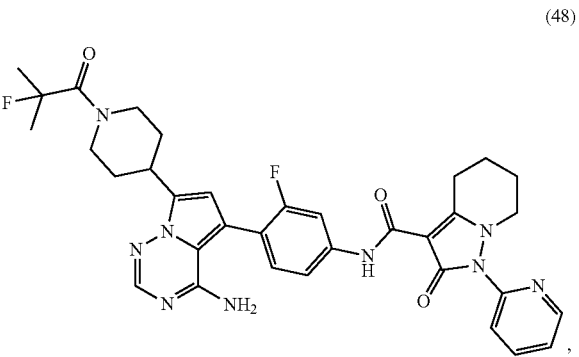

(49) 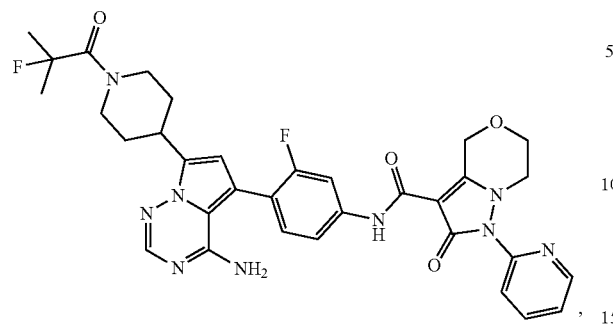
(50) 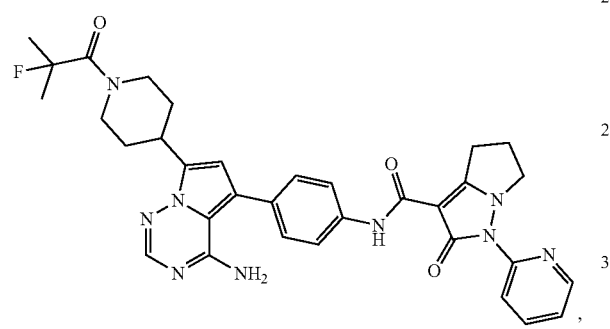
(51) 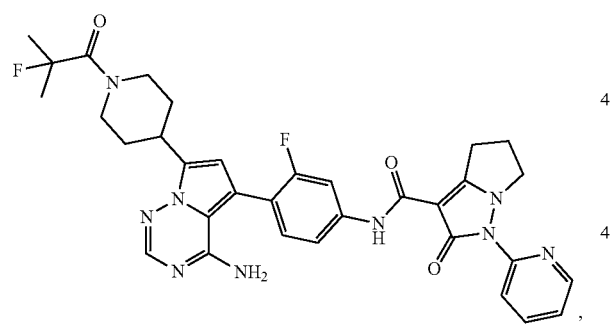
(52) 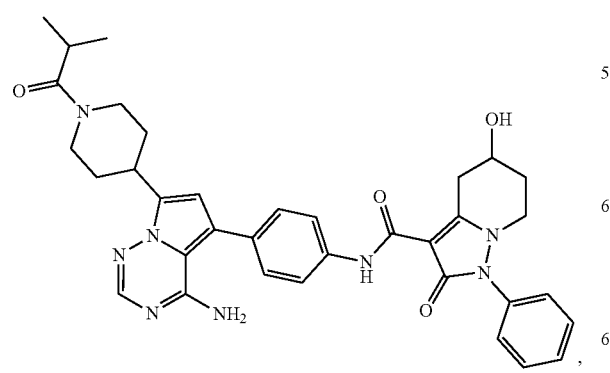
(53) 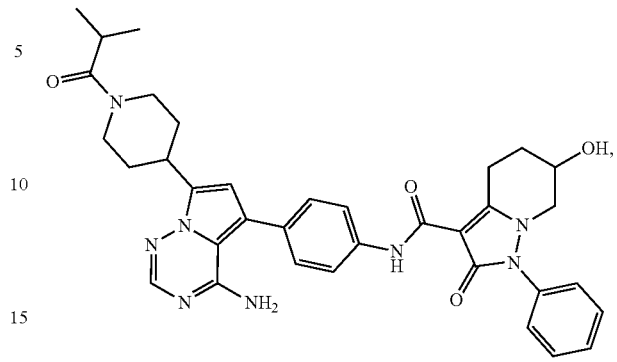
(54) 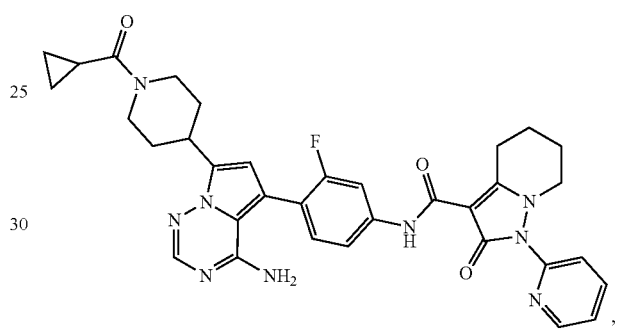
(55) 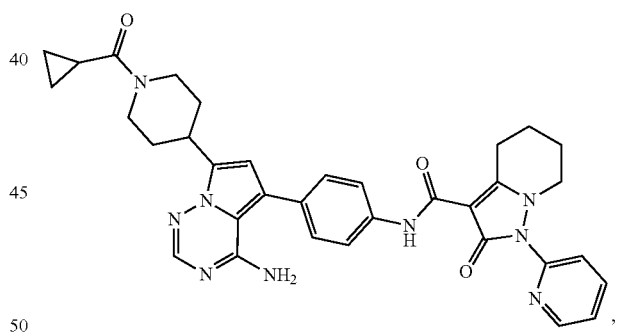
(56) 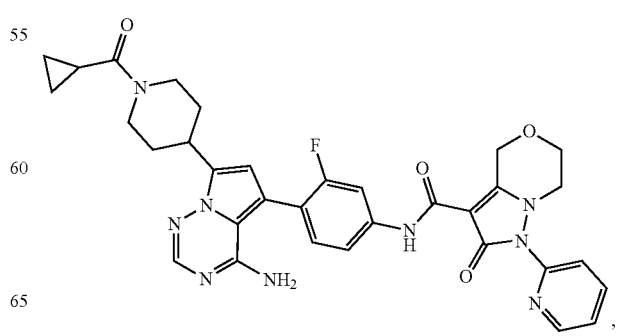

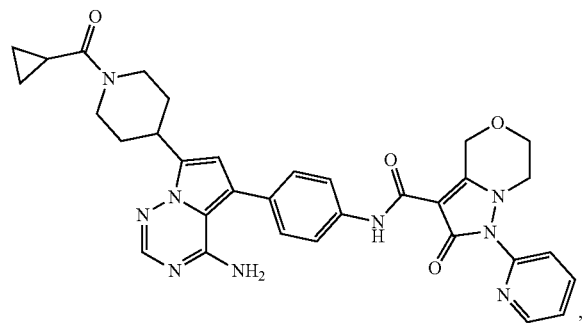
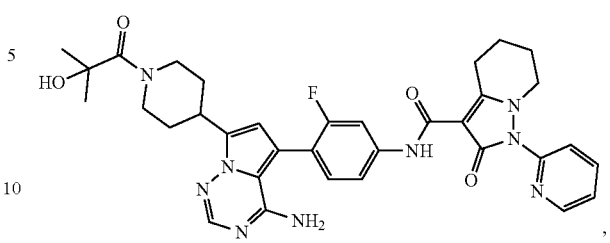
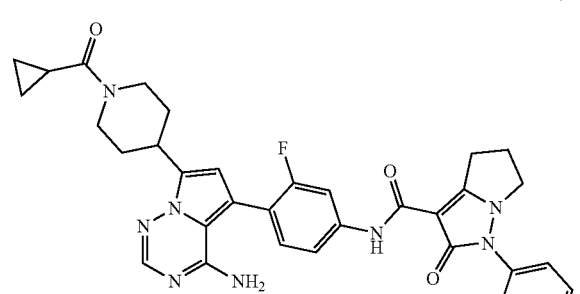
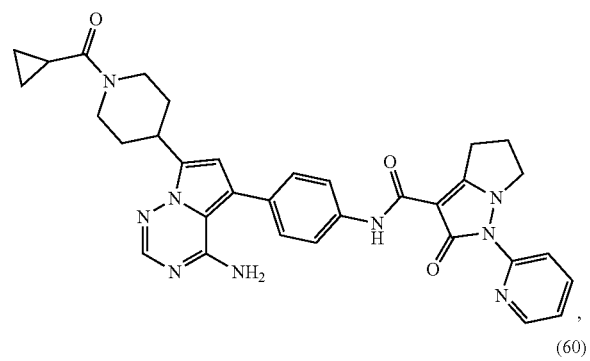
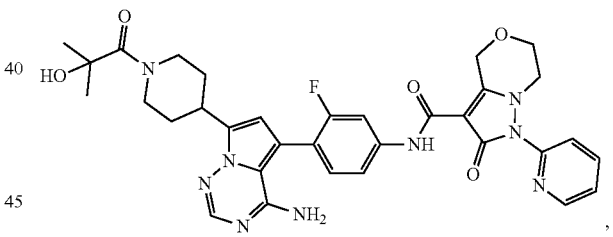
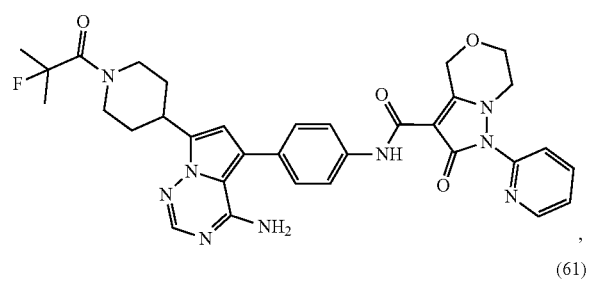
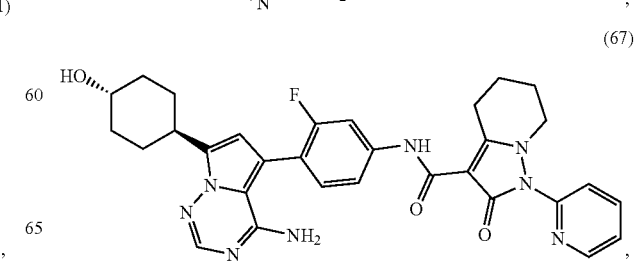

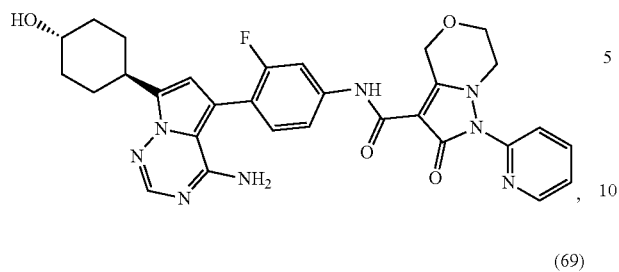
(68)
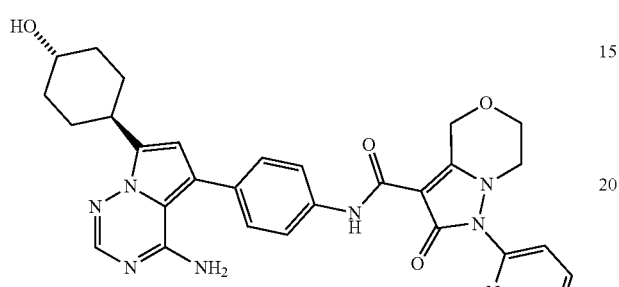
(69)
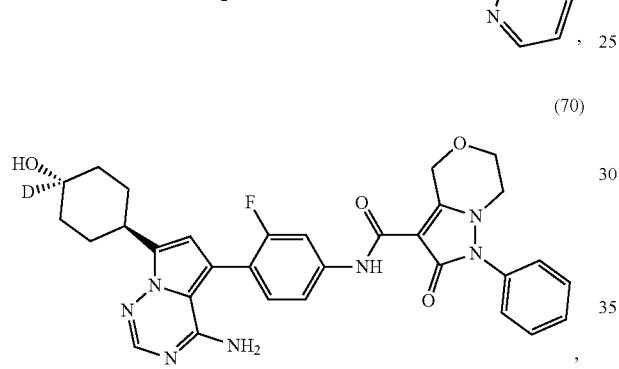
(70)
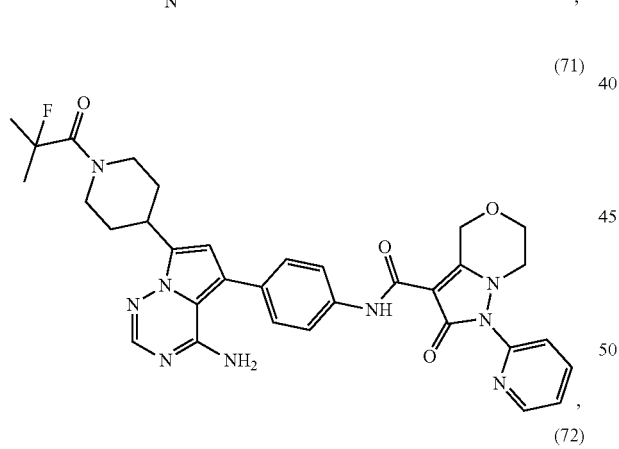
(71)
(72)
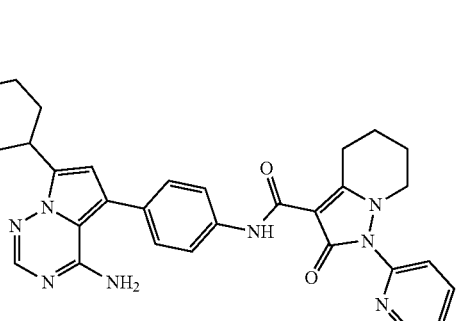
(73)
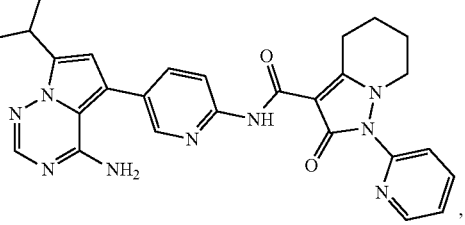
(74)
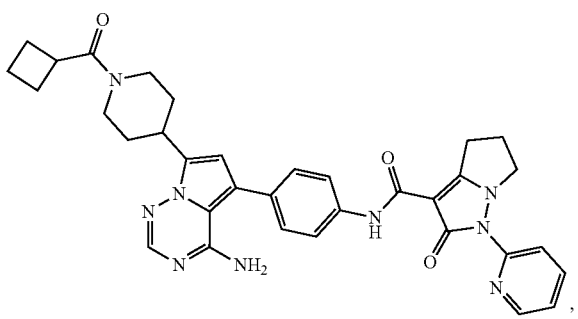
(75)
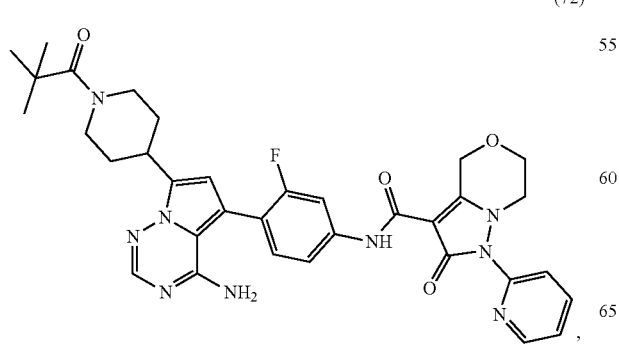
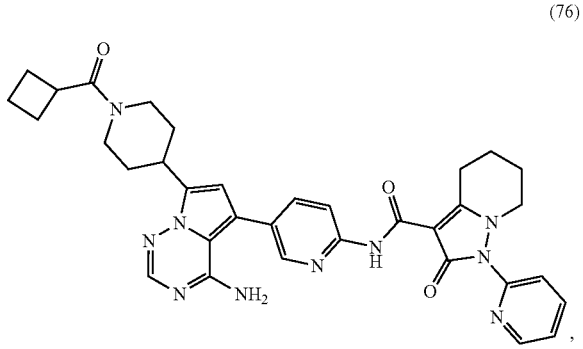
(76)

-continued
(77)
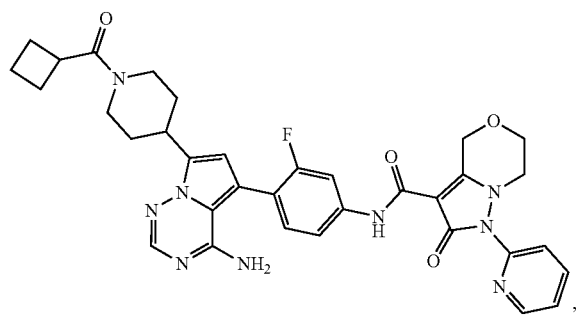
(78)
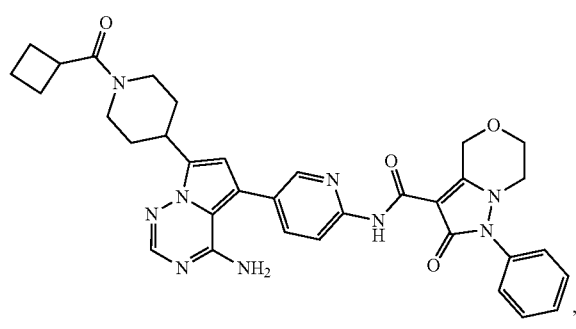
(79)
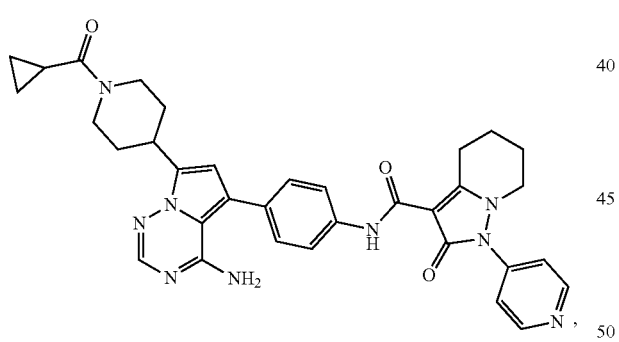
(80)
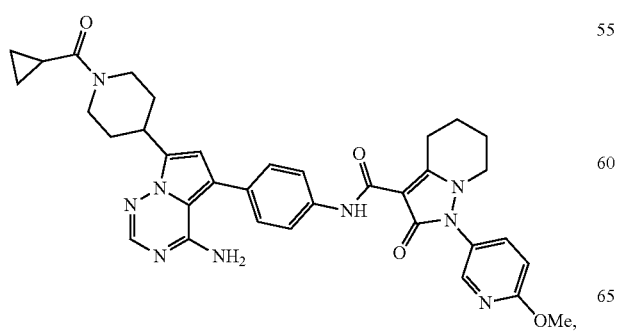
-continued
(81)
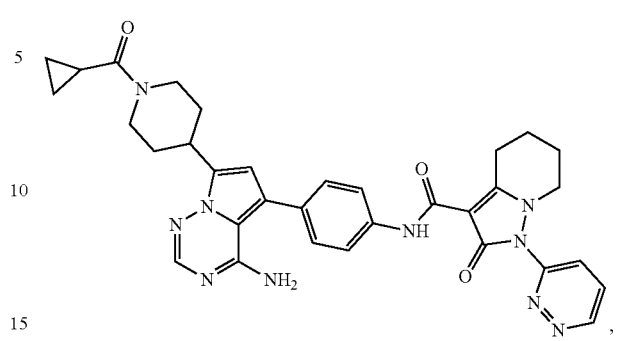
(82)
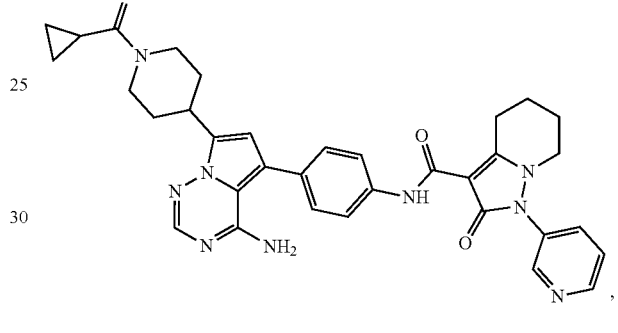
(83)
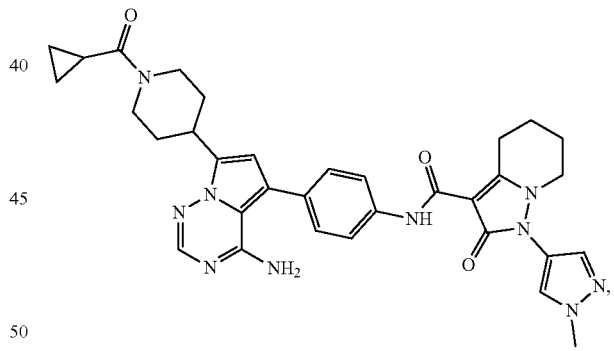
(84)
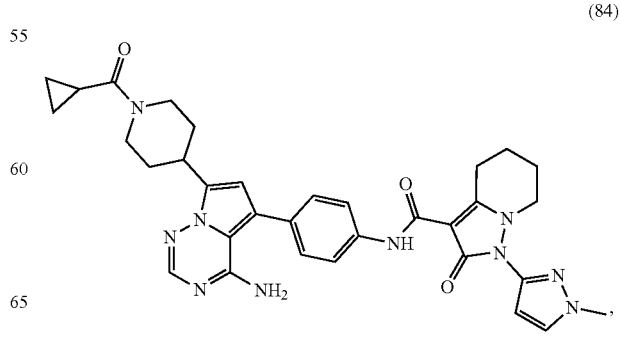

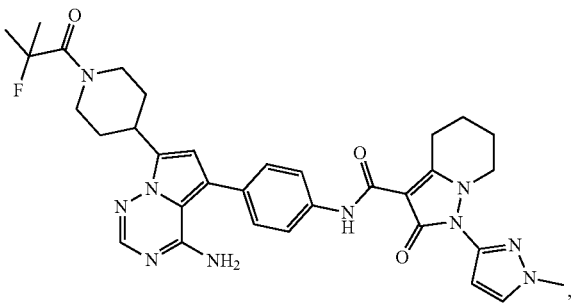

(85)

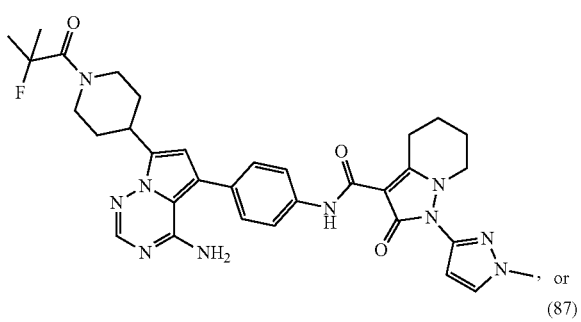

(86)

, or

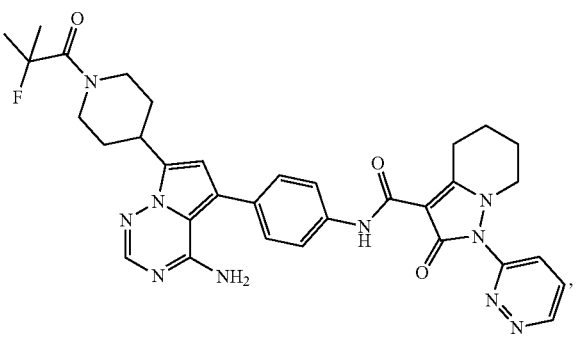

(87)

or its stereoisomers, tautomers, nitrogen oxides, solvates, or pharmaceutically acceptable form thereof.

Unless otherwise indicated, stereoisomers, tautomers, solvates, metabolites or pharmaceutically acceptable salts of the compounds represented by formula (I), (II) or (IIa) are all included in the scope of the present invention.

The compounds of the invention may contain asymmetric or chiral centers, and therefore exist in different stereoisomeric forms. It is intended that all stereoisomer forms of the compounds represented by formula (I), (II) or (IIa), including but not limited to, diastereoisomers, enantiomers, atropisomers, and geometric (or conformational) isomers, as well as mixtures thereof such as racemic mixtures, form part of the present invention.

Herein, when the stereochemistry of any particular chiral atom is not indicated, then all stereoisomers of the chemical structure are contemplated and included in the present invention. When stereochemistry is indicated by a solid wedge or a dashed line which indicating a particular configuration, its stereoisomers are identified and defined.

The compounds represented by formula (I), (II) or (IIa) may exist in the form of salts. In some embodiments, the salt refers to pharmaceutically acceptable salt. The term "pharmaceutically acceptable" means that the substance or composition may be chemically and/or toxicologically compatible with the other ingredients which comprising the formulation and/or with the mammal being treated therewith. In another embodiment, the salt is not necessarily a pharmaceutically acceptable salt, but may be a compound used in the preparation and/or purification of the compound represented by formula (I), (II) or (IIa), and/or some present intermediates used for isolating enantiomers of compounds represented by formula (I), (II) or (IIa).

In another aspect, the present invention relates to intermediates for the preparation of compounds represented by formula (I), (II) or (IIa).

In another aspect, the present invention relates to methods for the preparation, isolation and purification of compounds represented by formula (I), (II) or (IIa).

In another aspect, the present invention provides a pharmaceutical composition comprising a compound of the present invention. In one embodiment, the pharmaceutical composition of the present invention further includes a pharmaceutically acceptable excipient, diluent, carrier, or a combination thereof. In another embodiment, the pharmaceutical composition may be in liquid, solid, semi-solid, gel or spray form.

In some embodiments, the pharmaceutical compositions described herein further comprise additional therapeutic agents.

In another aspect, the present invention relates to the use of the disclosed compound or pharmaceutical composition in the preparation of medicines for preventing and/or treating diseases and/or disorders mediated by AXL protein kinase.

In some embodiments, the disease and/or disorders is selected from proliferative disease, autoimmune disease, allergic disease, inflammatory disease, transplant rejection, or viral infectious disease.

In some embodiments, the disease and/or disorders for treating and/or preventing is selected from the group involving AXL signaling pathways or mediated by AXL protein kinase. Such diseases and/or disorders include proliferative diseases, autoimmune diseases, allergic diseases, inflammatory diseases, transplant rejection, and complications thereof. In particular, the compounds of the present invention can be used to treat and/or prevent the following diseases and/or disorders, including but not limited to, cancer (including solid tumors, and blood cancers), polycythemia vera, essential thrombocythemia, myelofibrosis, myeloid leukemia, acute lymphoblastic leukemia, chronic myeloid leukemia (CML), chronic obstructive pulmonary disease (COPD), asthma, systemic lupus erythematosus, cutaneous lupus erythematosus, lupus nephritis, dermatomyositis, sjogren's syndrome, psoriasis, type I diabetes, respiratory allergies, sinus inflammation, eczema, measles, food allergy, Insect Venom Allergy, Inflammatory Bowel Disease, Crohn's Disease, Rheumatoid Arthritis, Juvenile Arthritis, Psoriatic Arthritis, Organ Transplant Rejection, Tissue Transplant Rejection, Cell Transplant Rejection, Influenza, Coronavirus Infection, COVID-19 infection, dengue virus infection, Zika virus infection, Ebola virus infection, respiratory syncytial virus infection, or HBV.

Pharmaceutical Compositions, Formulations and Administration

The invention provides a pharmaceutical composition, which comprises the compounds disclosed in the present invention, or the compounds listed in the certain embodiments, or their stereoisomers, tautomers, nitrogen oxides, solvates, metabolites or pharmaceutically acceptable salts; and pharmaceutically acceptable excipients, diluents, carriers, vehicles, or combinations thereof. The amount of the compound in the pharmaceutical composition refers to the detectable amount that inhibiting the protein kinase in biological samples or patients.

It will also be appreciated that some of the compounds of the invention may exist in free form for use in therapy or as a pharmaceutically acceptable derivative thereof. Some non-limiting embodiments of pharmaceutically acceptable derivatives include pharmaceutically acceptable salts, esters, salts of these esters or, compounds or metabolites or residues that provide directly or indirectly to patients in need thereof; wherein the residues contain any additional adducts and derivatives.

In literatures, such as Remington: The Science and Practice of Pharmacy, 21st edition, 2005, ed. D. B. Troy, Lippincott Williams & Wilkins, Philadelphia, and Encyclopedia of Pharmaceutical Technology, eds. J. Swarbrick and J. C. Boylan, 1988-1999, Marcel Dekker, New York, disclosed various carriers for formulating pharmaceutically acceptable compositions, and known techniques for their preparation. The contents of each of which are incorporated herein by reference. Except that certain commonly used carrier which may produce any adverse biological effects or interact in a deleterious manner with any other ingredients of the pharmaceutically acceptable compositions or are incompatible with the compounds disclosed herein, its application falls within the scope of the present invention.

The pharmaceutical compositions provided by the present invention can be formulated with other active ingredients that do not impair the intended therapeutic effect, or be formulated with substances that supplement the desired effect.

Application of Compounds and Compositions

Exposed by the present invention provides the methods of the compounds and drug combination for treating, preventing, or improving diseases or conditions mediated or otherwise influenced by one or more protein kinase, such as AXL kinase, or one or more symptoms of diseases or conditions mediated or otherwise influenced by AXL kinase behavior.

In some embodiment, this invention provides a class of compounds disclosed by this invention or a pharmaceutical composition containing the compounds disclosed by this invention, to treat, prevent or ameliorate diseases or conditions mediated or otherwise influenced by inappropriate AXL kinase behavior or one or more symptoms of diseases or conditions mediated or otherwise influenced by inappropriate AXL kinase behavior.

"Inappropriate AXL kinase behavior" refers to AXL kinase behavior that deviates from normal AXL kinase behavior in a particular patient. Inappropriate AXL kinase behavior can be expressed as, for example, abnormal increases in activity, or deviations in timing and control of AXL kinase behavior. This inappropriate kinase behavior results from, for example, inappropriate or uncontrolled behavior caused by overexpression or mutation of a protein kinase. Therefore, this invention provides methods for treating these diseases and symptoms.

Consistent with the above description, such diseases or conditions include, but are not limited to, myeloproliferative disorders such as polycythemia vera (PCV), idiopathic thrombocythemia, and idiopathic myelofibrosis (IMF); Leukemias such as myeloid leukemias include chronic myeloid leukemias (CML), the CML form of imatinib resistance, acute myeloid leukemias (AML) and subtypes of AML, and acute megakaryocytic leukemias (AMKL); Lymphoproliferative diseases such as acute lymphoblastic leukemia (ALL) and myeloma; Cancers include head and neck cancer, prostate cancer, breast cancer, ovarian cancer, melanoma, lung cancer, brain tumor, pancreatic cancer, urothelial cancer, liver cancer, stomach cancer and kidney cancer. And inflammatory diseases or conditions associated with immune dysfunction, immune deficiency or immune regulation, autoimmune diseases, tissues graft rejection, graft-versus-host disease, wound healing, kidney disease, multiple sclerosis, thyroiditis, type 1 diabetes, sarcoidosis, psoriasis, allergic rhinitis, inflammatory bowel diseases including Crohn's disease and ulcerative colitis (UC), systemic lupus erythematosus (SLE), arthritis, osteoarthritis, rheumatoid arthritis, osteoporosis, asthma and chronic obstructive pulmonary disease (COPD), and dry eye syndrome (or dry keratoconjunctivitis (KCS)).

On the one hand, the invention provides a class of compounds disclosed by the invention or pharmaceutical compositions containing the compounds disclosed by the invention for the prevention and/or treatment of proliferative diseases, autoimmune diseases, allergic diseases, inflammatory diseases, or transplant rejection in mammals (including humans).

On the other hand, the invention provides a method for the treatment of mammals suffering from or at risk of suffering from the disease disclosed by the invention, including one or more pharmaceutical compositions or compounds disclosed by the invention for the administration of an effective therapeutic or preventive amount of the diseases.

In particular embodiments, proliferative diseases are selected from cancers such as colon cancer, glioblastoma, endometrial cancer, liver cancer, lung cancer, melanoma, kidney cancer, thyroid cancer, lymphoma, lymphoproliferative disorders, small cell lung cancer, squamous cell lung cancer, glioma, breast cancer, prostate cancer, ovarian cancer, cervical cancer, etc. Hematologic malignancies, such as acute myeloid leukemia (AML), Myelodysplastic syndromes (MDS), myeloproliferative disease (MPD), chronic myeloid leukemia (CML), T-cell acute lymphoblastic leukemia (T-ALL), B-cell acute lymphoblastic leukemia (B-ALL), Non-hodgkin's lymphoma (NHL), B-cell lymphoma; Polycythemiavera, essential thrombocythemia, myelofibrosis, multiple myeloma, etc.

On the other hand, the invention provides a method for the treatment and/or prevention of mammals susceptible to or suffering from autoimmune diseases, including the application of one or more drug compositions or compounds disclosed in the invention of an effective therapeutic dose or an effective prophylactic dose.

In particular embodiments, autoimmune diseases are selected from COPD, asthma, systemic lupus erythematosus, cutaneous lupus erythematosus, lupus nephritis, dermatomyositis, Sjogren syndrome, psoriasis, type 1 diabetes, and inflammatory bowel diseases.

On the other hand, the present invention provides a method for the treatment and/or prevention of mammals susceptible to or suffering from allergic diseases, including the application of one or more pharmaceutical compositions or compounds disclosed in the present invention of an effective therapeutic dose or an effective preventive dose. In particular embodiments, allergic diseases are selected from respiratory allergic diseases, sinusitis, eczema and measles, food allergies and insect venom allergies.

In particular embodiments, allergic diseases are selected from respiratory allergic diseases, sinusitis, eczema and measles, food allergies and insect venom allergies.

On the other hand, the present invention provides a method for the treatment and/or prevention of mammals susceptible to or suffering from inflammatory diseases, including the application of one or more pharmaceutical compositions or compounds disclosed in the present invention of an effective therapeutic dose or an effective preventive dose.

On the other hand, the present invention provides a method for the treatment and/or prevention of mammals susceptible to or suffering from viral infectious diseases, including the application of one or more pharmaceutical compositions or compounds disclosed in the present invention of an effective therapeutic dose or an effective preventive dose.

In particular embodiments, viral infectious diseases are selected from influenza, coronavirus infection, novel coronavirus infection, dengue virus infection, Zika virus infection, Ebola virus infection, respiratory syncytial virus infection, or HBV.

On the other hand, the present invention provides a class of compounds disclosed by the invention for use as medicine, in particular for the treatment and/or prevention of the diseases and/or conditions are described in the present invention. The invention also provides drugs for the treatment and/or prevention of the diseases and/or conditions are described in the invention using compounds disclosed in the invention.

Combination Therapy

The compound can be administered as a single active reagent or in combination with other therapeutic agents, including other compounds having the same or similar therapeutic activity and determined to be safe and effective for such combination administration.

In one aspect, the present invention provides the methods for treating, preventing or ameliorating a disease or condition, including the application of a safe and effective amount of a combined drug comprising a compound of the present invention and one or more therapeutic active agents. In some embodiments, a combination drug contains one or two other therapeutic agents.

Examples of other therapeutic agents included, but are not limited to: anticancer agent, including chemotherapy and anti-proliferation agent; anti-inflammatory agent; and immune regulation or immunosuppression agents.

In another aspect, the present invention provides one product comprising the compound of the present invention and at least one of other therapeutic agent. The product can be prepared to a combination simultaneously, separately or sequentially during treatment. In some embodiments, Therapy is the treatment of diseases or symptoms mediated by the activity of one or more protein kinases, such as AXL kinase or NTRK kinase. The products for combination therapy include those present in the same pharmaceutical composition, and contain disclosed compounds and other therapeutic agents of the invention, or disclosed compounds and other therapeutic agents of the invention that exist in different forms, e.g., medicine kit.

In another aspect, the invention provides a pharmaceutical composition comprising a compound disclosed in the invention and one or more therapeutic agents. In some embodiments, pharmaceutical compositions may contain pharmaceutically acceptable excipients as described above.

In other aspect, the present invention provides a medicine kit containing two or more separate drug compositions, wherein one or more compositions comprises a compound disclosed in the invention. In some embodiments, the kit includes instrument for holding the composition separately, such as a container, separate bottle or separate foil box. Example of kit is blister packing, which is usually used to pack tablets, capsules, etc.

The compound can be applied as a single active component or, for example, as an adjuvant, in combination with other therapeutic agents.

In some embodiments, the other therapeutic agents described include, chemotherapy agents and/or anti-proliferators. Known chemotherapy agents include, but are not limited to, other therapeutics or anticancer drugs that may be used in combination with the compound of the invention, operation, radiotherapy (such as, yradiation, neutron beam radiation therapy, electron beam radiation therapy, proton therapy, brachytherapy, systematic radioisotope therapy), endocrine therapy, taxanes (toxol, taxotere, etc.), platinum derivative (cisplatin, carboplatin), biological response regulator (interferon, interleukin), tumor necrosis factor (TNF, TRAIL receptor target), superheat and cryotherapy, a reagent to mitigate any adverse reactions (such as antiemetic), and other approved chemotherapy drugs, include, but are not limited to, alkylating agent (mechlorethamine, chlorambucil, cyclophosphamide, melphalan, ifosfamide), antimetabolites (methotrexate, pemetrexed, etc.), purine antagonists and pyrimidine antagonists (6-mercaptopurine, 5-fluorouracil, cytarabile, gemcitabine), spindle inhibitor (vinblastine, vincristine, vinorelbine), podophyllotoxin (etoposide, irinotecan, topotecan), antibiotic (doxorubicin, bleomycin, mitomycin), nitrosourea (carmustine, lomustine), Cell division cycle inhibitors (KSP or mitosis driver protein inhibitors, CENP-E and CDK inhibitors), enzyme (asparaginase), hormone (tamoxifen, leuprolide, flutamide, megestrol, dexamethasone, etc.), antiangiogenic reagent (avastin, etc.), monoclonal antibody (belimumab, brentuximab, cetuximab, gemtuzumab, ipilimumab, ofatumumab, panitumumab, ranibizumab, rituximab, tositumomab, trastuzumab), kinase inhibitor (imatinib, sunitinib, sorafenib, erlotinib, gefitinib, dasatinib, nilotinib, lapatinib, crizotinib, ruxolitinib, vemurafenib, vandetanib, pazopanib, etc.). Drugs inhibit or activate cancer pathways such as the mTOR, HIF (hypoxia-inducing factor) pathway, and others.

The compound disclosed in the invention can also be combined with other therapeutic processes to improve the curative effect. For example, hormone therapy or special radiation therapy. The compound disclosed in the present invention is used in particular as a radiosensitizer, especially for treatment of tumors that are not sensitive to radiation therapy.

"Combination" refers to fixed combination in the form of a single dose unit or a kit for the part used for combined administration, wherein the compounds and joint partners disclosed in the present invention may be applied independently at the same time or separately at certain time intervals to make joint partners show cooperation, such as synergy. The terms "co-administration" or "combined administration" as used in the present invention, are intended to include the administration of the selected joint partner to a single individual in need of it (e.g., a patient), and are intended to include treatment regimens in which the substance does not have to be administered by the same route of administration or simultaneously.

Treatment Method

In some embodiments, the treatment method disclosed in the present invention includes the administration of a safe and effective amount of the present compound or a pharmaceutical composition containing the present compound to a patient in need. The embodiments disclosed by the invention include a method for treating the disease or condition of the invention by administering a safe and effective quantity of the disclosed compound of the invention or a pharmaceutical composition containing the disclosed compound of the invention to a patient in need.

In some embodiments, the disclosed compound of the invention or the pharmaceutical composition containing the disclosed compound of the invention may be administered in a single dose, or several times at different time intervals within a specified time period according to the dosing schedule. For example, give medication once, twice, three or four times a day. In one embodiment, the drug was administered once a day. In another embodiment, the drug was administered twice a day. The drug may be administered until the desired therapeutic effect is achieved or maintained indefinitely. An appropriate administration regimen for the disclosed compound of the invention or a pharmaceutical composition containing the disclosed compound of the invention depends on the pharmacokinetic properties of the compound, such as dilution, distribution and half-life, which can be determined by technicians. In addition, an appropriate dosing regimen for the disclosed compound or pharmaceutical composition containing the disclosed compound of the invention, including the duration of the implementation of the regimen, depends on the disease being treated, the severity of the disease being treated, the age and medical condition of the patient being treated, medical history of the patient being treated, the nature of simultaneous therapy, the desired therapeutic effect and factors that are within the scope of the technical person's knowledge and experience. The field technician should also understand that the appropriate dosing regimen may be required to adjust in response to the individual patient's response to the dosing regimen, or as the individual patient's needs change over time.

The compound may be administered at the same time with one or more other therapeutic agents, or before or after. The compound can be administered separately with other therapeutic agents through the same or different routes of administration, or in the form of the same drug composition with them.

General Synthesis Methods

To describe the present invention, certain embodiments are listed below. However, it should be understood that the present invention is not limited to these examples, but only provides a method of practicing the present invention.

Unless other indicated, the compounds provided herein can be prepared from methods described in the present invention, wherein the substituents are defined as shown in formula (I), (II), (IIa). The following reaction schemes and examples serve to further illustrate the present invention.

In the examples described below, unless indicated otherwise, all temperatures are in degrees celsius. Reagents were purchased from commercial suppliers such as Aldrich Chemical Company, Alfa Chemical Company, Shanghai Shaoyuan Co. Ltd., SAIN Chemical Technology (Shanghai) Co., Ltd., Shanghai Baide Pharmaceutical Technology Co., Ltd., Shanghai Haohong Bio. Co. Ltd., unless otherwise, the reagents used in the present invention were used without further purification. Commonly used solvents were purchased from commercial suppliers such as Beijing Haizhiyuan Weiye Technology Co. Ltd.

Anhydrous THF, dioxane, DCM, toluene, and DMF were purchased from commercial suppliers such as Energy chemical company and Aldrich chemical company. EtOAc, PE, $CH_3CN$, NMP and DMSO were all treated with anhydrous $Na_2SO_4$ before use.

The reactions are generally carried out under positive pressure of nitrogen or argon or over anhydrous solvents with a drying tube (unless otherwise indicated), the reaction vials are fitted with suitable rubber stoppers, and the substrate is injected by syringe. Glassware is dried.

The chromatographic column is a silica gel column. Silica gel (300-400 mesh) was purchased from Qingdao Ocean Chemical Factory.

$^1$H NMR and $^{13}$C spectra, or 2D data were obtained using $CDCl_3$, DMSO-$d_6$, $CD_3OD$, or acetone-$d_6$ as a solvent and ppm as unit on a Bruker Avance III 400 MHz frequency spectrometer. TMS (0 ppm) or $CDCl_3$ (7.26 ppm) used as an internal standard. When multiple peaks are present, the following abbreviations can be used: s (singlet), d (doublet), t (triplet), m (multiplet), br (broadened), brs (broadened singlet), dd (doublet of doublets), dt (doublet of triplets). The coupling constant J is given in hertz.

LC/MS was performed using a Agilent 1260 (binary pump/DAD detector) on Agilent 6120/6125.

Method 1:

Chromatographic column: HALO C18 2.7 µm, 4.6 mm×30 mm, mobile phase: MeCN (0.05% HCOOH)-Water (0.05% HCOOH); gradient: from 5% to 95% MeCN, eluting 0.8 min, holding 0.8 min, the total running time is 2.0 min; flow rate: 1.8 mL/min; column temperature: 45° C.;

Method 2:

Chromatographic column: HALO C18 2.7 µm, 4.6 mm×50 mm, mobile phase: MeCN (0.025% HCOOH)—Water (0.025% HCOOH); gradient: from 5% to 95% MeCN, eluting 1.0 min, holding 1.0 min, the total running time is 2.5 min; flow rate: 1.8 mL/min; column temperature: 45° C.

Purity Test Using RP-HPCL:

The purity of compounds of the present invention was detected with RP-HPLC

Method 1:

Chromatographic column: Gemini 4.6×150 mm 5 um, mobile phase: $H_2O$ (0.05% trifluoroacetic acid)-MeCN (0.05% trifluoroacetic acid); gradient: from 10% to 100% MeCN, eluting 8.0 min, holding 2.0 min. flow rate: 1.2 mL/min; column temperature: 35° C./40° C.

Method 2:

Chromatographic column: XBRIDGE 2.1×50 mm, 3.5 um, mobile phase: $H_2O$ (0.05% trifluoroacetic acid)-MeCN (0.05% trifluoroacetic acid); gradient: from 10% to 100% MeCN, eluting 7.0 min, holding 1.0 min. flow rate: 0.8 mL/min; column temperature: 35° C./40° C.

The Method of SFC Purification:

SFC purification was performed on a Thar P80 equipped with UV detector.

Method: Chromatographic column, CHIRALPAK AD-H 250 mm, 20 mm, 5 µm, modifier: 30% EtOH (0.2% $NH_4OH$).

The Method of RP-HPLC Purification:

RP-HPLC purification was performed on Gilson purification system (322 or 306 pump and GX-281 fraction collector), Shimadzu LC20Ap and Waters MS trigger purification system;

Method 1:

Chromatographic column, Gemini C18 21×150 mm, 5 µm; Xbrige C18 19×150 mm, 5 µm; Spolar C18 20×150 mm and Ultimate AQ-C18 30×250 mm, 10 µm.

Mobile Phase:

1. MeCN in water (0.1% HCOOH), flow rate: 20 ml/min, 50 ml/min, column 30×250 mm, 10 µm; wavelength: 210-400 nm. Samples were injected into DMSO (optionally added formic acid and water), then eluted with a linear gradient from 10% to 95% MeCN over 10 min.
2. MeCN in water (0.1% trifluoroacetic acid), flow rate: 20 ml/min, 50 ml/min, column 30×250 mm, 10 µm; wavelength: 210-400 nm. Samples were injected into DMSO (optionally added formic acid and water), then eluted with a linear gradient from 10% to 95% MeCN over 10 min.

3. MeCN in water (0.1% $NH_3$—$H_2O$/10 mM $NH_4AC$), flow rate: 20 ml/min, 50 ml/min, column 30×250 mm, 10 μm; wavelength: 210-400 nm. Samples were injected into DMSO (optionally added formic acid and water), then eluted with a linear gradient from 10% to 95% MeCN over 10 min.

The typical synthetic methods for preparing the compounds disclosed in the present invention are shown in the following synthetic schemes 1-2. Unless otherwise stated, each of $R^1$, $R^2$, $R^3$, $R^4$, $R^1$, $R^6$, $R^7$, $R^8$, $U_1$, $U_2$ and n has the definition as described in the present invention; $PG^1$ and $PG^2$ are protecting groups.

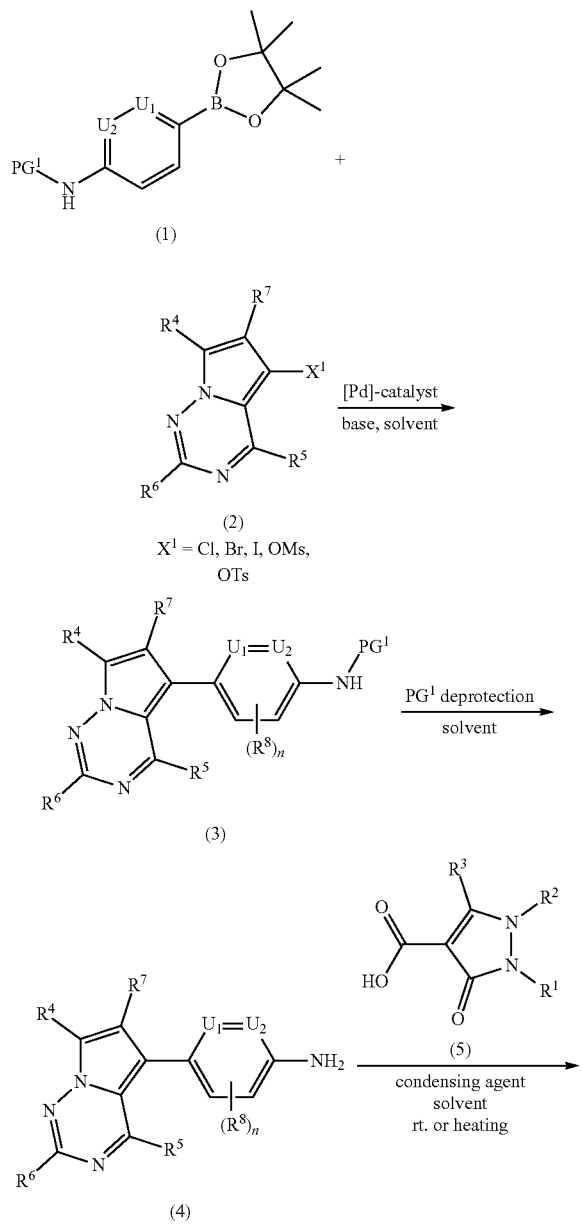

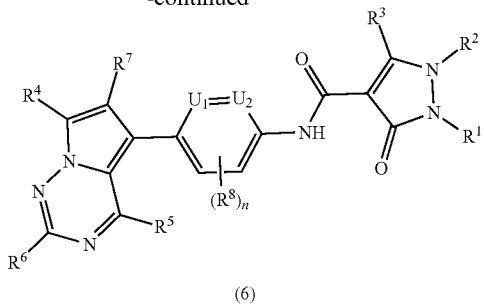

The compound of the present invention having the structure shown in formula (6) can be prepared by the general synthesis method described in Synthetic Scheme 1, and the specific synthetic steps can be referred to the examples. In Synthetic Scheme 1, under alkaline conditions, boron ester derivatives (1) and pyrrolotriazine derivatives (2) undergoes a Pd-catalyzed coupling reaction to obtain compound (3) which using a suitable base (such as cesium carbonate, potassium carbonate, sodium carbonate, etc.) and a suitable Pd catalyst (such as $Pd(OAc)_2$, $Pd(dppf)_2Cl_2$ or $Pd_2(dba)_3$, etc.). The $PG^1$ group was then deprotected to give the aromatic amine derivatives (4). Carboxylic acid derivatives (5) were condensed with aromatic amine (4) to obtain title kinase inhibitor (6).

Carboxylic acid derivatives (5) can be obtained by synthetic methods described in the literature, such as, "Practical synthesis of bicyclic pyrazol-5-one derivatives", "Xuejin Feng, Michael A. Xi, Yanjun Wu, Xiaogang Wang, Ning Xi Tetrahedron Lett. 2017, 58, 46-49"; "Facile synthesis of bicyclic1-arylpyrazol-5-ones. Wu, Y.; Wang, K.; Li, Z.; Bai, X.; Xi, N. Tetrahedron Lett. 2014, 55, 142-147."

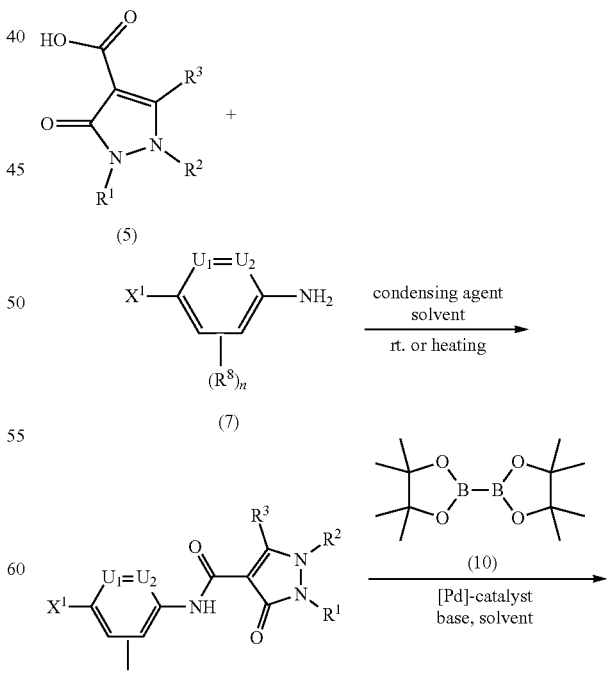

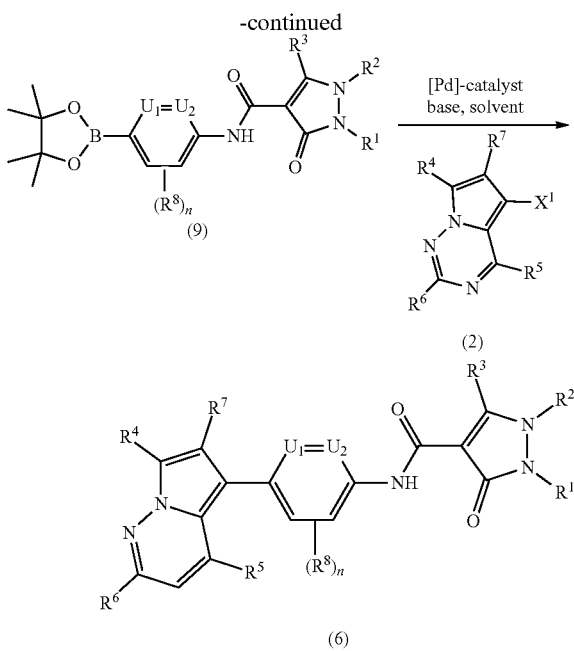

X¹ = Cl, Br, I, OMs, OTs

The compound of the present invention having the structure shown in formula (6) can be prepared by the general synthesis method described in Synthetic Scheme 2, and the specific synthetic steps can be referred to the examples. In Synthetic Scheme 2, aromatic, intermediates (8) can be obtained by condensing aryl or heteroaryl compound (7) with carboxylic acid derivatives (5) in the presence of a condensing agent (such as EDCI or HATU). Under alkaline conditions, boron ester derivatives (10) and substituted heteroaryl derivatives (8) undergoes the coupling reaction to obtain compound (9) which using a suitable base (such as cesium carbonate, potassium carbonate, sodium carbonate, etc.) and a suitable Pd catalyst (such as Pd(OAc)$_2$, Pd(dppf)$_2$Cl$_2$ or Pd$_2$(dba)$_3$, etc.). Then, boron ester derivatives (9) and pyrrolotriazine derivatives (2) undergoes a Pd-catalyzed coupling reaction to obtain kinase inhibitor (6) which using a suitable base (such as cesium carbonate, potassium carbonate, sodium carbonate, etc.) and a suitable Pd catalyst (such as Pd(OAc)$_2$, Pd(dppf)$_2$Cl$_2$ or Pd$_2$(dba)$_3$, etc.).

EXAMPLES

Example 1 tert-butyl 4-(4-amino-5-(4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate

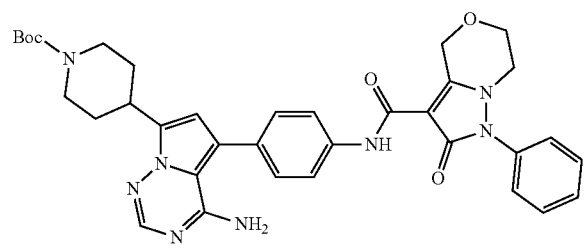 [SMILES: CC(C)(C)OC(=O)N1CCC(c2cc(-c3ccc(NC(=O)c4c5n(n(-c6ccccc6)c4=O)CCOC5)cc3)c3c(N)ncnn23)CC1]

Step 1. tert-butyl 4-(4-aminopyrrolo[2,1-f][1,2,4]triazin-7-yl)-3,6-dihydropyridine-1(2H)-carboxylate To a mixture of 7-bromopyrrolo[2,1-f][1,2,4]triazin-4-amine (300 mg, 1.41 mmol) in dioxane/H$_2$O (10 mL/2 mL) was added tert-butyl 4-(4,4,5,5-tetramethyl-1,3,2-dioxaborolan-2-yl)-3,6-dihydropyridine-1(2H)-tert-butylformate (524.9 mg, 1.69 mmol), sodium carbonate (299 mg, 2.82 mmol) and Pd(PPh$_3$)$_4$ (81.5 mg, 0.07 mmol) under nitrogen atmosphere. The resulting mixture was stirred at 80° C. for 6 h. After cooling to room temperature, the mixture was concentrated via vacuum. The resulting residue was dissolved in ethyl acetate (150 mL), and washed with brine (50 mL), dried over anhydrous Na$_2$SO$_4$, then concentrated under reduced pressure. The resulting product was purified with silica gel column chromatography (DCM/MeOH=20/1) to give tert-butyl 4-(4-aminopyrrolo[2,1-f][1,2,4]triazin-7-yl)-3,6-dihydropyridine-1(2H)-carboxylate (400 mg, 90%) as a yellow solid. MS (ESI) m/z 315.9 [M+H]+.

Step 2. tert-butyl 4-(4-aminopyrrolo[2,1-f][1,2,4]triazin-7-yl)piperidine-1-carboxylate tert-butyl 4-(4-aminopyrrolo[2,1-f][1,2,4]triazin-7-yl)-3,6-dihydropyridine-1(2H)-carboxylate (400 mg, 1.26 mmol) and Pd/C (40 mg) was added in MeOH/THF (15 mL/5 mL). The resulting mixture was stirred at room temperature under a H$_2$ balloon for 16 h. After filtering, the filtrate was concentrated via vacuum. The residue was purified by silica gel column chromatography (DCM/MeOH=10/1) to give tert-butyl 4-(4-aminopyrrolo[2,1-f][1,2,4]triazin-7-yl)piperidine-1-carboxylate (390 mg, 82.35%) as a yellow solid. MS (ESI) m/z 318.0 [M+H]+. $^1$H NMR: (400 MHz, DMSO) δ 7.82 (s, 1H), 7.55-7.52 (m, 2H), 6.82 (d, J=4.4 Hz, 1H), 6.45 (d, J=4.4 Hz, 1H), 4.08 (dd, J=23.6, 8.0 Hz, 4H), 3.28-3.21 (m, 1H), 1.98-1.90 (m, 2H), 1.51 (td, J=12.5, 4.0 Hz, 2H), 1.44-1.38 (m, 9H).

Step 3. tert-butyl 4-(4-amino-5-bromopyrrolo[2,1-f][1,2,4]triazin-7-yl)piperidine-1-carboxylate tert-butyl 4-(4-aminopyrrolo[2,1-f][1,2,4]triazin-7-yl)piperidine-1-carboxylate (390 mg, 1.22 mmol) in DCM (20 mL) was added NBS (173.7 mg, 0.98 mmol) at −20° C. The mixture was stirred at −20° C. for 3 hours. The resulting mixture was then diluted with water (10 ml) and extracted with DCM (20 ml×2). The combined organic layers were washed with brine (10 mL×2), dried over anhydrous Na$_2$SO$_4$, then concentrated via vacuum. The residue was purified by silica gel column chromatography (DCM/MeOH=20/1) to give tert-butyl 4-(4-amino-5-bromopyrrolo[2,1-f][1,2,4]triazin-7-yl)piperidine-1-carboxylate (227 mg, 46.61%) as a yellow solid. MS (ESI) m/z 395.7 [M+H]+.

Step 4. tert-butyl 4-(4-amino-5-(4-aminophenyl)pyrrolo[2,1-f][1,2,4]triazin-7-yl)piperidine-1-carboxylate To tert-butyl 4-(4-amino-5-bromopyrrolo[2,1-f][1,2,4]triazin-7-yl)piperidine-1-carboxylate (227 mg, 0.57 mmol) and 4-(4,4,5,5-tetramethyl-1,3,2-dioxaborolane-2-yl) aniline (150 mg, 0.68 mmol), sodium carbonate (121 mg, 1.14 mmol) and Pd(PPh$_3$)$_4$ (32.9 mg, 0.03 mmol) under nitrogen atmosphere. The resulting mixture was stirred at 80° C. for 6 h. After cooling, the mixture was concentrated via vacuum. The residue was extracted with EA (50 mL×3). The combined organic layers were washed with brine (50 mL), dried over anhydrous Na₂SO₄, and concentrated under reduced pressure. The residue was purified with column chromatography (PE/EA=1/1) to give tert-butyl 4-(4-amino-5-(4-aminophenyl)pyrrolo[2,1-f][1,2,4]triazin-7-yl)piperidine-1-carboxylate (150 mg, 54.63%) as a yellow solid. MS (ESI) m/z 408.9 [M+H]+. ¹H NMR: (400 MHz, DMSO) δ 7.84 (s, 1H), 7.09 (d, J=7.0 Hz, 2H), 6.65 (d, J=7.2 Hz, 2H), 6.43 (s, 1H), 5.25 (s, 2H), 4.04 (s, 2H), 3.29-3.17 (m, 1H), 2.88 (s, 2H), 1.97 (d, J=11.2 Hz, 2H), 1.54 (d, J=10.8 Hz, 2H), 1.41 (s, 9H).

Step 5. tert-butyl 4-(4-amino-5-(4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate To a mixture of tert-butyl 4-(4-amino-5-(4-aminophenyl)pyrrolo[2,1-f][1,2,4]triazin-7-yl)piperidine-1-carboxylate (150 mg, 0.37 mmol), 2-oxo-1-phenyl-2,4,6,7-tetrahydro-1H-pyrrolo[5,1-c][1,4]oxazine-3-carboxylic acid (96.3 mg, 0.37 mmol), HOAT (76.0 mg, 0.56 mmol) and DIEA (143.2 mg, 1.11 mmol) in DCM (20 mL) was added EDCI (106.4 mg, 0.56 mmol). The resulting mixture was stirred at 40° C. for 16 h. After cooling, the mixture was diluted with H₂O (10 mL), then extracted with DCM (30 mL×2). The combined organic layers were washed with brine (50 mL), dried over anhydrous Na₂SO₄, and concentrated via vacuum. To the resulting residue was added MeOH (5 mL), and stirred at room temperature for 1 h. The mixture was filtered and the filter cake was collected to give tert-butyl 4-(4-amino-5-(4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate as a white solid. MS (ESI) m/z 651.2 [M+H]+. ¹HNMR: (400 MHz, DMSO) δ 10.43 (s, 1H), 7.89 (s, 1H), 7.70 (d, J=8.6 Hz, 2H), 7.63-7.58 (m, 2H), 7.56-7.49 (m, 3H), 7.40 (d, J=8.6 Hz, 2H), 6.57 (s, 1H), 5.13 (s, 2H), 4.14-4.07 (m, 2H), 3.69 (t, J=4.9 Hz, 2H), 3.31-3.26 (m, 1H), 2.99-2.78 (m, 3H), 1.99 (d, J=12.7 Hz, 2H), 1.63-1.48 (m, 3H), 1.41 (s, 9H).

Example 2. N-(4-(4-amino-7-(piperidin-4-yl)pyrrolo[2,1-f][1,2,4]triazin-5-yl)phenyl)-2-oxo-1-phenyl-2,4,6,7-tetrahydro-1H-pyrazolo[5,1-c][1,4]oxazine-3-carboxamide

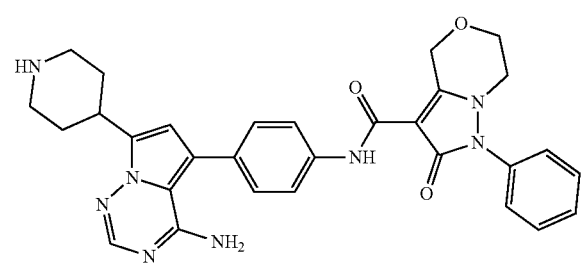 [SMILES: Nc1ncnn2c(C3CCNCC3)cc(-c3ccc(NC(=O)c4c5n(n(-c6ccccc6)c4=O)CCOC5)cc3)c12]

To tert-butyl 4-(4-amino-5-(4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate (80 mg, 0.12 mmol) in dioxane (10 mL) was added HCl in dioxane (4M, 10 mL). The mixture was stirred at room temperature for 16 h, and concentrated under reduced pressure. The resulting residue was purified by preparative HPLC (Gemini-C18 150×21.2 mm, 5 um. ACN—H₂O (0.1% FA)=10-30) to give N-(4-(4-amino-7-(piperidine-4-yl)pyrrolo[2,1-f][1,2,4]triazin-5-yl)phenyl)-2-oxo-1-phenyl-2,4,6,7-tetrahydro-1H-pyrrolo[5,1-c][1,4]oxazine-3-carboxamide (65 mg, 98.17%) was a white solid. MS (ESI) m/z 550.8 [M+H]+. ¹H NMR: (400 MHz, DMSO) δ 10.44 (s, 1H), 8.35 (s, 1H), 7.90 (s, 1H), 7.71 (d, J=8.6 Hz, 2H), 7.64-7.57 (m, 2H), 7.53 (dd, J=6.8, 4.5 Hz, 3H), 7.41 (d, J=8.5 Hz, 2H), 6.54 (s, 1H), 5.13 (s, 2H), 4.10 (t, J=5.0 Hz, 2H), 3.70 (t, J=4.9 Hz, 2H), 3.24 (d, J=12.0 Hz, 3H), 2.90 (t, J=11.4 Hz, 2H), 2.09 (d, J=12.9 Hz, 2H), 1.75 (dd, J=21.7, 12.3 Hz, 2H).

Example 3. N-(4-(4-amino-7-(1-isobutyrylpiperidin-4-yl)pyrrolo[2,1-f][1,2,4]triazin-5-yl)phenyl)-2-oxo-1-phenyl-2,4,6,7-tetrahydro-1H-pyrazolo[5,1-c][1,4]oxazine-3-carboxamide

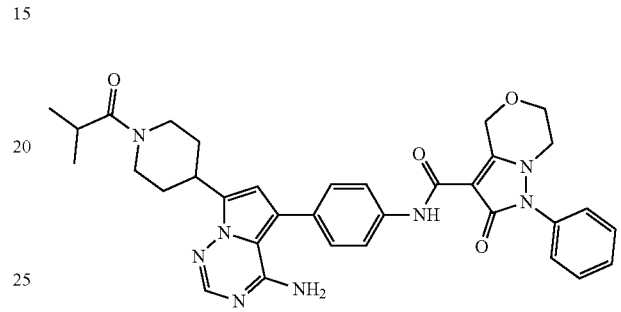

To a solution of N-(4-(4-amino-7-(piperidin-4-yl)pyrrolo[2,1-f][1,2,4]triazin-5-yl)phenyl)-2-oxo-1-phenyl-2,4,6,7-tetrahydro-1H-pyrrolo[5,1-c][1,4]oxazine-3-carboxamide (40 mg, 0.07 mmol) in DCM (10 mL) was added DIEA (27.1 mg, 0.21 mmol) and isobutyryl chloride (15 mg, 0.14 mmol). The mixture was stirred at 0° C. for 3 h. The resulting mixture was then diluted with H₂O (10 mL) and extracted with DCM (30 mL×2). The organic layer was washed with brine (10 mL), dried over anhydrous Na₂SO₄, and concentrated via vacuum. The residue was purified by preparative HPLC (Gemini-C18 150×21.2 mm, 5 um. ACN—H₂O (0.1% TFA)=25-50) to give N-(4-(4-amino-7-(1-isobutyrylpiperidin-4-yl)pyrrolo[2,1-f][1,2,4]triazin-5-yl)phenyl)-2-oxo-1-phenyl-2,4,6,7-tetrahydro-1H-pyrrolo[5,1-c][1,4]oxazine-3-carboxamide (8.7 mg, 19.86%) was a white solid. MS (ESI) m/z 620.7 [M+H]+. ¹H NMR: (400 MHz, DMSO) δ 10.43 (s, 1H), 7.90 (s, 1H), 7.70 (d, J=8.6 Hz, 2H), 7.64-7.57 (m, 2H), 7.53 (dd, J=6.9, 3.7 Hz, 3H), 7.41 (d, J=8.5 Hz, 2H), 6.57 (s, 1H), 5.12 (s, 2H), 4.54 (d, J=12.3 Hz, 1H), 4.13-4.07 (m, 2H), 3.69 (t, J=4.8 Hz, 2H), 3.24-3.16 (m, 1H), 2.91 (dt, J=13.4, 6.7 Hz, 1H), 2.71-2.65 (m, 1H), 2.11-1.95 (m, 3H), 1.68-1.43 (m, 3H), 1.01 (t, J=6.8 Hz, 6H).

Example 4. tert-butyl 4-(4-amino-5-(4-(2-oxo-1-phenyl-2,4,5,6-tetrahydro-1H-pyrrolo[1,2-b]pyrazole-3-carboxamido)phenyl)pyrrolo[2,1-f][1,2,4]triazin-7-yl)piperidine-1-carboxylate

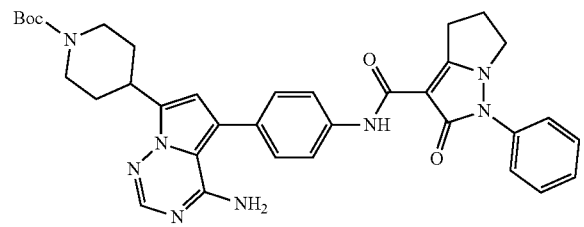 [SMILES: CC(C)(C)OC(=O)N1CCC(c2cc(-c3ccc(NC(=O)c4c5n(n(-c6ccccc6)c4=O)CCC5)cc3)c3c(N)ncnn23)CC1]

To a solution of tert-butyl 4-(4-amino-5-(4-aminophenyl)pyrrolo[2,1-f][1,2,4]triazin-7-yl)piperidine-1-carboxylate (235 mg, 0.57 mmol, prepared according to Example 1) in DCM (20 mL) was added 2-oxo-1-phenyl-2,4,5,6-tetrahydro-1H-pyrrolo[1,2-b]pyrazole-3-carboxylic acid (139.2 mg, 0.57 mmol), EDCI (218.5 mg, 1.14 mmol), HOAT (156.2 mg, 1.14 mmol) and DIEA (220.6 mg, 1.71 mmol). The reaction mixture was stirred at 40° C. for 16 h. After cooling, the mixture was diluted with H₂O (10 mL), then extracted with DCM (30 mL×2). The combined organic layers were washed with brine (50 mL), dried over anhydrous Na₂SO₄, and concentrated under reduced pressure. MeOH (5 mL) was added to the residue and stirred at room temperature for 1 h. After filtering, the filter cake was collected to give tert-butyl 4-(4-amino-5-(4-(2-oxo-1-phenyl-2,4,5,6-tetrahydro-1H-pyrrolo[1,2-b]pyrazole-3-carboxamido)phenyl)pyrrolo[2,1-f][1,2,4]triazin-7-yl)piperidine-1-carboxylate (330 mg, 77.40%) as a white solid. MS (ESI) m/z 634.7 [M+H]+. ¹H NMR: (400 MHz, DMSO) δ 10.28 (s, 1H), 7.89 (s, 1H), 7.73 (d, J=8.6 Hz, 2H), 7.59-7.52 (m, 4H), 7.42 (t, J=7.9 Hz, 3H), 6.57 (s, 1H), 4.12-4.02 (m, 3H), 3.80 (t, J=6.9 Hz, 2H), 3.29 (d, J=12.2 Hz, 1H), 3.17 (dd, J=10.0, 4.8 Hz, 2H), 2.89 (s, 2H), 2.45-2.42 (m, 1H), 1.99 (d, J=11.0 Hz, 2H), 1.63-1.49 (m, 3H), 1.41 (s, 9H).

Example 5. N-(4-(4-amino-7-(piperidin-4-yl)pyrrolo[2,1-f][1,2,4]triazin-5-yl)phenyl)-2-oxo-1-phenyl-2,4,5,6-tetrahydro-1H-pyrrolo[1,2-b]pyrazole-3-carboxamide

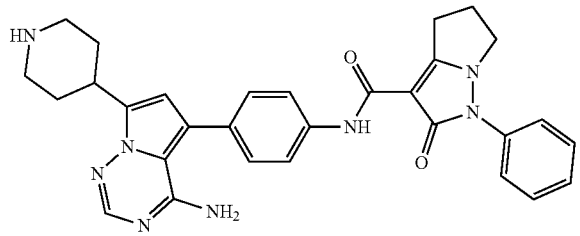 [SMILES: Nc1ncnn2c(C3CCNCC3)cc(-c3ccc(NC(=O)c4c5n(n(-c6ccccc6)c4=O)CCC5)cc3)c12]

To a solution of tert-butyl 4-(4-amino-5-(4-(2-oxo-1-phenyl-2,4,5,6-tetrahydro-1H-pyrrolo[1,2-b]pyrazole-3-carboxamido)phenyl)pyrrolo[2,1-f][1,2,4]triazin-7-yl)piperidine-1-carboxylate (160 mg, 0.25 mmol) in 1,4-dioxanee (10 mL) was added 4N HCl in dioxane (10 mL). The mixture was stirred at room temperature for 16 h. The mixture was concentrated and the resulting residue was purified by preparative HPLC (Gemini-C18 150×21.2 mm, 5 um. ACN—H₂O (0.1% FA)=10-40) to give N-(4-(4-amino-7-(piperidin-4-yl)pyrrolo[2,1-f][1,2,4]triazin-5-yl)phenyl)-2-oxo-1-phenyl-2,4,5,6-tetrahydro-1H-pyrrolo[1,2-b]pyrazole-3-carboxamide as a white solid. MS (ESI) m/z 534.8 [M+H]+. ¹H NMR: (400 MHz, DMSO) δ 10.29 (s, 1H), 8.36 (s, 1H), 7.91 (s, 1H), 7.73 (d, J=8.6 Hz, 2H), 7.59-7.49 (m, 4H), 7.45-7.39 (m, 3H), 6.54 (s, 1H), 3.81 (t, J=6.9 Hz, 2H), 3.41-3.33 (m, 1H), 3.26 (d, J=12.2 Hz, 2H), 3.17 (t, J=7.3 Hz, 2H), 2.93 (t, J=11.4 Hz, 2H), 2.46-2.41 (m, 2H), 2.11 (d, J=12.3 Hz, 2H), 1.84-1.72 (m, 2H).

Example 6. N-(4-(4-amino-7-(1-isobutyrylpiperidin-4-yl)pyrrolo[2,1-f][1,2,4]triazin-5-yl)phenyl)-2-oxo-1-phenyl-2,4,5,6-tetrahydro-1H-pyrrolo[1,2-b]pyrazole-3-carboxamide

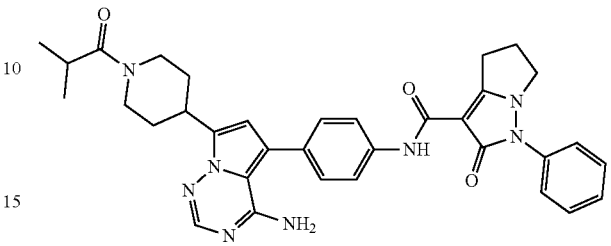

To a solution of N-(4-(4-amino-7-(piperidin-4-yl)pyrrolo[2,1-f][1,2,4]triazin-5-yl)phenyl)-2-oxo-1-phenyl-2,4,5,6-tetrahydro-1H-pyrrolo[1,2-b]pyrazole-3-carboxamide in DCM (10 mL) were added DIEA (46.5 mg, 0.36 mmol) and isobutyryl chloride (15.3 mg, 0.14 mmol). The mixture was stirred at 0° C. for 3 h. The resulting mixture was then diluted with H₂O (10 mL) and extracted with DCM (30 mL×2). The organic layer was washed with brine (10 mL), dried over anhydrous Na₂SO₄, and concentrated under reduced pressure. The residue was purified by preparative HPLC (Gemini-C18 150×21.2 mm, 5 um. ACN—H₂O (0.1% TFA)=35-65) to give N-(4-(4-amino-7-(1-isobutyrylpiperidin-4-yl)pyrrolo[2,1-f][1,2,4]triazin-5-yl)phenyl)-2-oxo-1-phenyl-2,4,5,6-tetrahydro-1H-pyrrolo[1,2-b]pyrazole-3-carboxamide (12.4 mg, 17.08%) as a white solid. MS (ESI) m/z 604.7 [M+H]+. ¹H NMR: (400 MHz, DMSO) δ 10.28 (s, 1H), 7.90 (s, 1H), 7.73 (d, J=8.6 Hz, 2H), 7.54 (dt, J=8.6, 7.7 Hz, 4H), 7.42 (t, J=7.6 Hz, 3H), 6.57 (s, 1H), 4.54 (d, J=10.9 Hz, 1H), 4.07 (d, J=12.9 Hz, 1H), 3.80 (t, J=6.9 Hz, 2H), 3.17 (t, J=7.5 Hz, 3H), 2.91 (dt, J=13.6, 6.8 Hz, 1H), 2.68 (d, J=7.1 Hz, 2H), 2.46-2.39 (m, 2H), 2.11-1.99 (m, 2H), 1.70-1.41 (m, 3H), 1.01 (t, J=6.8 Hz, 6H).

Example 7. N-(4-(4-amino-7-((1r,4r)-4-hydroxycyclohexyl)pyrrolo[2,1-f][1,2,4]triazin-5-yl)phenyl)-2-oxo-1-phenyl-2,4,6,7-tetrahydro-1H-pyrazolo[5,1-c][1,4]oxazine-3-carboxamide

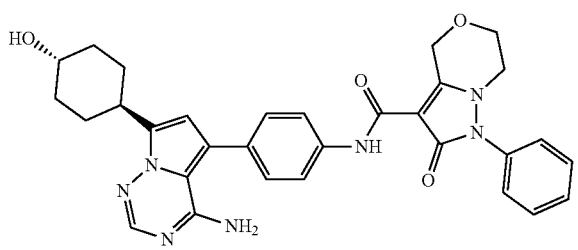 [SMILES: Nc1ncnn2c1c(-c1ccc(NC(=O)c3c4n(n(-c5ccccc5)c3=O)CCOC4)cc1)cc2[C@H]1CC[C@H](O)CC1]

Step 1. 7-(1,4-Dioxaspiro[4.5]decane-7-en-8-yl)pyrrolo[2,1-f][1,2,4]triazin-4-amine To a mixture of 7-bromopyrrolo[2,1-f][1,2,4]triazin-4-amine (300 mg, 1.41 mmol), 2-[1,4-dioxaspiro[4.5]decane-7-en-8-yl]-4,4,5,5-tetramethyl-1,3,2-dioxaborolane (450 mg, 1.69 mmol), sodium carbonate (299 mg, 2.82 mmol) in 1,4-dioxane (16 mL) and H₂O (4 mL) was added tetrakis (triphenylphosphine)palladium (81 mg, 0.07 mmol). The mixture was heated at 80° C. for 16 h under nitrogen atmosphere. The reaction mixture was diluted with water (40 mL), then extracted with EtOAc (20 mL×3). The combined organic layers were washed with brine (30 mL×2), dried over $Na_2SO_4$, and concentrated via vacuum. The residue was treated with $Et_2O$ (20 mL), filtered, and the filter cake was dried in vacuo to give 7-(1,4-Dioxaspiro[4.5]decane-7-en-8-yl)pyrrolo[2,1-f][1,2,4]triazin-4-amine (300 mg, 74% yield) as a brown solid.

Step 2. 7-(1,4-dioxaspiro[4.5]decane-8-yl)pyrrolo[2,1-f][1,2,4]triazin-4-amine 7-(1,4-dioxaspiro[4.5]decane-7-en-8-yl)pyrrolo[2,1-f][1,2,4]triazin-4-amine (300 mg, 1.1 mmol) and 10% Pd/C (30 mg) in MeOH (20 mL) was hydrogenated with a $H_2$ balloon at 20° C. for 16 h. The mixture was filtered and the filtrate was concentrated in vacuo to give 7-(1,4-dioxaspiro[4.5]decane-8-yl)pyrrolo[2,1-f][1,2,4]triazine-4-Amine (300 mg, 94.3% yield) as a yellow solid. MS (ESI): 275.1 [M+H]+. $^1$H NMR (300 MHz, DMSO) δ 7.81 (s, 1H), 7.58 (s, 2H), 6.80 (d, J=4.2 Hz, 1H), 6.41 (d, J=4.2 Hz, 1H), 3.88 (s, 4H), 3.14-3.05 (m, 1H), 2.02-1.96 (m, 2H), 1.78-1.59 (m, 6H).

Step 3. 5-bromo-7-(1,4-dioxaspiro[4.5]decane-8-yl)pyrrolo[2,1-f][1,2,4]triazin-4-amine At −20° C., to a solution of 7-(1,4-dioxaspiro[4.5]decane-8-yl)pyrrolo[2,1-f][1,2,4]triazin-4-amine (250 mg, 0.91 mmol) in THE (30 mL) was added dibromohydantoin (130 mg, 0.45 mmol), and the resulting mixture was stirred at −10° C. for 1 h. LCMS showed the product formation, then the reaction mixture was quenched with aqueous $Na_2SO_3$ (10 mL). The mixture was extracted with EtOAc (20 mL×3), and the combined organic layers were washed with brine (20 mL×2), dried over $Na_2SO_4$, and concentrated via vacuum. The residue was treated with $Et_2O$ (10 mL), filtered, and the filter cake was washed with $Et_2O$ (5 mL) and dried in vacuo to give 5-bromo-7-(1,4-dioxaspiro[4.5]decane-8-yl) pyrrolo[2,1-f][1,2,4]triazin-4-amine (300 mg, 84% yield) as a yellow solid. MS (ESI): 353.0 [M+H]+. $^1$H NMR (300 MHz, DMSO) δ 7.85 (s, 1H), 6.61 (s, 1H), 3.88 (s, 4H), 3.10 (s, 1H), 1.99-1.94 (m, 2H), 1.77-1.73 (m, 2H), 1.67-1.60 (m, 4H).

Step 4. 5-(4-aminophenyl)-7-(1,4-dioxaspiro[4.5]decane-8-yl)pyrrolo[2,1-f][1,2,4]triazin-4-amine To a mixture of 5-bromo-7-(1,4-dioxaspiro[4.5]decane-8-yl)pyrrolo[2,1-f][1,2,4]triazin-4-amine (280 mg, 0.79 mmol), 4-(4,4,5,5-tetramethyl-1,3,2-dioxaborolan-2-yl)aniline (191 mg, 0.87 mmol), and sodium carbonate (168 mg, 1.58 mmol) in dioxane (32 mL) and $H_2O$ (8 mL) was added tetrakis (triphenylphosphine) palladium (45.8 mg, 0.04 mmol). The resulting mixture was heated to 80° C. and stirred for 16 h. After cooling to room temperature, the mixture was diluted with water (40 mL), and extracted with EtOAc (30 mL×3). The combined organic layers were washed with brine (40 mL×2), dried over $Na_2SO_4$, and concentrated under reduced pressure. The residue was purified by silica gel chromatography (DCM/MeOH=20/1) to give 5-(4-aminophenyl)-7-(1,4-dioxaspiro[4.5]decane-8-yl) pyrrolo[2,1-f][1,2,4]triazin-4-amine (300 mg, 93% yield) as a brown solid. MS (ESI): 366.2 [M+H]+. $^1$H NMR (300 MHz, DMSO) δ 7.83 (s, 1H), 7.58 (s, 1H), 7.09 (d, J=8.4 Hz, 2H), 6.64 (d, J=8.4 Hz, 2H), 6.37 (s, 1H), 5.25 (s, 2H), 3.88 (s, 4H), 3.12 (s, 1H), 2.03-1.99 (m, 2H), 1.75-1.64 (m, 6H).

Step 5. 4-(4-amino-5-(4-aminophenyl)pyrrolo[2,1-f][1,2,4]triazin-7-yl)cyclohexane-1-ol To a solution of 5-(4-aminophenyl)-7-(1,4-dioxaspiro[4.5]decane-8-yl)pyrrolo[2,1-f][1,2,4]triazine (280 mg, 0.77 mmol) in THF (5 mL) was added 1N HCl (5 mL), and the resulting mixture was stirred at 20° C. for 3 h. After cooling to 0° C., sodium borohydride (58 mg, 1.54 mmol) was added. The mixture was stirred at 20° C. for 1 h. The mixture was concentrated in vacuo, and the residue was diluted with water (10 mL). The mixture was neutralized with aqueous $NaHCO_3$ (10 mL), then extracted with EtOAc (20 mL×3). The combined organic layers were washed with brine (30 mL×2), dried over $Na_2SO_4$, and concentrated under reduced pressure. The residue was purified by silica gel chromatography (DCM/MeOH=15/1) to give 4-(4-amino-5-(4-aminophenyl)pyrrolo[2,1-f][1,2,4]triazin-7-yl)cyclohexane-1-ol (90 mg, 32.5% yield) as a yellow solid. MS (ESI): 324.3 [M+H]+. $^1$H NMR (400 MHz, DMSO) δ 7.82 (s, 1H), 7.08 (d, J=8.4 Hz, 2H), 6.64 (d, J=8.4 Hz, 2H), 6.36 (s, 1H), 5.25 (s, 2H), 4.61 (d, J=4.4 Hz, 1H), 3.49-3.42 (m, 1H), 3.03-2.97 (m, 1H), 2.03-1.91 (m, 4H), 1.52-1.42 (m, 2H), 1.36-1.26 (m, 2H).

Step 6. N-(4-(4-amino-7-((1r,4r)-4-hydroxycyclohexyl)pyrrolo[2,1-f][1,2,4]triazin-5-yl)phenyl)-2-oxo-1-phenyl-2,4,6,7-tetrahydro-1H-pyrazolo[5,1-c][1,4]oxazine-3-carboxamide To a mixture of 2-oxo-1-phenyl-2,4,6,7-tetrahydro-1H-pyrrolo[5,1-c][1,4]oxazine-3-carboxylic acid (39 mg, 0.15 mmol), 4-(4-amino-5-(4-aminophenyl)pyrrolo[2,1-f][1,2,4]triazin-7-yl)cyclohexane-1-ol (50 mg, 0.15 mmol), HOAt (24.7 mg, 0.18 mmol), and DIEA (58.1 mg, 0.45 mmol) in DCM (20 mL) were added N-(3-dimethylaminopropyl)-N'-ethylcarbodiimide hydrochloride (43 mg, 0.22 mmol). The resulting mixture was heated to 40° C. and stirred for 16 h. After cooling to room temperature, the mixture was diluted with DCM (30 mL), then washed with brine (20 mL×2). The separated organic layer was dried over $Na_2SO_4$ and concentrated via vacuum. The residue was recrystallized from MeOH (3 mL) to give N-(4-(4-amino-7-((1r,4r)-4-hydroxycyclohexyl)pyrrolo[2,1-f][1,2,4]triazin-5-yl)phenyl)-2-oxo-1-phenyl-2,4,6,7-tetrahydro-1H-pyrazolo[5,1-c][1,4]oxazine-3-carboxamide. MS (ESI): 566.3 [M+H]+. $^1$H NMR (400 MHz, DMSO) δ 10.43 (s, 1H), 7.88 (s, 1H), 7.69 (d, J=8 Hz, 2H), 7.63-7.58 (m, 2H), 7.56-7.51 (m, 3H), 7.40 (d, J=8 Hz, 2H), 6.50 (s, 1H), 5.12 (s, 2H), 4.62 (d, J=4.4 Hz, 1H), 4.10 (t, J=4.4 Hz, 2H), 3.69 (t, J=4.4 Hz, 2H), 3.50-3.43 (m, 1H), 3.06-3.00 (m, 1H), 2.03 (d, J=12 Hz, 2H), 1.93 (d, J=10 Hz, 2H), 1.54-1.44 (m, 2H), 1.36-1.27 (m, 2H).

Example 8. N-(4-(4-amino-7-(1-isobutyrylpiperidin-4-yl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide

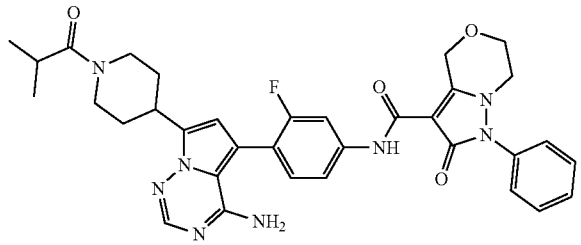 [SMILES: CC(C)C(=O)N1CCC(c2cc(-c3ccc(NC(=O)c4c5n(n(-c6ccccc6)c4=O)CCOC5)cc3F)c3c(N)ncnn23)CC1]

Step 1. tert-butyl 4-(4-amino-5-(2-fluoro-4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate At room temperature, to a mixture of tert-butyl 4-(4-amino-5-(4-amino-2-fluorophenyl)pyrrolo[2,1-f][1,2,4]triazin-7-yl)piperidine-1-carboxylate (194 mg, 0.45 mmol), 2-oxo-1-phenyl-2,4,6,7-tetrahydro-1H-pyrazolo[5,1-c][1,4]oxazine-3-carboxylic acid (129.9 mg, 0.50 mmol), HOAT (93.3 mg, 0.68 mmol), and DIEA (175.6 mg, 1.36 mmol) in DCM (30 mL) was added EDCI (130.5 mg, 1.36 mmol). The mixture was stirred at 45° C. for 16 h. After cooling to room temperature, the mixture was diluted with H$_2$O (20 mL), then extracted with DCM (30 mL×3). The combined organic layers were washed with brine (50 mL×2), dried over anhydrous Na$_2$SO$_4$, and concentrated via vacuum. The resulting residue was purified by column chromatography (MeOH/DCM=5/95) to give tert-butyl 4-(4-amino-5-(2-fluoro-4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate (288 mg, 80.54% yield) as a yellow solid. LCMS: $t_R$=1.203 min, column (HALO C18 4.6*50 mm, 2.7 μm), MS (ESI) m/z 669.0 [M+H]+.

Step 2. N-(4-(4-amino-7-(piperidin-4-yl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide To a solution of tert-butyl 4-(4-amino-5-(2-fluoro-4-(2-oxo-1-phenyl-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate (288 mg, 0.43 mmol) in dioxane (10 mL) was added HCl (4 M, 10 mL). The mixture was stirred at room temperature for 6 h. The mixture was concentrated via vacuum to give N-(4-(4-amino-7-(piperidin-4-yl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide (240 mg, 83.44% yield) as a white solid. LCMS: $t_R$=0.952 min, column (HALO C18 4.6*50 mm, 2.7 μm), MS (ESI) m/z 568.7 [M+H]+.

Step 3. N-(4-(4-amino-7-(1-isobutyrylpiperidin-4-yl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide To a solution of N-(4-(4-amino-7-(piperidin-4-yl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide (212 mg, 0.37 mmol), and DIEA (342 mg, 2.65 mmol) in DCM (20 mL) was added isobutyryl chloride (31.8 mg, 0.30 mmol). The mixture was stirred at 0° C. for 3 h, and diluted with H$_2$O (20 mL), then extracted with DCM (30 mL×2). The combined organic layers were washed with brine (30 mL×2), dried over anhydrous Na$_2$SO$_4$, and concentrated via vacuum. The resulting residue was purified by preparative HPLC (Gemini-C18 150×21.2 mm, 5 um. ACN—H$_2$O (0.1% TFA)=30%-50%) to give N-(4-(4-amino-7-(1-isobutyrylpiperidin-4-yl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide (42.2 mg, 17.25%) as a white solid. LCMS: $t_R$=1.107 min, column (HALO C18 4.6*50 mm, 2.7 μm), MS (ESI) m/z 639.0 [M+H]+. $^1$H NMR: (400 MHz, DMSO) δ 10.55 (s, 1H), 7.91 (s, 1H), 7.85-7.80 (m, 1H), 7.64-7.58 (m, 2H), 7.56-7.50 (m, 3H), 7.37-7.29 (m, 2H), 6.54 (s, 1H), 5.12 (s, 2H), 4.54 (d, J=11.7 Hz, 1H), 4.09 (dd, J=16.5, 11.3 Hz, 3H), 3.70 (t, J=5.0 Hz, 2H), 3.44-3.37 (m, 1H), 3.20 (t, J=12.3 Hz, 1H), 2.95-2.85 (m, 1H), 2.68 (t, J=11.5 Hz, 1H), 2.14-1.98 (m, 2H), 1.64-1.43 (m, 2H), 1.01 (t, J=6.6 Hz, 6H).

Example 9. N-(4-(4-amino-7-(1-isobutyrylpiperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide

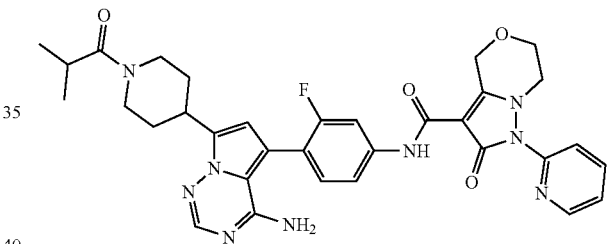

Step 1. tert-butyl 4-(4-amino-5-(2-fluoro-4-(2-oxo-1-(pyridin-2-yl)-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate At room temperature, to a solution of tert-butyl 4-(4-amino-5-(4-amino-2-fluorophenyl)pyrrolo[2,1-f][1,2,4]triazin-7-yl)piperidine-1-carboxylate (132 mg, 0.31 mmol), 2-oxo-1-(pyridin-2-yl)-2,4,6,7-tetrahydro-1H-pyrazolo[5,1-c][1,4]oxazine-3-carboxylic acid (80.7 mg, 0.31 mmol), HOAt (63.5 mg, 0.46 mmol) and DIEA (119.5 mg, 0.93 mmol) in DCM (30 mL) was added EDCI (88.8 mg, 0.46 mmol). The mixture was stirred at 45° C. for 16 h. After cooling to room temperature, the mixture was diluted with H$_2$O (20 mL), then extracted with DCM (30 mL×3). The combined organic layers were washed with brine (50 mL×2), dried over anhydrous Na$_2$SO$_4$, and concentrated via vacuum. The resulting residue was purified by column chromatography (MeOH/DCM=5/95) to give tert-butyl 4-(4-amino-5-(2-fluoro-4-(2-oxo-1-(pyridin-2-yl)-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate (203 mg, 78.4% yield) as a yellow solid. LCMS: $t_R$=1.189 min, column (HALO C18 4.6*50 mm, 2.7 μm), MS (ESI) m/z 670.1 [M+H]+.

Step 2. N-(4-(4-amino-7-(piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide To a mixture of tert-butyl 4-(4-amino-5-(2-fluoro-4-(2-oxo-1-(pyridin-2-yl)-2,4,6,7-tetrahydro-1H-pyrazolo[5,1-c][1,4]oxazine-3-carboxamido)phenyl)pyrrolo[2,1-f][1,2,4]triazin-7-yl)piperidine-1-carboxylate (218 mg, 0.325 mmol) in dioxane (10 mL) was added a solution of HCl in dioxane (4 M, 10 mL). The mixture was stirred at room temperature for 6 h. The mixture was concentrated under reduced pressure to give N-(4-(4-amino-7-(piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (180 mg, 82.65% yield) as a white solid. LCMS: $t_R$=0.936 min, column (HALO C18 4.6*50 mm, 2.7 μm), MS (ESI) m/z 570.0 [M+H]+.

Step 3. N-(4-(4-amino-7-(1-isobutyrylpiperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide To a solution of N-(4-(4-amino-7-(piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (210 mg, 0.37 mmol), and TEA (149 mg, 1.47 mmol) in DCM (20 mL) was added isobutyryl chloride (31.4 mg, 0.29 mmol). The mixture was stirred at 0° C. for 3 h, then diluted with $H_2O$ (20 mL) and extracted with DCM (30 mL×2). The combined organic layers were washed with brine (20 mL×2), dried over anhydrous $Na_2SO_4$, and concentrated under reduced pressure. The resulting residue was purified by preparative HPLC (Gemini-C18 150×21.2 mm, 5 um. ACN—$H_2O$ (0.1% TFA)= 30%-50%) to give N-(4-(4-amino-7-(1-isobutyrylpiperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (46.5 mg, 19.34% yield) as a white solid. LCMS: $t_R$=1.145 min, column (HALO C18 4.6*50 mm, 2.7 μm), MS (ESI) m/z 640.1 [M+H]+. $^1$H NMR (400 MHz, DMSO) δ 10.37 (s, 1H), 8.60 (dd, J=4.9, 1.1 Hz, 1H), 8.14-8.06 (m, 1H), 7.91 (s, 1H), 7.86-7.80 (m, 2H), 7.52-7.45 (m, 1H), 7.39-7.30 (m, 2H), 6.54 (s, 1H), 5.17 (s, 2H), 4.54 (d, J=13.5 Hz, 1H), 4.08 (t, J=11.5 Hz, 5H), 3.41 (d, J=11.8 Hz, 1H), 3.20 (t, J=12.2 Hz, 1H), 2.96-2.85 (m, 1H), 2.68 (t, J=11.7 Hz, 1H), 2.12-1.98 (m, 2H), 1.65-1.40 (m, 2H), 1.01 (t, J=6.6 Hz, 6H).

Example 10. N-(4-(4-amino-7-(1-(cyclopropanecarbonyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide

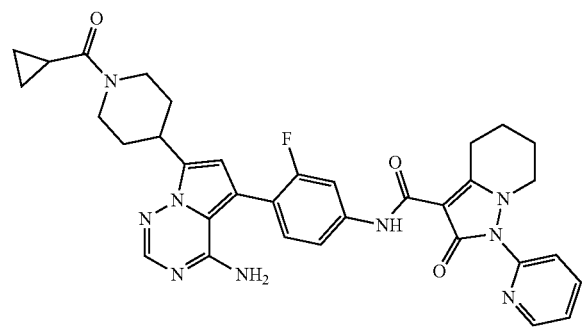 [SMILES: Nc1ncnn2c(C3CCN(C(=O)C4CC4)CC3)cc(-c3ccc(NC(=O)c4c5n(n(-c6ccccn6)c4=O)CCCC5)cc3F)c12]

Step 1. (4-(4-amino-5-(4-amino-2-fluorophenyl)pyrrolo[2,1-f][1,2,4]triazin-7-yl)piperidin-1-yl)(cyclopropyl)methanone To a solution of 5-bromo-7-(1-cyclopropanecarbonylpiperidin-4-yl)pyrrolo[2,1-f][1,2,4]triazin-4-amine (300 mg, 0.82 mmol), 3-fluoro-4-(4,4,5,5-tetramethyl-1,3,2-dioxaborolan-2-yl)aniline (293 mg, 1.23 mmol), and sodium carbonate (175 mg, 1.64 mmol) in dioxane (40 mL) and $H_2O$ (10 mL) was added tetrakis(triphenylphosphine)palladium (95 mg, 0.08 mmol), and the mixture was heated at 90° C. for 16 h. After cooling to room temperature, the mixture was concentrated under vacuum. The residue was diluted with water (30 mL), then extracted with EtOAc (30 mL×3). The combined organic layers were washed with brine (40 mL×2), dried over $Na_2SO_4$, and concentrated. The resulting residue was purified by silica gel chromatography (DCM/MeOH=30/1) to give (4-(4-amino-5-(4-amino-2-fluorophenyl)pyrrolo[2,1-f][1,2,4]triazin-7-yl)piperidin-1-yl)(cyclopropyl)methanone (300 mg, 83% yield) as a yellow solid. MS (ESI): 314.2 [M+H]+.

Step 2. N-(4-(4-amino-7-(1-(cyclopropanecarbonyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide To a solution of (4-(4-amino-5-(4-amino-2-fluorophenyl)pyrrolo[2,1-f][1,2,4]triazin-7-yl)piperidin-1-yl)(cyclopropyl)methanone (32.9 mg, 0.13 mmol), 2-oxo-1-(pyridin-2-yl)-4H,5H,6H,7H-pyrazolo[1,5-a]pyridine-3-carboxylic acid (32.9 mg, 0.13 mmol), 1-hydroxybenzotriazole (20.56 mg, 0.15 mmol), and DIEA (49 mg, 0.3.8 mmol) in DCM (20 mL) were added N-(3-dimethylaminopropyl)-N'-ethylcarbodiimide hydrochloride (36.5 mg, 0.19 mmol). The mixture was heated at 40° C. for 16 h. After cooling to room temperature, the mixture was diluted with DCM (30 mL), then washed with brine (30 mL). The separated organic layer was dried over $Na_2SO_4$ and concentrated via vacuum. The resulting residue was recrystallized from MeOH (5 mL). After filtering, the filter cake was washed with MeOH (2 mL), and dried in vacuo to give N-(4-(4-amino-7-(1-(cyclopropanecarbonyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide (30.2 mg, 36% yield) as a yellow solid. MS (ESI): 636.4 [M+H]+. $^1$H NMR (400 MHz, DMSO) δ 10.65 (s, 1H), 8.60 (d, J=4.4 Hz, 1H), 8.10-8.05 (m, 1H), 7.91 (s, 1H), 7.84 (d, J=12.8 Hz, 1H), 7.75 (d, J=8.4 Hz, 1H), 7.49-7.46 (m, 1H), 7.36-7.30 (m, 2H), 6.54 (s, 1H), 4.52-4.36 (m, 2H), 3.94-3.91 (m, 2H), 3.45-3.36 (m, 2H), 3.30-3.24 (m, 2H), 2.76-2.67 (m, 1H), 2.10 (d, J=11.6 Hz, 1H), 2.04-1.96 (m, 4H), 1.87-1.82 (m, 2H), 1.68-1.46 (m, 2H), 0.76-0.68 (m, 4H).

Example 11. N-(5-(4-amino-7-(1-isobutyrylpiperidin-4-yl)pyrrolo[2,1-f][1,2,4]triazin-5-yl)pyridin-2-yl)-2-oxo-1-phenyl-1,2,4,5,6,7-hexahydropyrazolo[1,5-a]pyridine-3-carboxamide

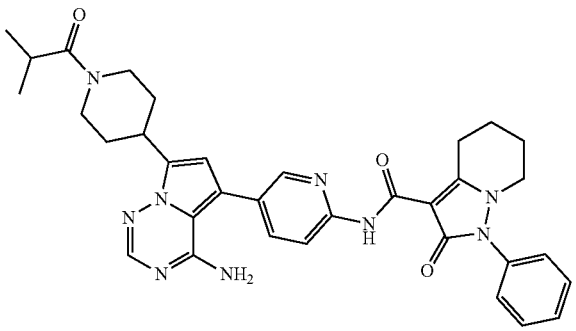 [SMILES: CC(C)C(=O)N1CCC(c2cc(-c3ccc(NC(=O)c4c5n(n(-c6ccccc6)c4=O)CCCC5)nc3)c3c(N)ncnn23)CC1]

To a solution of 1-(4-(4-amino-5-bromopyrrolo[2,1-f][1,2,4]triazin-7-yl)piperidin-1-yl)-2-methylpropane-1-one (75 mg, 0.20 mmol) in dioxane/H₂O (20 mL/4 mL) was added (6-(2-oxo-1-phenyl-1,2,4,5,6,7-Hexahydropyrazolo[1,5-a]pyridine-3-carboxamido)pyridin-3-yl)boronic acid (93 mg, 0.25 mmol), sodium carbonate (33 mg, 0.30 mmol), Pd(PPh$_3$)$_4$ (24 mg, 0.02 mmol) under nitrogen atmosphere. The resulting mixture was stirred at 80° C. for 6 hours. After cooling, the mixture was concentrated via vacuum, extracted with DCM (50 mL×2) and H₂O (50 mL). The organic layer was washed with brine (50 mL), dried over anhydrous Na$_2$SO$_4$, filtered, concentrated under reduced pressure, and the resulting residue was subjected to preparative HPLC (Gemini-C18 150×21.2 mm, 5 um, ACN—H₂O (0.1% FA) 15%-40%) purification to give N-(5-(4-amino-7-(1-isobutyrylpiperidin-4-yl)pyrrolo[2,1-f][1,2,4]triazin-5-yl)pyridin-2-yl)-2-oxo-1-phenyl-1,2,4,5,6,7-hexahydropyrazolo[1,5-a]pyridine-3-carboxamide (28.7 mg, 25%) as a white solid. LCMS: t$_R$=1.125 min, column (HALO C18 4.6*50 mm, 2.7 μm), MS (ESI) m/z 620.1 [M+H]+. $^1$H NMR: (400 MHz, DMSO) δ 11.04 (s, 1H), 8.31 (dd, J=18.5, 5.2 Hz, 2H), 7.92 (s, 1H), 7.82 (dd, J=8.5, 2.4 Hz, 1H), 7.60 (t, J=7.5 Hz, 2H), 7.54- 7.46 (m, 3H), 6.63 (s, 1H), 4.54 (d, J=13.0 Hz, 1H), 4.07 (d, J=12.5 Hz, 1H), 3.58 (t, J=5.9 Hz, 2H), 3.46-3.37 (m, 2H), 3.22 (t, J=6.3 Hz, 2H), 2.93-2.88 (m, 1H), 2.75-2.68 (m, 1H), 2.10-1.96 (m, 4H), 1.85-1.79 (m, 2H), 1.62-1.47 (m, 2H), 1.01 (t, J=6.7 Hz, 6H).

Example 12. N-(4-(4-amino-7-(1-(2-fluoro-2-methylpropanoyl)piperidin-4-yl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide

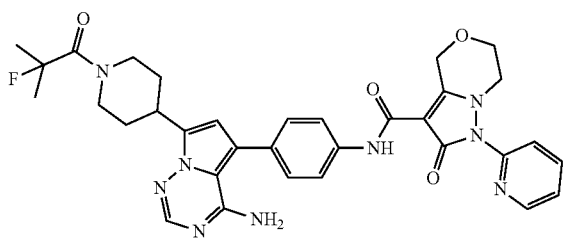 [SMILES: CC(C)(F)C(=O)N1CCC(c2cc(-c3ccc(NC(=O)c4c5n(n(-c6ccccn6)c4=O)CCOC5)cc3)c3c(N)ncnn23)CC1]

To a solution of 1-(4-(4-amino-5-(4-aminophenyl)pyrrolo[2,1-f][1,2,4]triazin-7-yl)piperidin-1-yl)-2-fluoro-2-methylpropan-1-one (60 mg, 0.15 mmol) in DCM (10 mL) was added 2-oxo-1-(pyridin-2-yl)-2,4,6-tetrahydro-1H-pyrazolo[5,1-c][1,4]oxazine-3-carboxylic acid (48 mg, 0.18 mmol), EDCI (44 mg, 0.22 mmol), HOAT (32 mg, 0.22 mmol), and DIEA (59 mg, 0.45 mmol), then the mixture was stirred at 50° C. for 16 h. The reaction mixture was extracted with DCM (30 mL×2) and H₂O (30 mL). The organic layer was washed with brine (50 mL), dried over anhydrous Na2SO4, filtered, concentrated, and the residue was subjected to preparative HPLC (Gemini-C18 150×21.2 mm, 5 um, ACN—H₂O (0.1% FA) 15%-40%) purification to give N-(4-(4-amino-7-(1-(2-fluoro-2-methylpropionyl)piperidin-4-yl)pyrrolo[2,1-f][1,2,4]triazin-5-yl)phenyl)-2-oxo-1-(pyridin-2-yl)-2,4,6,7-tetrahydro-1H-pyrazolo[5, 1-c][1,4]oxazine-3-carboxamide (67.4 mg, 68%) as a white solid. LCMS: t$_R$=1.134 min, column (HALO C18 4.6*50 mm, 2.7 μm), MS (ESI) m/z 640.1 [M+H]+. $^1$H NMR: (400 MHz, DMSO) δ 10.27 (s, 1H), 8.59 (d, J=3.9 Hz, 1H), 8.12-8.07 (m, 1H), 7.91 (s, 1H), 7.83 (d, J=8.1 Hz, 1H), 7.72 (d, J=8.6 Hz, 2H), 7.50-7.45 (m, 1H), 7.41 (d, J=8.5 Hz, 2H), 6.59 (s, 1H), 5.18 (s, 2H), 4.49-4.39 (m, 2H), 4.13-4.05 (m, 4H), 3.49-3.42 (m, 1H), 3.29-3.20 (m, 1H), 2.88-2.78 (m, 1H), 2.11-2.05 (m, 2H), 1.59 (s, 5H), 1.54 (s, 3H).

Example 13. N-(4-(4-amino-7-(1-(2-hydroxy-2-methylpropanoyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide

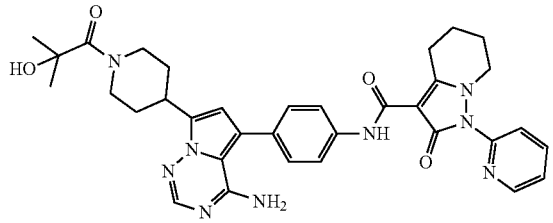 [SMILES: CC(C)(O)C(=O)N1CCC(c2cc(-c3ccc(NC(=O)c4c5n(n(-c6ccccn6)c4=O)CCCC5)cc3)c3c(N)ncnn23)CC1]

Step 1. 1-(4-(4-amino-5-(4-aminophenyl)pyrrolo[2,1-f][1,2,4]triazin-7-yl)piperidin-1-yl)-2-hydroxy-2-methylpropan-1-one To a solution of 1-(4-(4-amino-5-bromopyrrolo[2,1-f][1,2,4]triazin-7-yl)piperidin-1-yl)-2-hydroxyl-2-methylpropan-1-one (440 mg, 1.15 mmol) in dioxane/H₂O (20 mL/5 mL) was added 4-(4,4,5,5-tetramethyl-1,3,2-dioxaborolan-2-yl)aniline (380 mg, 1.72 mmol), Na$_2$CO$_3$ (184 mg, 1.72 mmol), and Pd(PPh$_3$)$_4$ (134 mg, 0.115 mmol) under nitrogen atmosphere. The resulting mixture was stirred at 80° C. for 6 h. The mixture was concentrated to remove organics, extracted with DCM (50 mL×2) and H₂O (30 mL). The organic layer was washed with brine (60 mL), dried over anhydrous Na$_2$SO$_4$, filtered, concentrated, and purified with column chromatography (DCM/MeOH=20/1) to give 1-(4-(4-amino-5-(4-aminophenyl)pyrrolo[2,1-f][1,2,4]triazin-7-yl)piperidin-1-yl)-2-hydroxy-2-methylpropane-1-one (330 mg, 66%) as a white solid. LCMS: t$_R$=0.921 min, column (HALO C18 4.6*50 mm, 2.7 μm), MS (ESI) m/z 395.1 [M+H]+.

Step 2. N-(4-(4-amino-7-(1-(2-hydroxy-2-methyl-propionamido)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide To a solution of 1-(4-(4-amino-5-(4-aminophenyl)pyrrolo[2,1-f][1,2,4]triazin-7-yl)piperidin-1-yl)-2-hydroxy-2-methylpropane-1-one (60 mg, 0.15 mmol) in DCM (10 mL) was added 2-oxo-1-(pyridin-2-yl)-1,2,4,5,6,7-hexahydropyrazolo[1,5-a]pyridine-3-carboxylic acid (48 mg, 0.18 mmol), EDCI (44 mg, 0.22 mmol), HOAT (32 mg, 0.22 mmol), and DIEA (59 mg, 0.45 mmol). And the mixture was stirred at 50° C. for 16 h. The reaction mixture was extracted with DCM (30 mL×2) and H$_2$O (30 mL). The organic layer was washed with brine (50 mL), dried over anhydrous Na$_2$SO$_4$, filtered, concentrated. The residue was purified with preparative HPLC (Gemini-C18 150×21.2 mm, 5 um, ACN—H$_2$O (0.1% FA) 15%-40%) to give N-(4-(4-amino-7-(1-(2-hydroxy-2-methylpropionamido)piperidin-4-yl)pyrrolo[2,1-f][1,2,4]triazin-5-yl)phenyl)-2-oxo-1-(pyridin-2-yl)-1,2,4,5,6,7-hexahydropyazolo[1,5-a]pyridine-3-carboxamide (32.1 mg, 33%) as a white solid. LCMS: t$_R$=1.072 min, column (HALO C18 4.6*50 mm, 2.7 μm), MS (ESI) m/z 636.1 [M+H]+. $^1$H NMR: (400 MHz, DMSO) δ 10.54 (s, 1H), 8.60 (d, J=4.6 Hz, 1H), 8.10-8.05 (m, 1H), 7.90 (s, 1H), 7.73 (dd, J=17.5, 8.3 Hz, 3H), 7.49-7.45 (m, 1H), 7.40 (d, J=8.4 Hz, 2H), 6.55 (s, 1H), 5.40 (s, 1H), 4.99-4.88 (m, 1H), 4.61-4.49 (m, 1H), 4.16-4.06 (m, 1H), 3.92 (t, J=5.8 Hz, 2H), 3.44-3.38 (m, 1H), 3.26 (t, J=6.3 Hz, 2H), 3.17 (d, J=5.1 Hz, 1H), 2.07-1.97 (m, 4H), 1.88-1.81 (m, 2H), 1.67-1.54 (m, 2H), 1.33 (s, 6H).

Example 14. N-(4-(4-amino-7-(1-(2-hydroxy-2-methylpropanoyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide

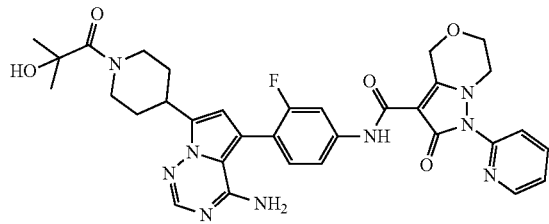 [SMILES: CC(C)(O)C(=O)N1CCC(c2cc(-c3ccc(NC(=O)c4c5n(n(-c6ccccn6)c4=O)CCOC5)cc3F)c3c(N)ncnn23)CC1]

To a mixture of 1-(4-(4-amino-5-(4-amino-2-fluorophenyl)pyrrolo[2,1-f][1,2,4]triazin-7-yl)piperidine-1-yl)-2-hydroxy-2-methylpropan-1-one (62 mg, 0.15 mmol) in DCM (10 mL) was added 2-oxo-1-(pyridin-2-yl)-2,4,6,7-tetrahydro-1H-pyrazolo[5,1-c][1,4]oxazine-3-carboxylic acid (48 mg, 0.18 mmol), EDCI (44 mg, 0.22 mmol), HOAT (32 mg, 0.22 mmol), and DIEA (59 mg, 0.45 mmol). And the mixture was stirred at 50° C. for 16 h. The reaction mixture was extracted with DCM (30 mL×2) and H$_2$O (30 mL). The organic layer was washed with brine (50 mL), dried over anhydrous Na$_2$SO$_4$, filtered, concentrated, and the residue was subjected to preparative HPLC (Gemini-C18 150×21.2 mm, 5 um, ACN—H$_2$O (0.1% FA) 15%-40%) purification to give N-(4-(4-amino-7-(1-(2-hydroxy-2-methylpropanoyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (31.0 mg, 32%) as a white solid. LCMS: t$_R$=1.077 min, column (HALO C18 4.6*50 mm, 2.7 μm), MS (ESI) m/z 656.0 [M+H]+. $^1$H NMR: (400 MHz, DMSO) δ 10.37 (s, 1H), 8.60 (d, J=3.6 Hz, 1H), 8.12-8.07 (m, 1H), 7.91 (s, 1H), 7.85-7.79 (m, 2H), 7.50-7.46 (m, 1H), 7.35 (d, J=5.4 Hz, 2H), 6.52 (s, 1H), 5.41 (s, 1H), 5.18 (s, 2H), 4.97-4.86 (m, 1H), 4.60-4.48 (m, 1H), 4.13-4.08 (m, 4H), 3.44-3.38 (m, 1H), 3.17 (d, J=5.0 Hz, 2H), 2.07-2.01 (m, 2H), 1.65-1.52 (m, 2H), 1.33 (s, 6H).

Example 15. N-(4-(4-amino-7-(1-(2-hydroxy-2-methylpropanoyl)piperidin-4-yl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide

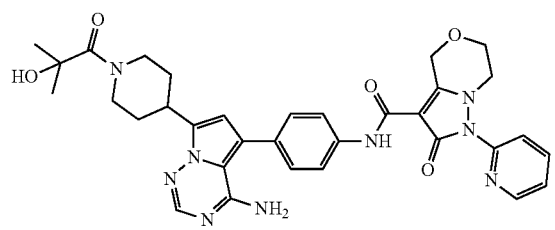 [SMILES: CC(C)(O)C(=O)N1CCC(c2cc(-c3ccc(NC(=O)c4c5n(n(-c6ccccn6)c4=O)CCOC5)cc3)c3c(N)ncnn23)CC1]

To 1-(4-(4-amino-5-(4-aminophenyl)pyrrolo[2,1-f][1,2,4]triazin-7-yl)piperidin-1-yl)-2-hydroxy-2-methylpropan-1-one (60 mg, 0.15 mmol) in DCM (10 mL) was added 2-oxo-1-(pyridin-2-yl)-2,4,6,7-tetrahydro-1H-pyrazolo[5,1-c][1,4]oxazine-3-carboxylic acid (48 mg, 0.18 mmol), EDCI (44 mg, 0.22 mmol), HOAT (32 mg, 0.22 mmol), and DIEA (59 mg, 0.45 mmol). And the mixture was stirred at 50° C. for 16 h. The reaction mixture was extracted with DCM (30 mL×2) and H$_2$O (30 mL). The organic layer was washed with brine (50 mL), dried over anhydrous Na$_2$SO$_4$, filtered, concentrated. The residue was subjected to preparative HPLC (Gemini-C18 150×21.2 mm, 5 um, ACN—H$_2$O (0.1% FA) 15%-40%) purification to give N-(4-(4-amino-7-(1-(2-hydroxy-2-methylpropanoyl)piperidin-4-yl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide (41.1 mg, 40%) as a white solid. LCMS: t$_R$=1.051 min, column (HALO C18 4.6*50 mm, 2.7 μm), MS (ESI) m/z 638.1 [M+H]+. $^1$H NMR: (400 MHz, DMSO) δ 10.27 (s, 1H), 8.59 (d, J=3.8 Hz, 1H), 8.12-8.07 (m, 1H), 7.90 (s, 1H), 7.83 (d, J=8.1 Hz, 1H), 7.72 (d, J=8.5 Hz, 2H), 7.50-7.45 (m, 1H), 7.41 (d, J=8.5 Hz, 2H), 6.55 (s, 1H), 5.40 (s, 1H), 5.18 (s, 2H), 4.99- 4.85 (m, 1H), 4.60-4.45 (m, 1H), 4.12-4.07 (m, 4H), 3.44-3.38 (m, 1H), 3.17 (d, J=4.8 Hz, 2H), 2.07-2.01 (m, 2H), 1.66-1.52 (m, 2H), 1.33 (s, 6H).

Example 16. N-(4-(4-amino-7-(1-isobutyrylpiperidin-4-yl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide

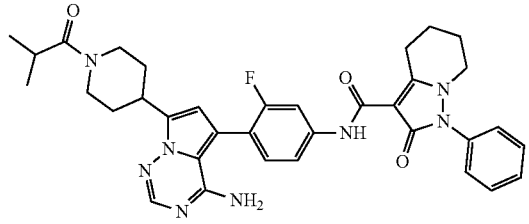 [SMILES: CC(C)C(=O)N1CCC(c2cc(-c3ccc(NC(=O)c4c5n(n(-c6ccccc6)c4=O)CCCC5)cc3F)c3c(N)ncnn23)CC1]

Step 1. tert-butyl 4-(4-amino-5-bromopyrrolo[2,1-f] [1,2,4]triazin-7-yl)piperidine-1-carboxylate To a mixture of tert-butyl 4-(4-amino-5-bromopyrrolo[2, 1-f][1,2,4]triazin-7-yl)piperidine-1-carboxylate (300 mg, 0.83 mmol) 1,4-dioxane and water (25 mL/5 mL) were added 3-fluoro-4-(4,4,5,5-tetramethyl-1,3,2-dioxaborine pentan-2-yl)aniline (295.2 mg, 1.25 mmol), sodium carbonate (264 mg, 2.49 mmol) and Pd(PPh$_3$)$_4$ (96 mg, 0.08 mmol). The mixture was kept under nitrogen atmosphere and stirred at 90° C. for 6 h. After cooling to room temperature, it was concentrated under reduced pressure. The residue was dissolved in an appropriate amount of water and extracted with ethyl acetate (50 mL×3). The combined organic phases were washed with saturated brine (50 mL×2), dried over anhydrous sodium sulfate, and filtered. The filtrate was concentrated. The resulting residue was purified by silica gel column chromatography (PE/EA=1/1) to give the product tert-butyl 4-(4-amino-5-bromopyrrolo[2,1-f][1,2,4]triazin-7-yl)piperidine-1-carboxylate (470 mg, 99.3% yield) as a yellow solid. MS (ESI) m/z 427.2 [M+H]+.

Step 2. tert-butyl 4-(4-amino-5-(2-fluoro-4-(2-oxo-1-phenyl-1,2,4,5,6,7-hexahydropyrazolo[1,5-a]pyridine-3-carboxamido)phenyl)pyrrolo[2,1-f][1,2,4]triazin-7-yl)piperidine-1-carboxylate At room temperature, to a solution of tert-butyl 4-(4-amino-5-bromopyrrolo[2,1-f][1,2,4]triazin-7-yl)piperidine-1-carboxylate (470 mg, 1.1 mmol), 2-oxo-1-phenyl-1,2,4,5,6,7-hexahydropyrazolo[1,5-a]pyridine-3-carboxylic acid (312.5 mg, 1.21 mmol) was added EDCI (358.5 mg, 1.87 mmol). The mixture was stirred at 45° C. for 16 h. After cooling, the mixture was diluted with water H$_2$O (20 mL), extracted twice with dichloromethane (30 mL×2). The combined organic phases were washed with saturated brine (50 mL×2), dried with anhydrous Na$_2$SO$_4$, and filtered. The filtration was concentrated, and purified by silica gel column chromatography (MeOH/DCM=5/95) to obtain the product tert-butyl 4-(4-amino-5-(2-fluoro-4-(2-oxo-1-phenyl-1,2,4,5,6,7-hexahydropyrazolo[1,5-a]pyridine-3-carboxamido)phenyl)pyrrolo[2,1-f][1,2,4]triazin-7-yl)piperidine-1-carboxylate (647 mg, 70.46% yield) as a yellow solid. MS (ESI) m/z 666.7 [M+H]+.

Step 3. N-(4-(4-amino-7-(piperidin-4-yl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide To a solution of tert-butyl 4-(4-amino-5-(2-fluoro-4-(2-oxo-1-phenyl-1,2,4,5,6,7-hexahydropyrazolo[1,5-a]pyridine-3-carboxamido)phenyl)pyrrolo[2,1-f][1,2,4]triazin-7-yl)piperidine-1-carboxylate (647 mg, 0.97 mmol) in dioxane (4 M, 10 mL) was added to a solution of HCl in dioxane (10 mL). After the mixture was stirred at room temperature for 6 h, it was concentrated under reduced pressure to obtain the product N-(4-(4-amino-7-(piperidin-4-yl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide (500 mg, 63.68% yield) as a white solid. MS (ESI) m/z 566.7 [M+H]+.

Step 4. N-(4-(4-amino-7-(1-isobutyrylpiperidin-4-yl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide To a solution of N-(4-(4-amino-7-(piperidin-4-yl)pyrrolo [2,1-f][1,2,4]triazin-5-yl)-3-fluorophenyl)-2-oxo-1-phenyl-1,2,4,5,6,7-hexahydropyrazolo[1,5-a]pyridine-3-carboxamide (500 mg, 0.88 mmol) and DIEA (342 mg, 2.65 mmol) in dichloromethane (20 mL) was added isobutyryl chloride (94 mg, 0.88 mmol). The mixture was stirred at 0° C. for 3 h, then diluted with water (20 mL), and extracted twice with dichloromethane (30 mL×2). The combined organic phases were washed with saturated brine (20 mL×2), dried over anhydrous sodium sulfate, then filtered. The filtrate was concentrated. And the title product, N-(4-(4-amino-7-(1-isobutyrylpiperidin-4-yl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide (8 mg, 1.43%) was obtained by purified with preparative HPLC (Gemini-C18 150×21.2 mm, 5 um. ACN—H$_2$O (0.1% TFA)=30%-50%) as a white solid. LCMS: t$_R$=1.108 min, column (HALO C18 4.6*50 mm, 2.7 μm), MS (ESI) m/z 636.6 [M+H]+. $^1$H NMR: (400 MHz, DMSO) δ 10.83 (s, 1H), 7.91 (s, 1H), 7.84 (d, J=12.1 Hz, 1H), 7.59 (t, J=7.5 Hz, 2H), 7.54-7.45 (m, 3H), 7.36-7.24 (m, 2H), 6.53 (s, 1H), 4.54 (d, J=11.7 Hz, 1H), 4.06 (d, J=12.0 Hz, 1H), 3.57 (d, J=5.3 Hz, 2H), 3.20 (t, J=10.9 Hz, 3H), 2.94-2.86 (m, 1H), 2.74-2.63 (m, 1H), 2.13-1.92 (m, 4H), 1.87-1.77 (m, 2H), 1.67-1.40 (m, 3H), 1.01 (t, J=6.4 Hz, 6H).

Example 17. N-(4-(4-amino-7-(1-isobutyrylpiperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide

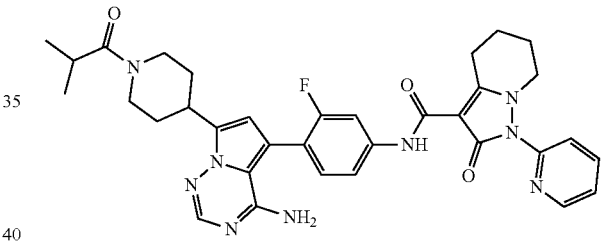

Step 1. tert-butyl 4-(4-aminopyrrolo[2,1-f][1,2,4]triazin-7-yl)-3,6-dihydropyridine-1(2H)-carboxylate To a mixture of 7-bromopyrrolo[2,1-f][1,2,4]triazin-4-amine (4.0 g, 18.8 mmol) in 1,4-dioxane and H$_2$O (40 mL/10 mL) was added tert-butyl 4-(4-aminopyrrolo[2,1-f][1,2,4] triazin-7-yl)-3,6-dihydropyridine-1(2H)-carboxylate (8.75 g, 28.2 mmol), sodium carbonate (2.99 g, 28.2 mmol), and Pd(PPh$_3$)$_4$ (2.18 g, 1.8 mmol). The mixture was stirred at 80° C. for 6 h under nitrogen atmosphere. After cooling, the mixture was concentrated. After diluted with water (100 mL), extracted twice with dichloromethane (100 mL×2), then the mixture was washed with saturated brine, dried over anhydrous sodium sulfate, filtered. The filtrate was concentrated via vacuum. The residue was purified by column chromatography (DCM/MeOH=20/1) to give tert-butyl 4-(4-aminopyrrolo[2,1-f][1,2,4]triazin-7-yl)-3,6-dihydropyridine-1(2H)-carboxylate (7.0 g, 83%) as a white solid. MS (ESI) m/z 316.1 [M+H]+.

Step 2. tert-butyl 4-(4-aminopyrrolo[2,1-f][1,2,4]triazin-7-yl)piperidine-1-carboxylate To a solution of tert-butyl 4-(4-aminopyrrolo[2,1-f][1,2, 4]triazin-7-yl)-3,6-dihydropyridine-1(2H)-carboxylate preparing in previous step in methanol (200 mL) was added Pd/C (10% Pd, 54.55% H$_2$O, 0.47 g). The mixture was stirred under a hydrogen atmosphere (0.4 MPa) at room temperature for 16 h. The mixture was filtered. And the filtrate was concentrated. The residue was purified by column Chromatographic separation (DCM/MeOH=20/1) to give the product tert-butyl 4-(4-aminopyrrolo[2,1-f][1,2,4]triazin-7-yl)piperidine-1-carboxylate (2.7 g, 37%) as a white solid. MS (ESI) m/z 318.1 [M+H]+. $^1$H NMR: (300 MHz, DMSO) δ 7.79 (s, 1H), 7.59 (s, 2H), 6.79 (d, J=4.2 Hz, 1H), 6.42 (d, J=4.5 Hz, 1H), 4.03 (d, J=11.1 Hz, 2H), 3.25-3.17 (m, 1H), 2.94-2.76 (m, 2H), 1.93 (d, J=11.4 Hz, 2H), 1.51-1.43 (m, 2H), 1.39 (s, 9H).

Step 3. tert-butyl 4-(4-amino-5-bromopyrrolo[2,1-f][1,2,4]triazin-7-yl)piperidine-1-carboxylate At −20° C., tert-butyl 4-(4-aminopyrrolo[2,1-f][1,2,4]triazin-7-yl)piperidine-1-carboxylate (1.2 g, 3.8 mmol) in dichloromethane (40 mL) was added NBS (0.61 g, 3.4 mmol). The mixture was stirred for 2 h. Water (50 mL) was added to the resulting mixture, and extracted twice with dichloromethane (50 mL×2). The combined organic phases were washed with saturated brine (50 mL), dried over anhydrous sodium sulfate, then filtered. The solution was removed via vacuum. The residue was purified by column chromatography (DCM/MeOH=20/1) to obtain the product tert-butyl 4-(4-amino-5-bromopyrrolo[2,1-f][1,2,4]triazin-7-yl)piperidine-1-carboxylate (1.16 g, 74%) as a white solid. MS (ESI) m/z 395.7 [M+H]+.

Step 4. 5-bromo-7-(piperidin-4-yl)pyrrole[2,1-f][1,2,4]triazin-4-amine

At room temperature, tert-butyl 4-(4-amino-5-bromopyrrolo[2,1-f][1,2,4]triazin-7-yl)piperidine-1-carboxylate (610 mg, 1.53 mmol) in dioxane (10 mL) was added hydrochloric acid solution (1.91 mL, 7.67 mmol, 4M in dioxane). The mixture was stirred for 2 h. The solvent was removed in vacuum and concentrated to give the product 5-bromo-7-(piperidin-4-yl)pyrrolo[2,1-f][1,2,4]triazin-4-amine (455 mg, 96%) as a white solid. MS (ESI) m/z 296.0 [M+H]+.

Step 5. 1-(4-(4-Amino-5-bromopyrrolo[2,1-f][1,2,4]triazin-7-yl)piperidin-1-yl)-2-methylpropan-1-one To a solution of 5-bromo-7-(piperidin-4-yl)pyrrolo[2,1-f][1,2,4]triazin-4-amine (455 mg, 1.53 mmol) in dichloromethane (10 mL) were added triethylamine (467 mg, 4.66 mmol), tert-butyryl chloride (163 mg, 1.53 mmol) The mixture was stirred at room temperature for 2 h. Water (30 mL) was added to the mixture, and extracted twice with dichloromethane (30 mL×2). The combined organic phases were washed with saturated brine (50 mL), dried over anhydrous sodium sulfate, then filtered. The filtrate was concentrated in vacuo. The residue was purified by column chromatography (DCM/MeOH=20/1) to obtain the product 1-(4-(4-amino-5-bromopyrrolo[2,1-f][1,2,4]triazin-7-yl)piperidin-1-yl)-2-methylpropan-1-one (330 mg, 56%) as a white solid. MS (ESI) m/z 366.0 [M+H]+.

Step 6. 1-(4-(4-amino-5-(4-amino-2-fluorophenyl)pyrrolo[2,1-f][1,2,4]triazin-7-yl)piperidine-1-yl)-2-methylpropan-1-one To a solution of 1-(4-(4-amino-5-bromopyrrolo[2,1-f][1,2,4]triazin-7-yl)piperidin-1-yl)-2-methylpropan-1-one (300 mg, 0.80 mmol) in 1,4-dioxane and water (10 mL/2 mL) mixed solution was added 3-fluoro-4-(4,4,5,5-tetramethyl-1,3,2-dioxaborolan-2-yl)aniline (233 mg, 0.99 mmol), sodium carbonate (131 mg, 1.23 mmol), and Pd(PPh$_3$)$_4$ (95 mg, 0.083 mmol) under nitrogen atmosphere. The mixture was stirred at 80° C. for 6 h. After cooling, the solvent was removed in vacuo. Water (50 mL) was added, and extracted twice with dichloromethane (50 mL×2). The organic phase was washed with saturated brine (50 mL), dried over anhydrous sodium sulfate, filtrated, and concentrated. The residue was purified by column chromatography (DCM/MeOH=20/1) to obtain the product 1-(4-(4-amino-5-(4-amino-2-fluorophenyl)pyrrolo[2,1-f][1,2,4]triazin-7-yl)piperidine-1-yl)-2-methylpropan-1-one (230 mg, 68%) as a white solid. MS (ESI) m/z 397.1 [M+H]+.

Step 7. N-(4-(4-amino-7-(1-isobutyrylpiperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide To 1-(4-(4-amino-5-(4-amino-2-fluorophenyl)pyrrolo[2,1-f][1,2,4]triazin-7-yl)piperidine- To a mixture of 1-yl)-2-methylpropan-1-one (230 mg, 0.58 mmol) in dichloromethane (20 mL) was added 2-oxo-1-(pyridin-2-yl)-1,2,4,5,6,7-hexahydropyrazolo[1,5-a]pyridine-3-carboxylic acid (151 mg, 0.58 mmol), EDCI (167 mg, 0.87 mmol), HOAT (119 mg, 0.87 mmol) and diisopropylethylamine (225 mg, 1.74 mmol), the mixture was stirred at 50° C. for 16 h. After cooling to room temperature, water (30 mL) was added, extracted twice with dichloromethane (30 mL×2), the combined organic phase was washed with saturated brine (50 mL), dried over anhydrous sodium sulfate, filtered, and concentrated. The residue was purified with column chromatography (DCM/MeOH=20/1), and recrystallized (MeOH) to give the product N-(4-(4-amino-7-(1-isobutyrylpiperidin-4-yl)pyrrolo[2,1-f][1,2,4]triazin-5-yl)-3-fluorophenyl)-2-oxo-1-(pyridin-2-yl)-1,2, 4,5,6,7-Hexahydropyrazolo[1,5-a]pyridine-3-carboxamide (147.5 mg, 40%) as a white solid. LCMS: t$_R$=1.144 min, column (HALO C18 4.6*50 mm, 2.7 μm), MS (ESI) m/z 638.1 [M+H]+. $^1$H NMR: (400 MHz, DMSO) δ 10.65 (s, 1H), 8.61-8.58 (m, 1H), 8.10-8.06 (m, 1H), 7.91 (s, 1H), 7.86-7.82 (m, 1H), 7.74 (d, J=8.0 Hz, 1H), 7.50-7.45 (m, 1H), 7.36-7.30 (m, 2H), 6.54 (s, 1H), 4.54 (d, J=12.0 Hz, 1H), 4.06 (d, J=12.2 Hz, 1H), 3.93 (t, J=5.8 Hz, 2H), 3.44-3.37 (m, 1H), 3.25 (t, J=6.4 Hz, 2H), 3.22-3.14 (m, 1H), 2.94-2.87 (m, 1H), 2.70-2.65 (m, 1H), 2.10-1.98 (m, 4H), 1.87-1.81 (m, 2H), 1.63-1.46 (m, 2H), 1.01 (t, J=6.6 Hz, 6H).

Example 18. N-(4-(4-amino-7-(1-isobutyrylpiperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide

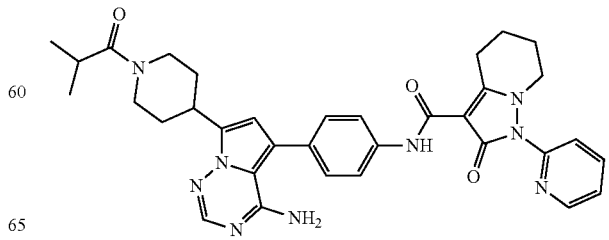

Step 1. tert-butyl 4-(4-amino-5-(4-(2-oxo-1-(pyridin-2-yl)-1,2,4,5,6,7-hexahydropyrazolo[1,5-a]pyridine-3-carboxamido)phenyl)pyrrolo[2,1-f][1,2,4]triazin-7-yl)piperidine-1-carboxylate At room temperature, to a solution of tert-butyl 4-(4-amino-5-(4-aminophenyl)pyrrolo[2,1-f][1,2,4]triazin-7-yl)piperidine-1-carboxylate (205 mg, 0.50 mmol), 2-oxo-1-(pyridin-2-yl)-1,2,4,5,6,7-hexahydropyrazolo[1,5-a]pyridine-3-carboxylic acid (103.8 mg, 0.40 mmol), HOAt (103 mg, 0.75 mmol) and DIEA (194 mg, 1.5 mmol) in dichloromethane (30 mL) was added EDCI (144 mg, 0.75 mmol). The mixture was stirred for 16 h at 45° C. After cooling, it was diluted with water (20 mL), and extracted three times with dichloromethane (30 mL×3). The combined organic phases were washed twice with saturated brine (50 mL×2), dried over anhydrous sodium sulfate, and concentrated in vacuo. The residue was purified by column chromatography (MeOH/DCM=5/95) to obtain the product tert-butyl 4-(4-amino-5-(4-(2-oxo-1-(pyridin-2-yl)-1,2,4,5,6,7-hexahydropyrazolo[1,5-a]pyridine-3-carboxamido)phenyl)pyrrolo[2,1-f][1,2,4]triazin-7-yl)piperidine-1-carboxylate (250 mg, 61.39% yield) as a yellow solid. MS (ESI) m/z 649.7 [M+H]+.

Step 2. N-(4-(4-amino-7-(piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide To a solution of tert-butyl 4-(4-amino-5-(4-(2-oxo-1-(pyridin-2-yl)-1,2,4,5,6,7-hexahydropyrazolo[1,5-a]pyridine-3-carboxamido)phenyl)pyrrolo[2,1-f][1,2,4]triazin-7-yl)piperidine-1-carboxylate (250 mg, 0.38 mmol) in 1,4-dioxane (10 mL) was added hydrochloride solution of dioxane (4 M, 10 mL). The mixture was stirred at room temperature for 6 h. The solvent was removed in vacuo to give the product N-(4-(4-amino-7-(piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide (180 mg, 68.19% yield) as a white solid. MS (ESI) m/z 550.3 [M+H]+.

Step 3. N-(4-(4-amino-7-(1-isobutyrylpiperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide To a solution of N-(4-(4-amino-7-(piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide (300 mg, 0.55 mmol) and triethylamine (275.6 mg, 2.73 mmol) in dichloromethane (20 mL) was added isobutyryl chloride (46.5 mg, 0.43 mmol). The mixture was stirred at 0° C. for 3 h, then diluted with water (20 mL), extracted twice with dichloromethane DCM (30 mL×2). The combined organic phases were washed with saturated brine (30 mL×2), dried over anhydrous sodium sulfate, and concentrated in vacuo. The residue was purified by preparative HPLC (Gemini-C18 150×21.2 mm, 5 um, ACN—H$_2$O (0.1% FA)=30%-50%) to give the product N-(4-(4-amino-7-(1-isobutyrylpiperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide (78.5 mg, 23.18%) as a white solid. LCMS: $t_R$=1.073 min, column (HALO C18 4.6*50 mm, 2.7 μm), MS (ESI) m/z 619.7 [M+H]+. $^1$H NMR: (400 MHz, DMSO) δ 10.54 (s, 1H), 8.59 (d, J=4 Hz, 1H), 8.08 (t, J=7.6 Hz, 1H), 7.90 (s, 1H), 7.75 (d, J=8 Hz, 1H), 7.71 (d, J=8 Hz, 1H), 7.50-7.45 (m, 1H), 7.40 (d, J=8 Hz, 1H), 6.57 (s, 1H), 4.54 (d, J=12.0 Hz, 1H), 4.06 (d, J=12.4 Hz, 1H), 3.92 (t, J=5.2 Hz, 2H), 3.43-3.39 (m, 1H), 3.26 (t, J=5.6 Hz, 2H), 3.21-3.17 (m, 1H), 2.94-2.87 (m, 1H), 2.72-2.68 (m, 1H), 2.12-1.97 (m, 4H), 1.86-1.81 (m, 2H), 1.63-1.59 (m, 1H), 1.53-1.47 (m, 1H), 1.01 (t, J=6.4 Hz, 6H).

Example 19. N-(4-(4-amino-7-(1-isobutyrylpiperidin-4-yl)pyrrolo[2,1-f][1,2,4]triazin-5-yl)phenyl)-2-oxo-1-phenyl-1,2,4,5,6,7-hexahydropyrazolo[1,5-a]pyridine-3-carboxamide

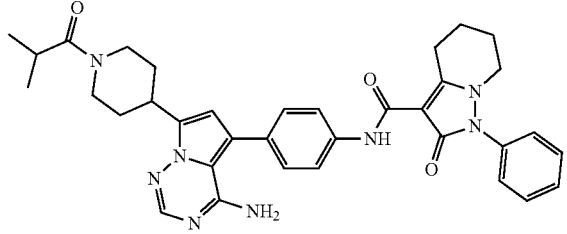 [SMILES: CC(C)C(=O)N1CCC(c2cc(-c3ccc(NC(=O)c4c5n(n(-c6ccccc6)c4=O)CCCC5)cc3)c3c(N)ncnn23)CC1]

Step 1. tert-butyl 4-(4-amino-5-(4-aminophenyl)pyrrolo[2,1-f][1,2,4]triazin-7-yl)piperidine-1-carboxylate To a solution of tert-butyl 4-(4-amino-5-bromopyrrolo[2,1-f][1,2,4]triazin-7-yl)piperidine-1-carboxylate (330 mg, 0.83 mmol) were added 4-(4,4,5,5-tetramethyl-1,3,2-dioxaborolane-2-yl)aniline (273.8 mg, 1.25 mmol), sodium carbonate (264 mg, 2.49 mmol), and Pd(PPh$_3$)$_4$ (96 mg, 0.08 mmol) under nitrogen atmosphere. The mixture was heated to 90° C. and stirred for 6 h. After cooling, the solvent was removed in vacuo. The residue was diluted with water (30 mL), then extracted with ethyl acetate (50 mL×3). The combined organic phases were washed with saturated brine (50 mL×2), dried over anhydrous sodium sulfate, concentrated in vacuo. And the residue was purified by column chromatography (PE/EA=1/1) to obtain the product tert-butyl 4-(4-amino-5-(4-aminophenyl)pyrrolo[2,1-f][1,2,4]triazin-7-yl)piperidine-1-carboxylate (422 mg, 99.3% yield) as a yellow solid. MS (ESI) m/z 408.9 [M+H]+.

Step 2. tert-butyl 4-(4-amino-5-(4-(2-oxo-1-phenyl-1,2,4,5,6,7-hexahydropyrazolo[1,5-a]pyridine-3-carboxamido)phenyl)pyrrolo[2,1-f][1,2,4]triazin-7-yl)piperidine-1-carboxylate At room temperature, to a solution of tert-butyl 4-(4-amino-5-(4-aminophenyl)pyrrolo[2,1-f][1,2,4]triazin-7-yl)piperidine-1-carboxylate (422 mg, 1.03 mmol), 2-oxo-1-phenyl-1,2,4,5,6,7-hexahydropyrazolo[1,5-a]pyridine-3-carboxylic acid (293 mg, 1.13 mmol), HOAt (240 mg, 1.75 mmol) and DIEA (399 mg, 3.1 mmol) in dichloromethane (30 mL) was added EDCI (335.7 mg, 1.75 mmol). The mixture was warmed to 45° C. and stirred for 16 h. After cooling, the mixture was diluted with water (10 mL), then extracted twice with dichloromethane (30 mL×2). The combined organic phases were washed with saturated brine (50 mL×2), dried over anhydrous sodium sulfate, concentrated in vacuo. The residue was purified with column chromatography (MeOH/DCM=5/95) to obtain the product tert-butyl 4-(4-amino-5-(4-(2-oxo-1-phenyl-1,2,4,5,6,7-hexahydropyrazolo[1,5-a]pyridine-3-carboxamido)phenyl)pyrrolo[2,1-f][1,2,4]triazin-7-yl)piperidine-1-carboxylate (564 mg, 67.42% yield) as a yellow solid. MS (ESI) m/z 648.7 [M+H]+.

Step 3. N-(4-(4-amino-7-(piperidin-4-yl)pyrrolo[2,1-f][1,2,4]triazin-5-yl)phenyl)-2-oxo-1-phenyl-1,2,4,5,6,7-hexahydropyrazolo[1,5-a]pyridine-3-carboxamide To a mixture of tert-butyl 4-(4-amino-5-(4-(2-oxo-1-phenyl-1,2,4,5,6,7-hexahydropyrazolo[1,5-a]pyridine-3-carboxamido)phenyl)pyrrolo[2,1-f][1,2,4]triazin-7-yl)piperidine-1-carboxylate (564 mg, 0.87 mmol) in 1,4-dioxane (10 mL) was added to the 1,4-dioxane solution of HCl (4 M, 10 mL). The mixture was stirred at room temperature for 6 h. The residue was concentrated in vacuo to give the product N-(4-(4-amino-7-(piperidin-4-yl)pyrrolo[2,1-f][1,2,4]triazin-5-yl)phenyl)-2-oxo-1-phenyl-1,2,4,5,6,7-hexahydropyrazolo[1,5-a]pyridine-3-carboxamide (400 mg, 62.85% yield) as a white solid. MS (ESI) m/z 548.8 [M+H]+.

Step 4. N-(4-(4-amino-7-(1-isobutyrylpiperidin-4-yl)pyrrolo[2,1-f][1,2,4]triazin-5-yl)phenyl)-2-oxo-1-phenyl-1,2,4,5,6,7-hexahydropyrazolo[1,5-a]pyridine-3-carboxamide At 0° C., to a mixture of N-(4-(4-amino-7-(piperidin-4-yl)pyrrolo[2,1-f][1,2,4]triazin-5-yl)phenyl)-2-oxo-1-phenyl-1,2,4,5,6,7-hexahydropyrazolo[1,5-a]pyridine-3-carboxamide (484 mg, 0.88 mmol) and triethylamine (267.3 mg, 2.65 mmol) in dichloromethane (20 mL) was added isobutyryl chloride (94 mg, 0.88 mmol). The mixture was stirred for another 3 h. The mixture was diluted with water (30 mL), extracted twice with dichloromethane (30 mL×2). The combined organic phases were washed with saturated brine (30 mL×2), dried over anhydrous sodium sulfate, concentrated in vacuo. And the residue was purified by preparative HPLC (Gemini-C18 150×21.2 mm, 5 um. ACN—H$_2$O (0.1% FA)=25%-50%) to give the product N-(4-(4-amino-7-(1-isobutyrylpiperidin-4-yl)pyrrolo[2,1-f][1,2,4]triazin-5-yl)phenyl)-2-oxo-1-phenyl-1,2,4,5,6,7-hexahydropyrazolo[1,5-a]pyridine-3-carboxamide (148 mg, 26.20% yield) as a white solid. LCMS: $t_R$=1.104 min, column (HALO C18 4.6*50 mm, 2.7 μm), MS (ESI) m/z 618.7 [M+H]+. $^1$H NMR: (400 MHz, DMSO) δ 10.70 (s, 1H), 7.90 (s, 1H), 7.69 (d, J=8.5 Hz, 2H), 7.59 (t, J=7.5 Hz, 2H), 7.55-7.44 (m, 3H), 7.40 (d, J=8.5 Hz, 2H), 6.56 (s, 1H), 4.54 (d, J=12.6 Hz, 1H), 4.07 (d, J=12.3 Hz, 1H), 3.57 (t, J=5.7 Hz, 2H), 3.41 (d, J=11.6 Hz, 1H), 3.20 (dd, J=14.6, 8.4 Hz, 3H), 2.95-2.86 (m, 1H), 2.75-2.64 (m, 1H), 2.12-1.93 (m, 4H), 1.86-1.75 (m, 2H), 1.68-1.43 (m, 2H), 1.01 (t, J=6.8 Hz, 6H).

Example 20. N-(4-(4-amino-7-((1r,4r)-4-hydroxycyclohexyl)pyrrole[2,1-f][1,2,4]triazin-5-yl)phenyl)-2-oxo-1-(pyridin-2-yl)-1,2,4,5,6,7-hexahydropyrazol[1,5-a]pyridine-3-carboxamide

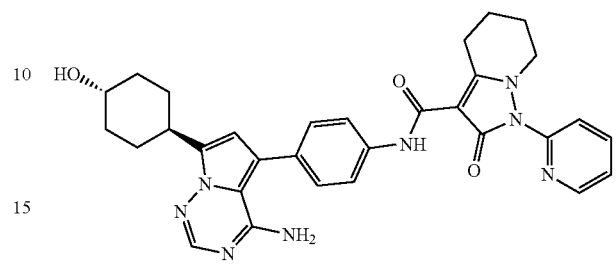

At room temperature, to a mixture of (1s,4s)-4-(4-amino-5-(4-aminophenyl)pyrrolo[2,1-f][1,2,4]triazin-7-yl) cyclohexyl-1-alcohol (65 mg, 0.20 mmol), 2-oxo-1-(pyridin-2-yl)-1,2,4,5,6,7-hexahydropyrazolo[1,5-a]pyridine-3-carboxylic acid (62.5 mg, 0.24 mmol), HOAT (41.1 mg, 0.30 mmol) and DIEA (77.8 mg, 0.60 mmol) in dichloromethane (30 mL) was added EDCI (57.8 mg, 0.30 mmol). The mixture was stirred at 45° C. for 16 h. After cooling, it was diluted with water (10 mL), and extracted twice with dichloromethane (30 mL×2). The combined organic phases were washed with saturated brine (50 mL×2), dried over anhydrous sodium sulfate, concentrated under reduced pressure. The residue was purified by preparative HPLC (Gemini-C18 150×21.2 mm, 5 um. ACN—H$_2$O (0.1% FA)=25%-50%) to give the product N-(4-(4-amino-7-((1r,4r)-4-hydroxycyclohexyl)pyrrole[2,1-f][1,2,4]triazin-5-yl)phenyl)-2-oxo-1-(pyridin-2-yl)-1,2,4,5,6,7-hexahydropyrazol[1,5-a]pyridine-3-carboxamide (49.9 mg, 43.98% yield) as a white solid. LCMS: $t_R$=1.028 min, column (HALO C18 4.6*50 mm, 2.7 μm), MS (ESI) m/z 564.7 [M+H]+. $^1$H NMR: (400 MHz, DMSO) δ 10.53 (s, 1H), 8.59 (dd, J=4.9, 1.1 Hz, 1H), 8.07 (td, J=7.9, 1.9 Hz, 1H), 7.88 (s, 1H), 7.73 (dd, J=19.3, 8.4 Hz, 3H), 7.50-7.44 (m, 1H), 7.39 (d, J=8.5 Hz, 2H), 6.50 (s, 1H), 4.63 (s, 1H), 3.92 (t, J=5.9 Hz, 2H), 3.47 (s, 1H), 3.26 (t, J=6.2 Hz, 2H), 3.09-2.98 (m, 1H), 2.07-1.79 (m, 8H), 1.49 (dd, J=25.2, 10.5 Hz, 2H), 1.30 (dt, J=27.6, 13.8 Hz, 2H).

Example 21. N-(5-(4-amino-7-(4-hydroxycyclohexyl)pyrrolo[2,1-f][1,2,4]triazin-5-yl)pyridin-2-yl)-2-oxo-1-phenyl-1,2,4,5,6,7-hexahydropyrazolo[1,5-a]pyridine-3-carboxamide

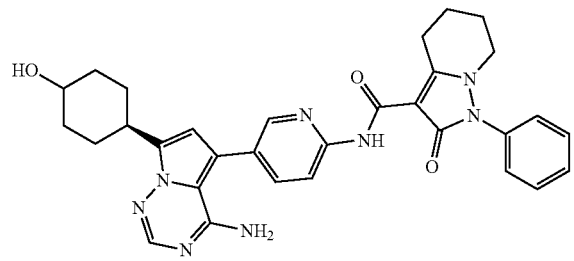

To a solution of (6-(2-oxo-1-phenyl-1,2,4,5,6,7-hexahydropyrazolo[1,5-a]pyridine-3-carboxamido)pyridin-3-yl)boronic acid (73 mg, 0.20 mmol) in 1,4-dioxane/H$_2$O (20 mL/4 mL) were added 4-(4-amino-5-bromopyrrolo[2,1-f][1,2,4]triazin-7-yl)cyclohexan-1-ol (51 mg, 0.16 mmol), sodium carbonate (26 mg, 0.24 mmol), and Pd(PPh$_3$)$_4$ (19 mg, 0.016 mmol) under nitrogen atmosphere. The mixture was stirred at 80° C. for 6 h. After cooling to room temperature, the mixture was concentrated in vacuo, then diluted with water (50 mL), and extracted twice with dichloromethane (50 mL×2). The combined organic phases were washed with saturated brine (50 mL), dried over anhydrous sodium sulfate, filtered. The filtrate was concentrated. The residue was purified by preparative HPLC (Gemini-C18 150×21.2 mm, 5 um, ACN—H$_2$O (0.1% FA) 15%-40%) to obtain the product N-(5-(4-amino-7-(4-hydroxycyclohexyl)pyrrolo[2,1-f][1,2,4]triazin-5-yl)pyridin-2-yl)-2-oxo-1-phenyl-1,2,4,5,6,7-hexahydropyrazolo[1,5-a]pyridine-3-carboxamide (14.0 mg, 16%) as a white solid. LCMS: t$_R$=1.077 min, column (HALO C18 4.6*50 mm, 2.7 μm), MS (ESI) m/z 565.1 [M+H]+. $^1$H NMR: (400 MHz, DMSO) δ 11.04 (s, 1H), 8.33-8.27 (m, 2H), 7.90 (s, 1H), 7.81 (dd, J=8.6, 2.3 Hz, 1H), 7.60 (t, J=7.5 Hz, 2H), 7.53-7.46 (m, 3H), 6.56 (s, 1H), 4.62 (s, 1H), 3.58 (t, J=6.0 Hz, 2H), 3.47 (s, 1H), 3.22 (t, J=6.2 Hz, 2H), 3.05-3.01 (m, 1H), 2.05-1.91 (m, 6H), 1.85-1.80 (m, 2H), 1.53-1.45 (m, 2H), 1.36-1.29 (m, 2H).

Example 22. N-(4-(4-amino-7-((1r,4r)-4-hydroxycyclohexyl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide

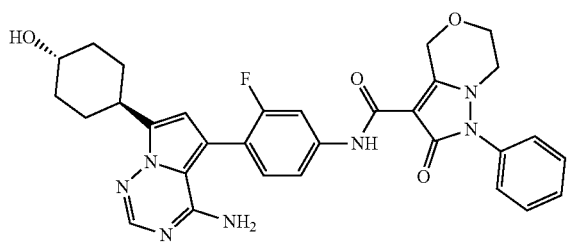 [SMILES: Nc1ncnn2c1c(-c1ccc(NC(=O)c3c4n(n(-c5ccccc5)c3=O)CCOC4)cc1F)cc2[C@H]1CC[C@H](O)CC1]

Step 1. 7-(1,4-dioxaspiro[4.5]decane-7-en-8-yl)pyrrolo[2,1-f][1,2,4]triazin-4-amine To a mixture of 4-amino-7-bromopyrrolo[2,1-F][1,2,4]triazine (1.5 g, 7 mmol), 4,4,5,5-tetramethyl-2-(1,4-dioxaspiro[4.5]dec-7-en-8-yl)-1,3,2-dioxaborolane (2.24 g, 8.4 mmol), and sodium carbonate (1.5 g, 14 mmol) in dioxane (32 mL)/H$_2$O (8 mL) were added tetrakistriphenylphosphine palladium (0.4 g, 0.3 mmol) under a nitrogen atmosphere. The mixture was stirred at 80° C. for 16 h. After cooling to room temperature, the mixture was concentrated in vacuo. The residue was diluted with ethyl acetate (40 mL), and washed with saturated brine (20 mL×2). The organic phases was separated, dried over anhydrous sodium sulfate, then concentrated, and diluted with ether (30 mL). The mixture was filtered to obtain the product 7-(1,4-dioxaspiro[4.5]decane-7-en-8-yl)pyrrolo[2,1-f][1,2,4]triazin-4-amine (1.5 g, 74% yield) as a gray solid. MS (ESI): 380.0 [M+H]+. $^1$H NMR (400 MHz, CDCl$_3$) δ 8.62 (s, 1H), 7.58 (s, 1H), 5.66 (q, J=7.2 Hz, 1H), 4.22 (qd, J=7.2, 1.6 Hz, 2H), 1.80 (d, J=7.2 Hz, 3H), 1.26 (t, J=7.2 Hz, 3H).

Step 2. 7-(1,4-dioxaspiro[4.5]decane-8-yl)pyrrolo[2,1-f][1,2,4]triazin-4-amine

At 20° C., to a solution of 7-(1,4-dioxaspiro[4.5]decane-7-en-8-yl)pyrrolo[2,1-f][1,2,4]triazine-4-amine (1.5 g, 5.5 mmol), 10% Pd(OH)$_2$ (150 mg) in methanol (30 mL)/dichloromethane (30 mL) was bubbled with hydrogen and stirred for 16 h. After filtration, the filtrate was concentrated to obtain the product 7-(1,4-dioxaspiro[4.5]decane-8-yl)pyrrolo[2,1-f][1,2,4]triazin-4-amine (1.1 g, 69.1% yield) as a yellow solid. MS (ESI): 375.2 [M+H]+.

Step 3. 5-bromo-7-(1,4-dioxaspiro[4.5]decane-8-yl)pyrrolo[2,1-f][1,2,4]triazin-4-amine At −15° C., to a solution of 7-(1,4-dioxaspiro[4.5]decane-8-yl)pyrrolo[2,1-f][1,2,4]triazin-4-amine (1.1 g, 4 mmol) in tetrahydrofuran (30 mL) was added DBNPA (573 mg, 2 mmol). The mixture was warmed to −10° C. and stirred for another 1 h. The mixture was quenched with a saturated solution of Na$_2$SO$_3$ (20 mL), then extracted with ethyl acetate (30 mL×3). The combined organic phases were washed with saturated brine (30 mL×2), dried over anhydrous sodium sulfate, then filtered. The filtrate was concentrated. The residue was diluted with ether (20 mL) and filtered. the filter cake was washed with ether (15 mL), and dried to obtain the product 5-bromo-7-(1,4-dioxaspiro[4.5]decane-8-yl)pyrrolo[2,1-f][1,2,4]triazin-4-amine (1 g, 63% yield) as a gray solid. MS (ESI): 353.1, 355.1 [M+H]+. $^1$H NMR (300 MHz, CDCl$_3$) δ 8.09 (s, 1H), 6.62 (s, 1H), 3.88 (s, 4H), 3.20-3.06 (m, 1H), 2.00-1.94 (m, 2H), 1.76-1.60 (m, 6H).

Step 4. 5-(4-amino-2-fluorophenyl)-7-(1,4-dioxaspiro[4.5]decane-8-yl)pyrrolo[2,1-f][1,2,4]triazin-4-amine To a solution of 5-bromo-7-(1,4-dioxaspiro[4.5]decane-8-yl)pyrrolo[2,1-f][1,2,4]triazin-4-amine (200 mg, 0.57 mmol), 3-fluoro-4-(4,4,5,5-tetramethyl-1,3,2-dioxaborin-2-yl)aniline (148 mg, 0.62 mmol), and sodium carbonate (120 mg, 1.1 mmol) in dioxane and water (v/v=4/1, 40 mL) was added tetrakistriphenylphosphine palladium (32.7 mg, 0.03 mmol). The mixture was heated to 80° C. and stirred for 16 h. After cooling, the mixture was concentrated in vacuo. The residue was diluted with water (20 mL), then extracted three times with ethyl acetate (20 mL×3). The combined organic phases were washed with saturated brine (40 mL×2), dried over anhydrous sodium sulfate, then filtered. The filtrate was concentrated. The residue was purified by column chromatography (DCM/MeOH=30/1) to obtain the product 5-(4-amino-2-fluorophenyl)-7-(1,4-dioxaspiro[4.5]decane-8-yl)pyrrolo[2,1-f][1,2,4]triazin-4-amine (200 mg, 64% yield) as a brown solid. MS (ESI): 384.0 [M+H]+.

Step 5. 4-(4-amino-5-(4-amino-2-fluorophenyl)pyrrolo[2,1-f][1,2,4]triazin-7-yl)cyclohexyl-1-ol To a mixture of 5-(4-amino-2-fluorophenyl)-7-(1,4-dioxaspiro[4.5]decane-8-yl)pyrrolo[2,1-f][1,2,4]triazin-4-amine (200 mg, 0.55 mmol) in tetrahydrofuran (5 mL) was added 1 M HCl (5 mL), and the mixture was stirred at 20° C. for 3 h. After cooling to 0° C., sodium borohydride (62 mg, 1.64 mmol) was added. Then the mixture was warmed to 20° C. and stirred for 1 h. The mixture was concentrated in vacuo. The residue was diluted with water (10 mL), then adjusted to pH=7 with saturated sodium bicarbonate solution (10 mL), and extracted three times with ethyl acetate (20 mL×3). The combined organic phases were washed with saturated brine (30 mL×2), dried over anhydrous sodium sulfate, then filtered. The filtrate was concentrated. The residue was purified by column chromatography (DCM/MeOH=15/1) to obtain the product 4-(4-amino-5-(4-amino-2-fluorophenyl)pyrrolo[2,1-f][1,2,4]triazin-7-yl)cyclohexyl-1-ol (60 mg, 30.5% yield) as a yellow solid. MS (ESI): 342.0 [M+H]+. $^1$H NMR (300 MHz, CDCl$_3$) δ 7.89 (s, 1H), 7.14 (t, J=8.4 Hz, 1H), 6.56-6.48 (m, 2H), 6.45 (s, 1H), 5.56 (s, 2H), 3.92 (s, 1H), 3.75-3.68 (m, 1H), 3.20-3.14 (m, 1H), 2.23-2.04 (m, 4H), 1.55-1.50 (m, 4H).

Step 6. N-(4-(4-amino-7-((1r,4r)-4-hydroxycyclohexyl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide To a solution of 4-(4-amino-5-(4-amino-2-fluorophenyl)pyrrolo[2,1-f][1,2,4]triazin-7-yl)cyclohexyl-1-alcohol (51 mg, 0.15 mmol), 2-oxo-1-phenyl-4H,6H,7H-pyrazolo[3,2-c]morpholine-3-carboxylic acid (39 mg, 0.15 mmol), HOAt (24.7 mg, 0.18 mmol) and DIEA (57.1 mg, 0.45 mmol) in dichloromethane (20 mL) was added EDCI (43 mg, 0.22 mmol). The mixture was heated to 40° C. and stirred for 16 h. After cooling, the mixture was diluted with dichloromethane (30 mL), washed with saturated brine (40 mL×3). After separation, the combined organic phase was washed with anhydrous sodium sulfate, then filter and concentrate in vacuo. Methanol (3 mL) was added dropwise to a flask of the residue. The solid precipitated, and filtered to give the product N-(4-(4-amino-7-((1r,4r)-4-hydroxycyclohexyl)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide (40.6 mg, 45.93% yield) as a white solid. LCMS: $t_R$=1.051 min, column (HALO C18 4.6*50 mm, 2.7 μm), MS (ESI): 584.3 [M+H]+. $^1$H NMR (400 MHz, DMSO) δ 10.54 (s, 1H), 7.89 (s, 1H), 7.82 (d, J=12.4 Hz, 1H), 7.64-7.58 (m, 2H), 7.55-7.51 (m, 3H), 7.35-7.30 (m, 2H), 6.47 (s, 1H), 5.12 (s, 2H), 4.62 (s, 1H), 4.13-4.07 (m, 2H), 3.72-3.68 (m, 2H), 3.48-3.45 (m, 1H), 3.06-3.00 (m, 1H), 2.03 (d, J=12 Hz, 2H), 1.93 (d, J=10 Hz, 2H), 1.54-1.43 (m, 2H), 1.36-1.26 (m, 2H).

Example 23. N-(5-(4-amino-7-((1r,4r)-4-hydroxycyclohexyl)-7H-pyrrolo[2,3-d]triazin-5-yl)pyridin-2-yl)-2-oxo-1-phenyl-2,4,6,7-tetrahydro-1H-pyrazolo[5,1-c][1,4]oxazine-3-carboxamide

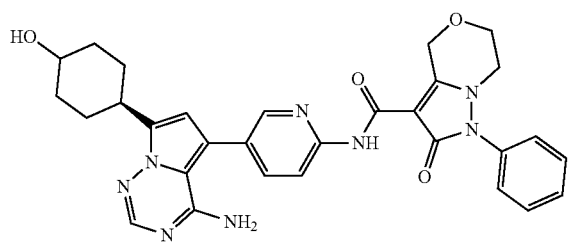

Step 1. N-(5-bromopyridin-2-yl)-2-oxo-1-phenyl-2,4,6,7-tetrahydro-1H-pyrazolo[5,1-c][1,4]oxazine-3-carboxamide 2-oxo-1-phenyl-2,4,6,7-tetrahydro-1H-pyrazolo[5,1-c][1,4]oxazine-3-carboxylic acid (260 mg, 1.0 mmol) was dissolved in thionyl chloride (10 mL). The mixture was warmed to 60° C. and stirred for 4 h. After concentration, the residue was dissolved in dichloromethane (10 mL). 5-bromopyridin-2-amine (174 mg, 1.0 mmol) and triethylamine (304 mg, 3.0 mmol) were added into the mixture. It was heated to room temperature and stirred for 24 h. The mixture was diluted with water (30 mL), extracted twice with dichloromethane (30 mL×2). The organic phase was washed with saturated brine (50 mL), dried over anhydrous sodium sulfate, then filtered. The filtrate was concentrated. And the residue was purified by column chromatography (DCM/MeOH=20/1) to obtain the product N-(5-bromopyridin-2-yl)-2-oxo-1-phenyl-2,4,6,7-tetrahydro-1H-pyrazolo[5,1-c][1,4]oxazine-3-carboxamide (270 mg, 62%) as a white solid. MS (ESI) m/z 414.9 [M+H]+.

Step 2. (6-(2-oxo-1-phenyl-2,4,6,7-tetrahydro-1H-pyrazolo[5,1-c][1,4]oxazine-3-carboxamido)pyridin-3-yl)boronic acid To a solution of N-(5-bromopyridin-2-yl)-2-oxo-1-phenyl-2,4,6,7-tetrahydro-1H-pyrazolo[5,1-c][1,4]oxazine-3-carboxamide (270 mg, 0.65 mmol) in dioxane (20 mL) were added 4,4,4',4',5,5,5',5'-octamethyl-2,2'-bi(1,3,2-dioxaborolane) (248 mg, 0.98 mmol), potassium acetate (192 mg, 1.95 mmol), and Pd(dppf)Cl$_2$*DCM (54 mg, 0.065 mmol) under a nitrogen atmosphere. The mixture was heated to 100° C. and stirred for 6 h. After cooling, the mixture was concentrated in vacuo, diluted with water (50 mL), and washed with dichloromethane (50 mL). The aqueous phase was concentrated to give the product (6-(2-oxo-1-phenyl-2,4,6,7-tetrahydro-1H-pyrazolo[5,1-c][1,4]oxazine-3-carboxamido)pyridin-3-yl)boronic acid (75 mg, 29%) as a yellow solid. MS (ESI) m/z 381.0 [M+H]+.

Step 3. N-(5-(4-amino-7-((1r,4r)-4-hydroxycyclohexyl)-7H-pyrrolo[2,3-d]triazin-5-yl)pyridin-2-yl)-2-oxo-1-phenyl-2,4,6,7-tetrahydro-1H-pyrazolo[5,1-c][1,4]oxazine-3-carboxamide To a solution of (6-(2-oxo-1-phenyl-2,4,6,7-tetrahydro-1H-pyrazolo[5,1-c][1,4]oxazine-3-carboxamido)pyridin-3-yl)boronic acid (73 mg, 0.19 mmol) in dioxane/water (20 mL/4 mL) mixed solution were added 4-(4-amino-5-bromopyrrolo[2,1-f][1,2,4]triazin-7-yl)cyclohexyl-1-ol (50 mg, 0.16 mmol), sodium carbonate (26 mg, 0.24 mmol), and Pd(PPh$_3$)$_4$ (19 mg, 0.016 mmol) under nitrogen atmosphere. The mixture was stirred at 80° C. for 6 h. After cooling, the mixture was concentrated in vacuo, diluted with water (50 mL), and extracted twice with dichloromethane (50 mL×2). The combined organic phases were washed with saturated brine (50 mL), dried over anhydrous sodium sulfate, then filtered. The filtrate was concentrated. The residue was purified by preparative HPLC (Gemini-C18 150×21.2 mm, 5 um, ACN—H$_2$O (0.1% FA) 15%-40%) to give the product N-(5-(4-amino-7-((1r,4r)-4-hydroxycyclohexyl)-7H-pyrrolo[2,3-d]triazin-5-yl)pyridin-2-yl)-2-oxo-1-phenyl-2,4,6,7-tetrahydro-1H-pyrazolo[5,1-c][1,4]oxazine-3-carboxamide (15.8 mg, 18%) as a white solid. LCMS: $t_R$=1.028 min, column (HALO C18 4.6*50 mm, 2.7 μm), MS (ESI) m/z 567.1 [M+H]+. $^1$H NMR: (400 MHz, DMSO) δ 10.78 (s, 1H), 8.34 (d, J=1.8 Hz, 1H), 8.26 (d, J=8.5 Hz, 1H), 7.91 (s, 1H), 7.83 (dd, J=8.5, 2.4 Hz, 1H), 7.63-7.59 (m, 2H), 7.56-7.52 (m, 3H), 6.56 (s, 1H), 5.14 (s, 2H), 4.63 (d, J=4.0 Hz, 1H), 4.10 (t, J=5.0 Hz, 2H), 3.70 (t, J=4.9 Hz, 2H), 3.50-3.45 (m, 1H), 3.07-3.01 (m, 1H), 2.06-2.00 (m, 2H), 1.97-1.90 (m, 2H), 1.53-1.45 (m, 2H), 1.38-1.28 (m, 2H).

Example 24. N-(4-(4-amino-7-((1r,4r)-4-hydroxycyclohexyl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide

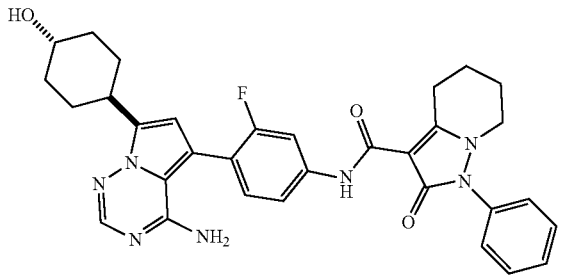 [SMILES: Nc1ncnn2c1c(-c1ccc(NC(=O)c3c4n(n(-c5ccccc5)c3=O)CCCC4)cc1F)cc2[C@H]1CC[C@H](O)CC1]

At room temperature, to a mixture of (1r,4r)-4-(4-amino-5-(4-amino-2-fluorophenyl)pyrrolo[2,1-f][1,2,4]triazine-7-yl)cyclohexyl-1-ol (135 mg, 0.40 mmol), 2-oxo-1-phenyl-1,2,4,5,6,7-hexahydropyrazolo[1,5-a]pyridine-3-carboxylic acid (102.2 mg, 0.40 mmol), HOAT (81.3 mg, 0.59 mmol) and DIEA (153.1 mg, 0.19 mmol) in dichloromethane (30 mL) was added EDCI (113.7 mg, 0.59 mmol). The mixture was warmed to 45° C. and stirred for 16 h. After cooling, the mixture was diluted with water (20 mL), extracted twice with dichloromethane (30 mL×2). The combined organic phases were washed with saturated brine (50 mL×2), dried over anhydrous sodium sulfate, then filtered. The filtrate was concentrated. The residue was purified by preparative HPLC (Gemini-C18 150×21.2 mm, 5 um·ACN—H$_2$O (0.1% FA)=30%-50%) to give the product N-(4-(4-amino-7-((1r,4r)-4-hydroxycyclohexyl)pyrrolo[2,1-f][1,2,4]triazin-5-yl)-3-fluorophenyl)-2-oxo-1-phenyl-1,2,4,5,6,7-hexahydropyrazolo[1,5-a]pyridine-3-carboxamide (65.2 mg, 28.22% yield) as a white solid. LCMS: t$_R$=1.054 min, column (HALO C18 4.6*50 mm, 2.7 μm), MS (ESI) m/z 581.7 [M+H]+. $^1$H NMR: (400 MHz, DMSO) δ 10.82 (s, 1H), 7.89 (s, 1H), 7.83 (dd, J=12.5, 1.8 Hz, 1H), 7.59 (t, J=7.5 Hz, 2H), 7.55-7.44 (m, 3H), 7.36-7.24 (m, 2H), 6.48 (s, 1H), 4.62 (s, 1H), 3.58 (t, J=5.7 Hz, 2H), 3.52-3.42 (m, 1H), 3.20 (dd, J=13.5, 7.2 Hz, 2H), 3.07-2.97 (m, 1H), 2.10-1.88 (m, 6H), 1.87-1.75 (m, 2H), 1.48 (dd, J=25.2, 10.6 Hz, 2H), 1.37-1.21 (m, 2H).

Example 25. N-(4-(4-amino-7-(1-(2-fluoro-2-methylpropanoyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide

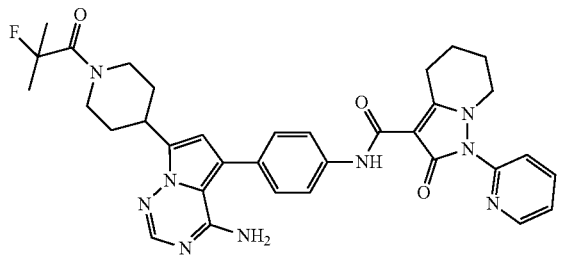 [SMILES: CC(C)(F)C(=O)N1CCC(c2cc(-c3ccc(NC(=O)c4c5n(n(-c6ccccn6)c4=O)CCCC5)cc3)c3c(N)ncnn23)CC1]

Step 1. 1-(4-(4-Amino-5-bromopyrrolo[2,1-f][1,2,4]triazin-7-yl)piperidin-1-yl)-2-fluoro-2-methylpropan-1-one At room temperature, to a solution of 5-bromo-7-(piperidin-4-yl)pyrrolo[2,1-f][1,2,4]triazin-4-amine (1.0 g, 3.4 mmol), 2-fluoro-2-methylpropionic acid (470 mg, 4.42 mmol), HOAT (690 mg, 5.1 mmol) and DIEA (2.19 g, 17.0 mmol) in DMF (50 mL) was added EDCI (980 mg, 5.1 mmol). The mixture was stirred at room temperature for 8 h. The mixture was diluted with H$_2$O (150 mL), extracted with EtOAc (100 mL×3). The combined organic layers were washed with brine (50 mL×3), dried over anhydrous Na$_2$SO$_4$, and concentrated in vacuo. The residue was purified by column chromatography (MeOH/DCM=5/95) to give 1-(4-(4-Amino-5-bromopyrrolo[2,1-f][1,2,4]triazin-7-yl)piperidin-1-yl)-2-fluoro-2-methylpropan-1-one (460 mg, 32.35% yield) as a yellow solid. LCMS: t$_R$=1.372 min, column (HALO C18 4.6*50 mm, 2.7 μm), MS (ESI) m/z 383.8 [M+H]+.

Step 2. 1-(4-(4-amino-5-(4-aminophenyl)pyrrolo[2,1-f][1,2,4]triazin-7-yl)piperidin-1-yl)-2-fluoro-2-methylpropan-1-one To a solution of 1-(4-(4-amino-5-bromopyrrolo[2,1-f][1,2,4]triazin-7-yl)piperidin-1-yl)-2-fluoro-2-methylpropan-1-one (150 mg, 0.39 mmol), 4-(4,4,5,5-tetramethyl-1,3,2-dioxaborolan-2-yl)aniline (111.2 mg, 0.51 mmol) and sodium carbonate (124.2 mg, 1.17 mmol) in dioxane (16 mL) and H$_2$O (4 mL) was added 1,1'-bis (diphenylphosphino) dicene Iron-dichloropalladium (II) dichloromethane complex (45.1 mg, 0.039 mmol) under N$_2$ atmosphere. The mixture was heated to 80° C. for 10 h. After cooling, the mixture was concentrated in vacuo. The residue was diluted with water (30 mL), and extracted with EtOAc (20 mL×3). The combined organic layers were washed with brine (20 mL×2), dried over Na$_2$SO$_4$, and concentrated in vacuo. The residue was purified by silica gel chromatography (MeOH/DCM=20/1) to give the product 1-(4-(4-amino-5-(4-aminophenyl)pyrrolo[2,1-f][1,2,4]triazin-7-yl)piperidin-1-yl)-2-fluoro-2-methylpropan-1-one (144 mg, 83.73% yield) as a pale yellow solid. LCMS: t$_R$=0.974 min, column (HALO C18 4.6*50 mm, 2.7 μm), MS (ESI) m/z 396.8 [M+H]+.

Step 3. N-(4-(4-amino-7-(1-(2-fluoro-2-methylpropanoyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide At room temperature, to a mixture of 1-(4-(4-amino-5-(4-aminophenyl)pyrrolo[2,1-f][1,2,4]triazin-7-yl)piperidine-1-yl)-2-fluoro-2-methylpropan-1-one (68 mg, 0.17 mmol), 2-oxo-1-(pyridin-2-yl)-1,2,4,5,6,7-hexahydropyrazolo[1,5-a]pyridine-3-carboxylic acid (71.1 mg, 0.27 mmol), HOAT (35 mg, 0.26 mmol) and DIEA (66.4 mg, 0.51 mmol) in DCM (30 mL) was added EDCI (49.3 mg, 0.26 mmol). The mixture was stirred at 40° C. for 16 h. After cooling, the mixture was diluted with H$_2$O (10 mL), extracted with DCM (30 mL×2). The combined organic layers were washed with brine (50 mL×2), dried over anhydrous Na$_2$SO$_4$, and concentrated in vacuo. The residue was purified by preparative HPLC (Gemini-C18 150×21.2 mm, 5 um. ACN—H$_2$O (0.1% FA)=30%-60%) to give N-(4-(4-amino-7-(1-(2-fluoro-2-methylpropanoyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide (52.4 mg, 47.81% yield) as a white solid. LCMS: $t_R$=1.123 min, Column (HALO C18 4.6*50 mm, 2.7 μm), MS (ESI) m/z 637.7 [M+H]+. $^1$H NMR: (400 MHz, DMSO) δ 10.54 (s, 1H), 8.59 (dd, J=4.9, 1.1 Hz, 1H), 8.11-8.03 (m, 1H), 7.91 (s, 1H), 7.80-7.67 (m, 3H), 7.50-7.44 (m, 1H), 7.40 (d, J=8.5 Hz, 2H), 6.59 (s, 1H), 4.45 (s, 2H), 3.92 (t, J=5.9 Hz, 2H), 3.45 (t, J=11.7 Hz, 1H), 3.26 (t, J=6.4 Hz, 2H), 2.82 (s, 1H), 2.53 (d, J=6.8 Hz, 2H), 2.14-1.96 (m, 4H), 1.85 (d, J=5.7 Hz, 2H), 1.69-1.62 (m, 1H), 1.59 (s, 3H), 1.54 (s, 3H).

Example 26. N-(4-(4-amino-7-(1-(2-fluoro-2-methylpropanoyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide

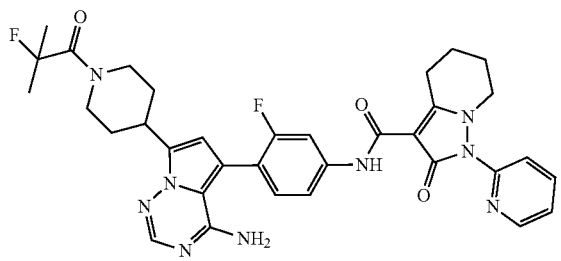 [SMILES: CC(C)(F)C(=O)N1CCC(c2cc(-c3ccc(NC(=O)c4c5n(n(-c6ccccn6)c4=O)CCCC5)cc3F)c3c(N)ncnn23)CC1]

At room temperature, to a mixture of 1-(4-(4-amino-5-(4-amino-2-fluorophenyl)pyrrolo[2,1-f][1,2,4]triazin-7-yl)piperidin-1-yl)-2-fluoro-2-methylpropan-1-one (70 mg, 0.17 mmol), 2-oxo-1-(pyridin-2-yl)-1,2,4,5,6,7-hexahydropyrazolo[1,5-a]pyridine-3-carboxylic acid (70.1 mg, 0.21 mmol), HOAT (34.5 mg, 0.25 mmol) and DIEA (65.4 mg, 0.51 mmol) in DCM (30 mL) was added EDCI (48.6 mg, 0.25 mmol). The mixture was stirred at 40° C. for 16 h. After cooling, the mixture was diluted with H$_2$O (20 mL), extracted with DCM (30 mL×2). The combined organic layers were washed with brine (50 mL×2), dried over anhydrous Na$_2$SO$_4$, and concentrated in vacuo. The residue was purified by preparative HPLC (Gemini-C18 150×21.2 mm, 5 um. ACN—H$_2$O (0.1% FA)=30%-60%) to give the product N-(4-(4-amino-7-(1-(2-fluoro-2-methylpropionyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide (47.5 mg, 42.81% yield) as a white solid. LCMS: $t_R$=1.144 min, column (HALO C18 4.6*50 mm, 2.7 μm), MS (ESI) m/z 655.5 [M+H]+. $^1$H NMR: (400 MHz, DMSO) δ 10.65 (s, 1H), 8.60 (dd, J=4.9, 1.1 Hz, 1H), 8.12-8.04 (m, 1H), 7.92 (s, 1H), 7.87-7.80 (m, 1H), 7.74 (d, J=8.1 Hz, 1H), 7.50-7.43 (m, 1H), 7.37-7.28 (m, 2H), 6.56 (s, 1H), 4.44 (s, 2H), 3.93 (t, J=5.8 Hz, 2H), 3.45 (t, J=11.9 Hz, 1H), 3.25 (t, J=6.3 Hz, 3H), 2.82 (s, 1H), 2.54-2.52 (m, 1H), 2.13-1.96 (m, 4H), 1.89-1.78 (m, 2H), 1.71-4.62 (m, 1H), 1.59 (s, 3H), 1.53 (s, 3H).

Example 27. N-(4-(4-amino-7-(1-(2-fluoro-2-methylpropanoyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide

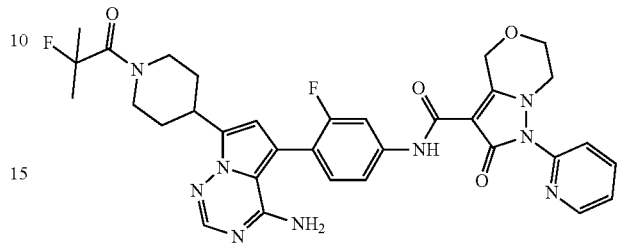

Step 1. 1-(4-(4-amino-5-(4-amino-2-fluorophenyl)pyrrolo[2,1-f][1,2,4]triazin-7-yl)piperidin-1-yl)-2-fluoro-2-methylpropan-1-one To a mixture of 1-(4-(4-amino-5-bromopyrrolo[2,1-f][1,2,4]triazin-7-yl)piperidin-1-yl)-2-fluoro-2-methylpropan-1-one (290 mg, 0.75 mmol), 3-fluoro-4-(4,4,5,5-tetramethyl-1,3,2-dioxaborolane-2-yl)aniline (232.6 mg, 0.98 mmol) and sodium carbonate (240 mg, 2.26 mmol) in dioxane (16 mL) and H$_2$O (4 mL) was added 1,1'-bis(diphenylphosphino)ferrocene-dichloropalladium(II) dichloromethane complex (87.2 mg, 0.075 mmol). The mixture was heated to 80° C. and stirred for 10 h under N$_2$ atmosphere. After cooling, the mixture was concentrated in vacuo. The residue was diluted with water (30 mL), and extracted with EtOAc (20 mL×3). The combined organic layers were washed with brine (20 mL×2), dried over Na$_2$SO$_4$, and concentrated in vacuo. The residue was purified by silica gel chromatography (MeOH/DCM=20/1) to give the product 1-(4-(4-amino-5-(4-amino-2-fluorophenyl)pyrrolo[2,1-f][1,2,4]triazin-7-yl)piperidin-1-yl)-2-fluoro-2-methylpropan-1-one (305 mg, 87.76% yield) as a pale yellow solid. LCMS: $t_R$=1.031 min, column (HALO C18 4.6*50 mm, 2.7 μm), MS (ESI) m/z 414.7 [M+H]+.

Step 2. N-(4-(4-amino-7-(1-(2-fluoro-2-methylpropanoyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide At room temperature, to a mixture of 1-(4-(4-amino-5-(4-amino-2-fluorophenyl)pyrrolo[2,1-f][1,2,4]triazin-7-yl)piperidin-1-yl)-2-fluoro-2-methylpropan-1-one (70 mg, 0.17 mmol), 2-oxo-1-(pyridin-2-yl)-2,4,6,7-tetrahydro-1H-pyrazolo[5,1-c][1,4]oxazine-3-carboxylic acid (53 mg, 0.20 mmol), HOAT (34.5 mg, 0.25 mmol), and DIEA (65.4 mg, 0.51 mmol) in DCM (30 mL) was added EDCI (48.6 mg, 0.25 mmol). The mixture was stirred at 40° C. for 16 h. After cooling, the mixture was diluted with H$_2$O (10 mL), extracted with DCM (30 mL×2). The combined organic layers were washed with brine (50 mL×2), dried over anhydrous Na$_2$SO$_4$, and concentrated in vacuo. The residue was purified by preparative HPLC (Gemini-C18 150×21.2 mm, 5 um. ACN—H$_2$O (0.1% FA)=30%-60%) to give the product N-(4-(4-amino-7-(1-(2-fluoro-2-methylpropanoyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (46.7 mg, 41.80% yield) as a white solid. LCMS: $t_R$=1.125 min, column (HALO C18 4.6*50 mm, 2.7 μm), MS (ESI) m/z 657.5 [M+H]+. ¹H NMR: (400 MHz, DMSO) δ 10.38 (s, 1H), 8.60 (dd, J=4.9, 1.0 Hz, 1H), 8.14-8.05 (m, 1H), 7.93 (s, 1H), 7.86-7.80 (m, 2H), 7.52-7.45 (m, 1H), 7.39-7.30 (m, 2H), 6.57 (s, 1H), 5.17 (s, 2H), 4.44 (s, 2H), 4.10 (d, J=3.1 Hz, 4H), 3.50-3.40 (m, 2H), 2.82 (s, 1H), 2.55-2.52 (m, 1H), 2.08 (d, J=12.6 Hz, 2H), 1.71-1.63 (m, 1H), 1.59 (s, 3H), 1.53 (s, 3H).

Example 28. N-(4-(4-amino-7-(1-(cyclopropanecarbonyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide

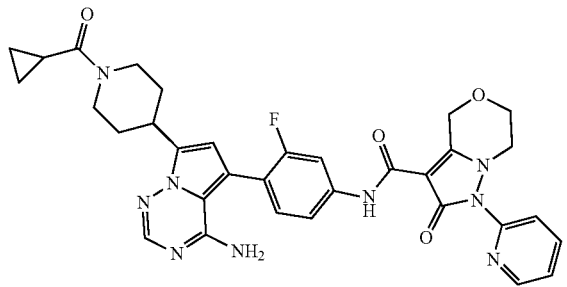 [SMILES: Nc1ncnn2c(C3CCN(C(=O)C4CC4)CC3)cc(-c3ccc(NC(=O)c4c5n(n(-c6ccccn6)c4=O)CCOC5)cc3F)c12]

To a solution of (4-(4-amino-5-(4-amino-2-fluorophenyl)pyrrolo[2,1-f][1,2,4]triazin-7-yl)piperidin-1-yl)(cyclopropyl)methanone (60 mg, 0.15 mmol) in DCM (10 mL) were added 2-oxo-1-(pyridin-2-yl)-2,4,6,7-tetrahydro-1H-pyrazolo[5,1-c][1,4]oxazine-3-carboxylic acid (40 mg, 0.15 mmol), EDCI (44 mg, 0.22 mmol), HOAT (32 mg, 0.22 mmol), and DIEA (59 mg, 0.45 mmol). The mixture was stirred at 50° C. for 16 h. The mixture was extracted with DCM (30 mL×2) and H₂O (30 mL). The organic layer was washed with brine (50 mL), dried over anhydrous Na₂SO₄, filtered, concentrated, and the residue was purified by preparative HPLC (Gemini-C18 150×21.2 mm, 5 um, ACN—H₂O (0.1% FA) 15%-40%) to give N-(4-(4-amino-7-(1-(cyclopropanecarbonyl)piperidin-4-yl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (30.8 mg, 32%) as a white solid. LCMS: $t_R$=1.110 min, column (HALO C18 4.6*50 mm, 2.7 μm), MS (ESI) m/z 638.1 [M+H]+. 1H NMR: (400 MHz, DMSO) δ 10.38 (s, 1H), 8.60 (d, J=3.7 Hz, 1H), 8.12-8.07 (m, 1H), 7.92 (s, 1H), 7.85-7.81 (m, 2H), 7.50-7.47 (m, 1H), 7.37-7.32 (m, 2H), 6.55 (s, 1H), 5.18 (s, 2H), 4.53-4.48 (m, 1H), 4.40-4.35 (m, 1H), 4.10 (d, J=3.2 Hz, 4H), 3.46-3.40 (m, 1H), 2.76-2.70 (m, 1H), 2.16-1.97 (m, 4H), 1.65-1.50 (m, 2H), 0.76-0.67 (m, 4H).

Example 29. N-(4-(4-amino-7-(1-(2-hydroxy-2-methylpropanoyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide

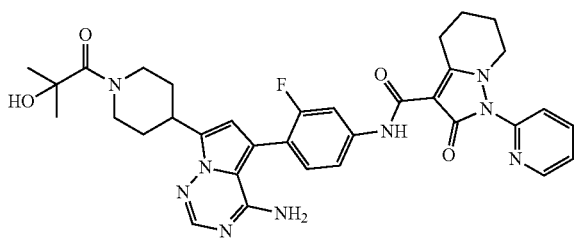 [SMILES: CC(C)(O)C(=O)N1CCC(c2cc(-c3ccc(NC(=O)c4c5n(n(-c6ccccn6)c4=O)CCCC5)cc3F)c3c(N)ncnn23)CC1]

Step 1. 1-(4-(4-amino-5-bromopyrrolo[2,1-f][1,2,4]triazin-7-yl)piperidin-1-yl)-2-hydroxyl-2-methylpropan-1-one To a solution of 5-bromo-7-(piperidin-4-yl)pyrrolo[2,1-f][1,2,4]triazin-4-amine (300 mg, 1.0 mmol) in DMF (10 mL) were added 2-hydroxy-2-methylpropionic acid (106 mg, 1.0 mmol), EDCI (292 mg, 1.5 mmol), HOAT (207 mg, 1.5 mmol), and DIEA (393 mg, 3.0 mmol). The mixture was stirred at room temperature for 16 h. The mixture was extracted with DCM (30 mL×2) and H₂O (30 mL). The organic layer was washed with brine (50 mL), dried over anhydrous Na₂SO₄, then filtered and concentrated in vacuo. And the residue was purified by column chromatography (DCM/MeOH=20/1) to give 1-(4-(4-amino-5-bromopyrrolo[2,1-f][1,2,4]triazin-7-yl)piperidin-1-yl)-2-hydroxyl-2-methylpropan-1-one (120 mg, 30%) as a white solid. LCMS: $t_R$=1.009 min, column (HALO C18 4.6*50 mm, 2.7 μm), MS (ESI) m/z 381.9 [M+H]+.

Step 2. 1-(4-(4-amino-5-(4-amino-2-fluorophenyl)pyrrolo[2,1-f][1,2,4]triazin-7-yl)piperidine-1-yl)-2-hydroxy-2-methylpropan-1-one To a solution of 1-(4-(4-amino-5-bromopyrrolo[2,1-f][1,2,4]triazin-7-yl)piperidin-1-yl)-2-hydroxyl-2-methylpropan-1-one (120 mg, 0.31 mmol) in dioxane/H₂O (20 mL/5 mL) was added 3-fluoro-4-(4,4,5,5-tetramethyl-1,3,2-dioxaborolan-2-yl)aniline (90 mg, 0.38 mmol), K₂CO₃ (66 mg, 0.48 mmol), and Pd(PPh₃)₄ (37 mg, 0.03 mmol) under nitrogen atmosphere. The resulting mixture was stirred at 80° C. for 6 h. After cooling, the mixture was concentrated in vacuo, diluted with H₂O (30 mL) and extracted with DCM (50 mL×2). The organic layer was washed with brine (60 mL), dried over anhydrous Na₂SO₄, filtered, concentrated in vacuo. The residue was purified by column chromatography (DCM/MeOH=20/1) to give 1-(4-(4-amino-5-(4-amino-2-fluorophenyl)pyrrolo[2,1-f][1,2,4]triazin-7-yl)piperidine-1-yl)-2-hydroxy-2-methylpropan-1-one (95 mg, 66%) as a white solid. LCMS: $t_R$=0.967 min, column (HALO C18 4.6*50 mm, 2.7 μm), MS (ESI) m/z 413.1 [M+H]+.

Step 3. N-(4-(4-amino-7-(1-(2-hydroxy-2-methylpropionyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1, 5-a]pyridine-3-carboxamide To a mixture of 1-(4-(4-amino-5-(4-amino-2-fluorophenyl)pyrrolo[2,1-f][1,2,4]triazin-7-yl)piperidine-1-yl)-2-hydroxy-2-methylpropan-1-one (95 mg, 0.25 mmol) in DCM (20 mL) were added 2-oxo-1-(pyridin-2-yl)-1, 2,4,5,6,7-hexahydropyrazolo[1,5-a]pyridine-3-carboxylic acid (65 mg, 0.25 mmol), EDCI (72 mg, 0.37 mmol), HOAT (51 mg, 0.37 mmol), and DIEA (97 g, 0.75 mmol). The mixture was stirred at 50° C. for 16 h. After cooling, the mixture was extracted with DCM (30 mL×2) and H$_2$O (30 mL). The organic layer was washed with brine (50 mL), dried over anhydrous Na$_2$SO$_4$, filtered and concentrated in vacuo. The residue was purified by preparative HPLC (Gemini-C18 150×21.2 mm, 5 um, ACN—H$_2$O (0.1% FA))) to give N-(4-(4-amino-7-(1-(2-hydroxy-2-methylpropionyl)piperidin-4-yl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide (81.4 mg, 50%) as a white solid. LCMS: t$_R$=1.096 min, column (HALO C18 4.6*50 mm, 2.7 μm), MS (ESI) m/z 654.1 [M+H]+. $^1$H NMR: (400 MHz, DMSO) δ 10.65 (s, 1H), 8.60 (dd, J=4.9, 1.1 Hz, 1H), 8.10-8.06 (m, 1H), 7.91 (s, 1H), 7.86-7.82 (m, 1H), 7.74 (d, J=8.1 Hz, 1H), 7.49-7.46 (m, 1H), 7.36-7.30 (m, 2H), 6.52 (s, 1H), 5.40 (s, 1H), 4.98-4.83 (m, 1H), 4.60-4.45 (m, 1H), 3.93 (t, J=5.7 Hz, 2H), 3.45-3.38 (m, 1H), 3.25 (t, J=6.3 Hz, 2H), 2.55-2.52 (m, 2H), 2.06-1.98 (m, 4H), 1.87-1.81 (m, 2H), 1.65-1.51 (m, 2H), 1.33 (s, 6H).

Example 30. N-(4-(4-amino-7-((1r,4r)-4-hydroxycyclohexyl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide

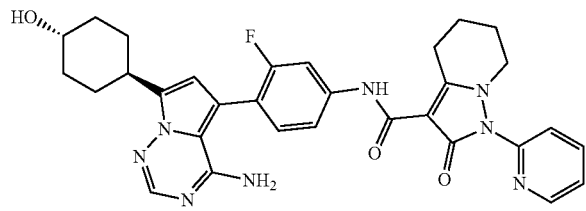 [SMILES: Nc1ncnn2c1c(-c1ccc(NC(=O)c3c4n(n(-c5ccccn5)c3=O)CCOC4)cc1F)cc2[C@H]1CC[C@H](O)CC1]

To a mixture of 4-(4-amino-5-(4-amino-2-fluorophenyl)pyrrolo[2,1-f][1,2,4]triazin-7-yl)cyclohexane-1-alcohol (60 mg, 0.17 mmol) in DCM (10 mL) was added 2-oxo-1-(pyridin-2-yl)-1,2,4,5,6,7-hexahydropyrazolo[1,5-a]pyridine-3-carboxylic acid (46 mg, 0.17 mmol), EDCI (51 mg, 0.27 mmol), HOAT (36 mg, 0.27 mmol), and DIEA (69 mg, 0.53 mmol). The mixture was stirred at 50° C. for 16 h. After cooling, the mixture was extracted with DCM (30 mL×2) and H$_2$O (30 mL). The organic layer was washed with brine (50 mL), dried over anhydrous Na$_2$SO$_4$, filtered, then concentrated in vacuo. The residue was purified by preparative HPLC (Gemini-C18 150×21.2 mm, 5 um, ACN—H$_2$O (0.1% FA)) to give N-(4-(4-amino-7-((1r,4r)-4-hydroxycyclohexyl)pyrrolo[2,1-f][1,2,4]triazin-5-yl)-3-fluorophenyl)-2-oxo-1-(pyridin-2-yl)-1,2,4,5,6,7-hexahydropyrazolo[1,5-a]pyridine-3-carboxamide (49.8 mg, 48%) as a white solid. LCMS: t$_R$=1.089 min, column (HALO C18 4.6*50 mm, 2.7 μm), MS (ESI) m/z 583.1 [M+H]+. $^1$H NMR: (400 MHz, DMSO) δ 10.65 (s, 1H), 8.60 (dd, J=4.9, 1.1 Hz, 1H), 8.10-8.05 (m, 1H), 7.90 (s, 1H), 7.86-7.81 (m, 1H), 7.74 (d, J=8.1 Hz, 1H), 7.48 (dd, J=7.0, 5.3 Hz, 1H), 7.35-7.29 (m, 2H), 6.48 (s, 1H), 4.63 (s, 1H), 3.93 (t, J=5.9 Hz, 2H), 3.49-3.44 (m, 1H), 3.25 (t, J=6.3 Hz, 2H), 3.06-3.00 (m, 1H), 2.04-1.82 (m, 8H), 1.53-1.43 (m, 2H), 1.35-1.26 (m, 2H).

Example 31. N-(4-(4-amino-7-((1r,4r)-4-hydroxycyclohexyl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide

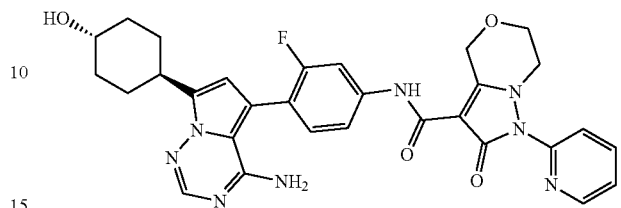

To a mixture of 4-(4-amino-5-(4-amino-2-fluorophenyl)pyrrolo[2,1-f][1,2,4]triazin-7-yl)cyclohexane-1-alcohol (60 mg, 0.17 mmol) in DCM (10 mL) was added 2-oxo-1-(pyridin-2-yl)-2,4,6,7-tetrahydro-1H-pyrazolo[5,1-c][1,4]oxazine-3-carboxylic acid (46 mg, 0.17 mmol), EDCI (51 mg, 0.27 mmol), HOAT (36 mg, 0.27 mmol), and DIEA (69 mg, 0.53 mmol). The mixture was stirred at 50° C. for 16 h. After cooling, the mixture was extracted with DCM (30 mL×2) and H$_2$O (30 mL). The organic layer was washed with brine (50 mL), dried over anhydrous Na$_2$SO$_4$, filtered, and concentrated in vacuo. The residue was purified by preparative HPLC (Gemini-C18 150×21.2 mm, 5 um, ACN—H$_2$O (0.1% FA)) to give N-(4-(4-amino-7-((1r,4r)-4-hydroxycyclohexyl)pyrrolo[2,1-f][1,2,4]triazin-5-yl)-3-fluorophenyl)-2-oxo-1-(pyridin-2-yl)-2,4,6,7-tetrahydro-1H-pyrazolo[5,1-c][1,4]oxazine-3-carboxamide (52.0 mg, 50%) as a white solid. LCMS: t$_R$=1.047 min, column (HALO C18 4.6*50 mm, 2.7 μm), MS (ESI) m/z 585.0 [M+H]+. $^1$H NMR: (400 MHz, DMSO) δ 10.37 (s, 1H), 8.60 (d, J=3.8 Hz, 1H), 8.12-8.07 (m, 1H), 7.90 (s, 1H), 7.82 (d, J=8.4 Hz, 2H), 7.48 (dd, J=7.0, 5.3 Hz, 1H), 7.34 (d, J=5.6 Hz, 2H), 6.48 (s, 1H), 5.17 (s, 2H), 4.63 (s, 1H), 4.10 (d, J=3.1 Hz, 4H), 3.49-3.43 (m, 1H), 3.07-3.00 (m, 1H), 2.07-1.99 (m, 2H), 1.96-1.90 (m, 2H), 1.52-1.43 (m, 2H), 1.36-1.27 (m, 2H).

Example 32. N-(4-(4-amino-7-((1r,4r)-4-hydroxycyclohexyl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide

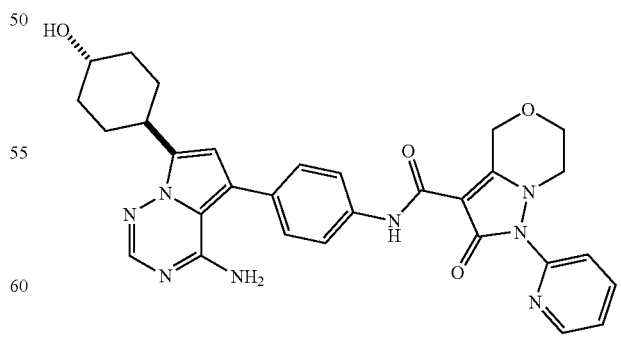

At room temperature, to a mixture of (1s,4s)-4-(4-amino-5-(4-aminophenyl)pyrrolo[2,1-f][1,2,4]triazin-7-yl) cyclohexane-1-ol (65 mg, 0.20 mmol), 2-oxo-1-(pyridin-2-yl)-2,4,6,7-tetrahydro-1H-pyrazolo[5,1-c][1,4]oxazine-3- carboxylic acid (57.8 mg, 0.22 mmol), HOAT (41.1 mg, 0.30 mmol) and DIEA (77.8 mg, 0.60 mmol) in DCM (30 mL) was added EDCI (57.8 mg, 0.30 mmol). The mixture was stirred at 45° C. for 16 h. After cooling, the mixture was diluted with H₂O (10 mL), extracted with DCM (30 mL×2). The organic layer was washed with brine (50 mL×2), dried over anhydrous Na₂SO₄, and concentrated in vacuo. The residue was purified by preparative HPLC (Gemini-C18 150×21.2 mm, 5 um. ACN—H₂O (0.1% FA)=25%-50%) to give N-(4-(4-amino-7-((1r,4r)-4-hydroxycyclohexyl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide (25.8 mg, 18.5% yield) as a white solid. LCMS: $t_R$=1.018 min, column (HALO C18 4.6*50 mm, 2.7 μm), MS (ESI) m/z 566.7 [M+H]+. ¹H NMR: (400 MHz, DMSO) δ 10.27 (s, 1H), 8.59 (d, J=3.8 Hz, 1H), 8.09 (td, J=8.0, 1.8 Hz, 1H), 7.89 (s, 1H), 7.83 (d, J=8.2 Hz, 1H), 7.71 (d, J=8.6 Hz, 2H), 7.47 (dd, J=7.0, 5.3 Hz, 1H), 7.40 (d, J=8.5 Hz, 2H), 6.50 (s, 1H), 5.18 (s, 2H), 4.63 (s, 1H), 4.14-4.05 (m, 4H), 3.47 (s, 1H), 3.03 (t, J=12.0 Hz, 1H), 2.03 (d, J=12.2 Hz, 2H), 1.94 (d, J=9.6 Hz, 2H), 1.49 (dd, J=25.4, 10.8 Hz, 2H), 1.32 (dd, J=23.3, 10.2 Hz, 2H).

Example 33. N-(4-(4-amino-7-((1r,4r)-4-hydroxycyclohexyl-4-d)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide

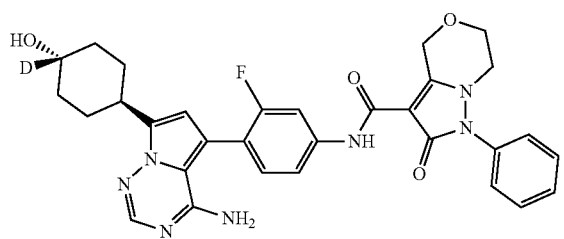 [SMILES: [2H][C@]1(O)CC[C@H](c2cc(-c3ccc(NC(=O)c4c5n(n(-c6ccccc6)c4=O)CCOC5)cc3F)c3c(N)ncnn32)CC1]

Step 1. 7-(1,4-dioxaspiro[4.5]decane-8-yl)pyrrolo[2,1-f][1,2,4]triazin-4-amine 7-(1,4-dioxaspiro[4.5]dec-7-en-8-yl)pyrrolo[2,1-f][1,2,4]triazin-4-amine (600 mg, 2.2 mmol) and 10% Pd(OH)₂ (24 mg) in MeOH (30 mL) in DCM (30 mL) were hydrogenated at 20° C. with H₂ balloon for 16 h. The mixture was filtered. The filtrate was concentrated in vacuo to obtain 7-(1,4-dioxaspiro[4.5]decane-8-yl)pyrrolo[2,1-f][1,2,4]triazin-4-amine (1.1 g, 69.1% yield) as a yellow solid. MS (ESI): 275.0 [M+H]+. ¹H NMR (300 MHz, DMSO) δ 7.90 (s, 1H), 6.96 (d, J=4.2 Hz, 1H), 6.50 (d, J=4.2 Hz, 1H), 3.88 (s, 4H), 3.15-3.08 (m, 1H), 1.98-1.95 (m, 2H), 1.79-1.61 (m, 6H).

Step 2. 4-(4-aminopyrrolo[2,1-f][1,2,4]triazin-7-yl)cyclohexane-1-one

To a mixture of 7-(1,4-dioxaspiro[4.5]decane-8-yl)pyrrolo[2,1-f][1,2,4]triazin-4-amine (600 mg, 2.2 mmol) in THF (10 mL) was added 1 N HCl (10 mL). And the mixture was stirred at 25° C. for 16 h. The mixture was then concentrated in vacuo. The residue was diluted with aqueous NaHCO₃ (10 mL). The mixture was extracted with EtOAc (20 mL×3), and the combined organic layers were washed with brine (20 mL×2), dried over Na₂SO₄, and concentrated in vacuo to give 4-(4-aminopyrrolo[2,1-f][1,2,4]triazin-7-yl)cyclohexane-1-one (400 mg, 71.48% yield) as a brown solid. MS (ESI): 231.0 [M+H]+. ¹H NMR (300 MHz, DMSO) δ 7.85 (s, 1H), 7.63 (s, 2H), 6.82 (d, J=4.2 Hz, 1H), 6.46 (d, J=4.2 Hz, 1H), 3.59 (t, J=12 Hz, 1H), 2.68-2.57 (m, 2H), 2.32-2.24 (m, 4H), 1.92-1.77 (m, 2H).

Step 3. (1r,4r)-4-(4-aminopyrrolo[2,1-f][1,2,4]triazin-7-yl)cyclohexan-1-d-1-ol

At 0° C., to a solution of 4-(4-aminopyrrolo[2,1-f][1,2,4]triazin-7-yl)cyclohexane-1-one (200 mg, 0.86 mmol) in THY (30 mL) was added LiAlD4 (54.7 mg, 1.3 mmol). The mixture was stirred at 0° C. for 1 h. The reaction mixture was quenched with aqueous NH₄Cl (10 mL). The mixture was extracted with EtOAc (20 mL×3). The combined organic layers were washed with brine (30 mL×2), dried over Na₂SO₄, and concentrated in vacuo to give (1r,4r)-4-(4-aminopyrrolo[2,1-f][1,2,4]triazin-7-yl)cyclohexan-1-d-1-ol (100 mg, 42% yield) as a brown solid. MS (ESI): 234.2 [M+H]+.

Step 4. (1r,4r)-4-(4-amino-5-bromopyrrolo[2,1-f][1,2,4]triazin-7-yl)cyclohexan-1-d-1-ol At -10° C., to a solution of (1r,4r)-4-(4-aminopyrrolo[2,1-f][1,2,4]triazin-7-yl)cyclohexan-1-d-1-ol (90 mg, 0.38 mmol) in THE (20 mL) was added 1,3-dibromo-5,5-dimethylhydantoin (DBH) (55 mg, 0.19 mmol). The mixture was stirred at -10° C. for 2 h. Then the reaction mixture was quenched by aqueous Na₂SO₃ (10 mL), and the mixture was extracted with EtOAc (20 mL×3). The combined organic layers were washed with brine (30 mL×2), dried over Na₂SO₄, and concentrated in vacuo. The residue was purified by silica gel chromatography (DCM/MeOH=20/1) to give (1r,4r)-4-(4-amino-5-bromopyrrolo[2,1-f][1,2,4]triazin-7-yl)cyclohexan-1-d-1-ol (90 mg, 71% yield) as an off-white solid. MS (ESI): 311.9, 313.9 [M+H]+. ¹H NMR (400 MHz, DMSO) δ 7.84 (s, 1H), 6.58 (s, 1H), 4.60 (s, 1H), 3.02-2.94 (m, 1H), 1.96-1.88 (m, 4H), 1.46-1.35 (m, 2H), 1.30-1.22 (m, 2H).

Step 5. (1r,4r)-4-(4-amino-5-(4-amino-2-fluorophenyl)pyrrolo[2,1-f][1,2,4]triazin-7-yl)cyclohexan-1-d-1-ol To a mixture of (1r,4r)-4-(4-amino-5-bromopyrrolo[2,1-f][1,2,4]triazin-7-yl)cyclohexan-1-d-1-ol (90 mg, 0.29 mmol), 3-fluoro-4-(4,4,5,5-tetramethyl-1,3,2-dioxaborolan-2-yl)aniline (75 mg, 0.32 mmol), and sodium carbonate (61 mg, 0.58 mmol) in dioxane/H₂O=4/1 (30 mL) was added tetrakis (triphenylphosphine) palladium (16.7 mg, 0.014 mmol) under N₂ atmosphere. The mixture was heated at 80° C. for 16 h. After cooling, the mixture was concentrated in vacuo. The residue was diluted with water (30 mL), then extracted with EtOAc (30 mL×3). The combined organic layers were washed with brine (40 mL×2), dried over Na₂SO₄, and concentrated in vacuo. The residue was purified by silica gel chromatography (DCM/MeOH=20/1) to give the product (1r,4r)-4-(4-amino-5-(4-amino-2-fluorophenyl)pyrrolo[2,1-f][1,2,4]triazin-7-yl)cyclohexan-1-d-1-ol (60 mg, 57.8% yield) as a yellow solid. MS (ESI): 343.0 [M+H]+. ¹H NMR (400 MHz, CDCl₃) δ 7.88 (s, 1H), 7.13 (t, J=8.4 Hz, 1H), 6.55-6.46 (m, 2H), 5.94-5.73 (m, 2H), 3.93 (s, 1H), 3.21-3.13 (m, 1H), 2.12-2.11 (m, 4H), 1.58-1.51 (m, 4H).

Step 6. N-(4-(4-amino-7-((1r,4r)-4-hydroxycyclohexyl-4-d)pyrrolo[2,1-f][1,2,4]triazin-5-yl)-3-fluorophenyl)-2-oxo-1-phenyl-2,4,6,7-tetrahydro-1H-pyrazolo[5,1-c][1,4]oxazine-3-carboxamide To a mixture of (1r,4r)-4-(4-amino-5-(4-amino-2-fluorophenyl)pyrrolo[2,1-f][1,2,4]triazin-7-yl)cyclohexan-1-d-1-ol (40 mg, 0.11 mmol), 2-oxo-1-phenyl-4H,6H,7H-pyrazolo[3,2-c]morpholine-3-carboxylic acid (30 mg, 0.11 mmol), HOAt (19 mg, 0.14 mmol) and DIEA (44.7 mg, 0.34 mmol) in DCM (30 mL) was added EDCI (33 mg, 0.17 mmol). The mixture was heated at 40° C. for 16 h. After cooling, the mixture was diluted with DCM (30 mL), then washed with brine (40 mL×3). The separated organic layer was dried over $Na_2SO_4$ and concentrated in vacuo. The residue was recrystallized from MeOH (3 mL) to give N-(4-(4-amino-7-((1r,4r)-4-hydroxycyclohexyl-4-d)pyrrolo[2,1-f][1,2,4]triazin-5-yl)-3-fluorophenyl)-2-oxo-1-phenyl-2,4,6,7-tetrahydro-H-pyrazolo[5,1-c][1,4]oxazine-3-carboxamide (17.9 mg, 26% yield) as a yellow solid. MS (ESI): 585.3 [M+H]+. $^1$H NMR (400 MHz, DMSO) δ 10.54 (s, 1H), 7.89 (s, 1H), 7.82 (d, J=12.8 Hz, 1H), 7.63-7.58 (m, 2H), 7.55-7.51 (m, 3H), 7.36-7.28 (m, 2H), 6.47 (s, 1H), 5.12 (s, 2H), 4.59 (s, 1H), 4.10 (t, J=4.8 Hz, 2H), 3.70 (t, J=4.8 Hz, 2H), 3.07-2.99 (m, 1H), 2.03 (d, J=12.4 Hz, 2H), 1.92 (d, J=12 Hz, 2H), 1.42-1.43 (m, 2H), 1.33-1.27 (m, 2H).

Example 34. N-(4-(4-amino-7-(1-(2-fluoro-2-methylpropanoyl)piperidin-4-yl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide

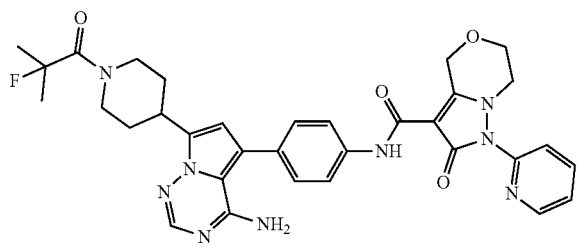 [SMILES: CC(C)(F)C(=O)N1CCC(c2cc(-c3ccc(NC(=O)c4c5n(n(-c6ccccn6)c4=O)CCOC5)cc3)c3c(N)ncnn23)CC1]

To a mixture of 1-(4-(4-amino-5-(4-aminophenyl)pyrrolo[2,1-f][1,2,4]triazin-7-yl)piperidin-1-yl)-2-fluoro-2-methylpropan-1-one (60 mg, 0.15 mmol) in DCM (10 mL) were added 2-oxo-1-(pyridin-2-yl)-2,4,6,7-tetrahydro-1H-pyrazolo[5,1-c][1,4]oxazine-3-carboxylic acid (48 mg, 0.18 mmol), EDCI (44 mg, 0.22 mmol), HOAT (32 mg, 0.22 mmol), and DIEA (59 mg, 0.45 mmol). The mixture was stirred at 50° C. for 16 h. The mixture was extracted with DCM (30 mL×2) and $H_2O$ (30 mL). The organic layer was washed with brine (50 mL), dried over anhydrous $Na_2SO_4$, filtered, and concentrated in vacuo. The residue was purified with preparative HPLC (Gemini-C18 150×21.2 mm, 5 um, ACN—$H_2O$ (0.1% FA) 15%-40%) to give the title product N-(4-(4-amino-7-(1-(2-fluoro-2-methylpropanoyl)piperidin-4-yl)pyrrolo[2,1-f][1,2,4]triazin-5-yl)phenyl)-2-oxo-1-(pyridin-2-yl)-2,4,6,7-tetrahydro-1H-pyrazolo[5,1-c][1,4]oxazine-3-carboxamide (67.4 mg, 68%) as a white solid. LCMS: $t_R$=1.134 min, column (HALO C18 4.6*50 mm, 2.7 μm), MS (ESI) m/z 640.1 [M+H]+. $^1$H NMR: (400 MHz, DMSO) δ 10.27 (s, 1H), 8.59 (d, J=3.9 Hz, 1H), 8.12-8.07 (m, 1H), 7.91 (s, 1H), 7.83 (d, J=8.1 Hz, 1H), 7.72 (d, J=8.6 Hz, 2H), 7.50-7.45 (m, 1H), 7.41 (d, J=8.5 Hz, 2H), 6.59 (s, 1H), 5.18 (s, 2H), 4.49-4.39 (m, 2H), 4.13-4.05 (m, 4H), 3.49-3.42 (m, 1H), 3.29-3.20 (m, 1H), 2.88-2.78 (m, 1H), 2.11-2.05 (m, 2H), 1.59 (s, 5H), 1.54 (s, 3H).

Example 35. N-(5-(4-amino-7-(1-isobutyrylpiperidin-4-yl)pyrrolo[2,1-f][1,2,4]triazin-5-yl)pyridin-2-yl)-2-oxo-1-phenyl-2,4,6,7-tetrahydro-1H-pyrazolo[5,1-c][1,4]oxazine-3-carboxamide

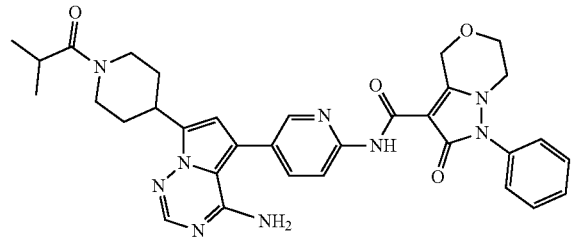 [SMILES: CC(C)C(=O)N1CCC(c2cc(-c3ccc(NC(=O)c4c5n(n(-c6ccccc6)c4=O)CCOC5)nc3)c3c(N)ncnn23)CC1]

To a solution of 1-(4-(4-amino-5-bromopyrrolo[2,1-f][1,2,4]triazin-7-yl)piperidin-1-yl)-2-methylpropane-1-one (75 mg, 0.20 mmol) in dioxane/$H_2O$ (20 mL/4 mL) were added (6-(2-oxo-1-phenyl-2,4,6,7-tetrahydrogen-1H-pyrazolo[5,1-c][1,4]oxazin-3-carboxamide)pyridin-3-yl)boronic acid (93 mg, 0.25 mmol), sodium carbonate (33 mg, 0.30 mmol) and Pd(PPh$_3$)$_4$ (24 mg, 0.02 mmol). The mixture was heated to 80° C. and stirred for 6 h. After cooling, the solvent was removed in vacuo. The mixture was diluted with $H_2O$ (50 mL), and extracted twice with DCM (50 mL×2). The combined organic phases were washed with brine (50 mL), dried over anhydrous $Na_2SO_4$, filtered, then concentrated in vacuo. And the residue was purified with preparative HPLC (Gemini-C18 150×21.2 mm, 5 um, ACN—$H_2O$ (0.1% FA) 15%-40%) to give the product N-(5-(4-amino-7-(1-isobutyrylpiperidin-4-yl)pyrrolo[2,1-f][1,2,4]triazin-5-yl)pyridin-2-yl)-2-oxo-1-phenyl-2,4,6,7-tetrahydro-1H-pyrazolo[5,1-c][1,4]oxazine-3-carboxamide (38.6 mg, 31%) as a white solid. LCMS: $t_R$=1.134 min, column (HALO C18 4.6*50 mm, 2.7 μm), MS (ESI) m/z 622.1 [M+H]+. $^1$H NMR: (400 MHz, DMSO) δ 10.78 (s, 1H), 8.34 (d, J=2.1 Hz, 1H), 8.26 (d, J=8.2 Hz, 1H), 7.92 (s, 1H), 7.83 (dd, J=8.6, 2.4 Hz, 1H), 7.63-7.59 (m, 2H), 7.56-7.51 (m, 3H), 6.64 (s, 1H), 5.13 (s, 2H), 4.57-4.50 (m, 1H), 4.10 (t, J=5.0 Hz, 2H), 3.70 (t, J=4.9 Hz, 2H), 3.42-3.39 (m, 1H), 3.22-3.18 (m, 1H), 2.92-2.88 (m, 1H), 2.12-1.98 (m, 2H), 1.66-1.46 (m, 4H), 1.01 (t, J=6.4 Hz, 6H).

Example 36. N-(4-(4-amino-7-(1-(cyclopropanecarbonyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide

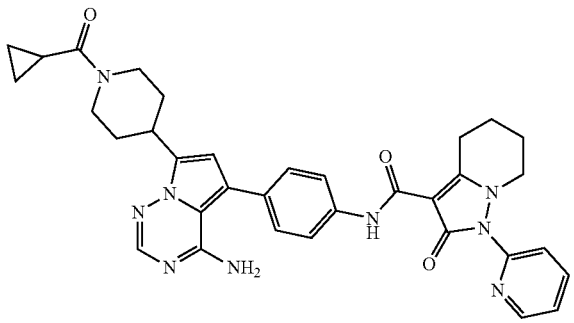 [SMILES: Nc1ncnn2c(C3CCN(C(=O)C4CC4)CC3)cc(-c3ccc(NC(=O)c4c5n(n(-c6ccccn6)c4=O)CCCC5)cc3)c12]

Step 1. (4-(4-amino-5-bromopyrrolo[2,1-f][1,2,4]triazin-7-yl)piperidin-1-yl)(cyclopropyl)methanone To 5-bromo-7-(piperidin-4-yl)pyrrolo[2,1-f][1,2,4]triazin-4-amine (700 mg, 2.36 mmol) in DCM (50 mL) solution was added TEA (1.20 g, 11.82 mmol) and cyclopropylformyl chloride (321.2 mg, 3.07 mmol) at room temperature. The mixture was stirred for 4 h. Water (30 mL) was added for dilution. The mixture was extracted three times with DCM (30 mL×3). The combined organic phases were washed with saturated brine (40 mL×2), dried over anhydrous sodium sulfate, filtered, concentrated in vacuo. The residue was purified by column chromatography (MeOH/DCM=5/95) to give the product (4-(4-amino-5-bromopyrrolo[2,1-f][1,2,4]triazin-7-yl)piperidin-1-yl)(cyclopropyl)methanone (450 mg, 49.66%) as a yellow solid. LCMS: $t_R$=1.086 min, column (HALO C18 4.6*50 mm, 2.7 μm), MS (ESI) m/z 363.7 [M+H]+.

Step 2. (4-(4-amino-5-(4-aminophenyl)pyrrolo[2,1-f][1,2,4]triazin-7-yl)piperidin-1-yl)(cyclopropyl)methanone To (4-(4-amino-5-bromopyrrolo[2,1-f][1,2,4]triazin-7-yl)piperidin-1-yl)(cyclopropyl)methanone (150 mg, 0.41 mmol) in dioxane/H$_2$O (16 mL/4 mL) was added 4-(4,4,5,5-tetramethyl-1,3,2-dioxaborolan-2-yl)aniline (135.3 mg, 0.62 mmol), Na$_2$CO$_3$ (131 mg, 1.23 mmol), and Pd(dppf$_2$)Cl$_2$ (37 mg, 0.03 mmol) under nitrogen atmosphere. The resulting mixture was stirred at 80° C. for 10 h. After cooling, the mixture was concentrated in vacuo. H$_2$O (30 mL) was added and extracted with DCM (50 mL×2). The organic layer was washed with brine (20 mL×2), dried over anhydrous Na$_2$SO$_4$, filtered, then concentrated in vacuo. The residue was purified by column chromatography (DCM/MeOH=20/1) to give the product (4-(4-amino-5-(4-aminophenyl)pyrrolo[2,1-f][1,2,4]triazin-7-yl)piperidin-1-yl)(cyclopropyl)methanone (140 mg, 81.28%) as a white solid. LCMS: $t_R$=0.991 min, column (HALO C18 4.6*50 mm, 2.7 μm), MS (ESI) m/z 376.9 [M+H]+.

Step 3. N-(4-(4-amino-7-(1-(cyclopropanecarbonyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide To a mixture of (4-(4-amino-5-(4-aminophenyl)pyrrolo[2,1-f][1,2,4]triazin-7-yl)piperidin-1-yl)(cyclopropyl)methanone (70 mg, 0.19 mmol) in DCM (30 mL) was added 2-oxo-1-(pyridin-2-yl)-1,2,4,5,6,7-hexahydropyrazolo[1,5-a]pyridine-3-carboxylic acid (62.7 mg, 0.24 mmol), EDCI (53.5 mg, 0.28 mmol), HOAT (37.9 mg, 0.28 mmol), and DIEA (120 mg, 0.93 mmol). The mixture was stirred at 40° C. for 16 h. After cooling, the mixture was extracted with DCM (30 mL×2) and H$_2$O (30 mL). The organic layer was washed with brine (50 mL), dried over anhydrous Na$_2$SO$_4$, filtered, then concentrated in vacuo. The residue was purified by preparative HPLC (Gemini-C18 150×21.2 mm, 5 um, ACN—H$_2$O (0.1% FA)) to give N-(4-(4-amino-7-(1-(cyclopropanecarbonyl)piperidin-4-yl)pyrrolo[2,1-f][1,2,4]triazin-5-yl)phenyl)-2-oxo-1-(pyridin-2-yl)-1,2,4,5,6,7-hexahydropyrazolo[1,5-a]pyridine-3-carboxamide (50.0 mg, 43.46%) as a white solid. LCMS: $t_R$=1.150 min, column (HALO C18 4.6*50 mm, 2.7 μm), MS (ESI) m/z 654.1 [M+H]+. $^1$H NMR: (400 MHz, DMSO) (400 MHz, DMSO) δ 10.54 (s, 1H), 8.59 (d, J=3.9 Hz, 1H), 8.07 (t, J=7.4 Hz, 1H), 7.91 (s, 1H), 7.73 (dd, J=17.0, 8.1 Hz, 3H), 7.52-7.31 (m, 3H), 6.57 (s, 1H), 4.60-4.30 (m, 2H), 3.92 (s, 2H), 3.48-3.37 (m, 1H), 3.28- 3.18 (m, 3H), 2.74 (s, 1H), 2.16-1.91 (m, 5H), 1.84 (s, 2H), 1.71-1.45 (m, 2H), 0.70 (d, J=7.5 Hz, 4H). In addition, the following compounds were synthesized in the present invention.

| Compounds number | structure | MS (M + H) | Synthetic methods |
|---|---|---|---|
| Example 37 | | 654.3 | refer to Example 14 |

-continued
| Compounds number | structure | MS (M + H) | Synthetic methods |
|---|---|---|---|
| Example 38 | 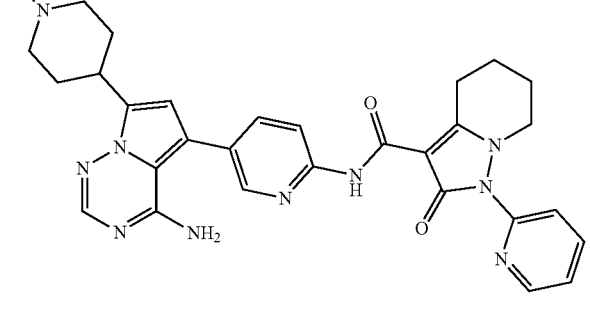 | 653.2 | refer to Example 11 |
| Example 39 | 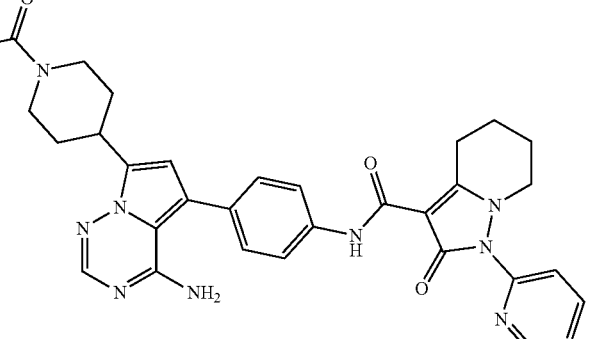 | 634.3 | refer to Example 18 |
| Example 40 | 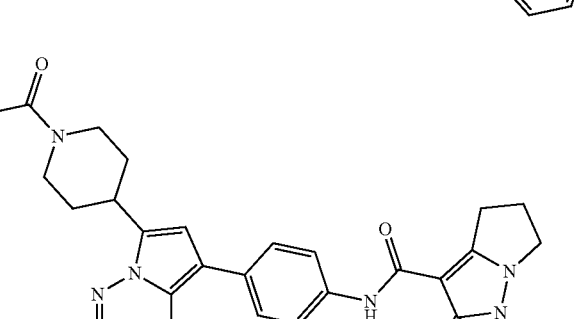 | 618.3 | refer to Example 18 |
| Example 41 | 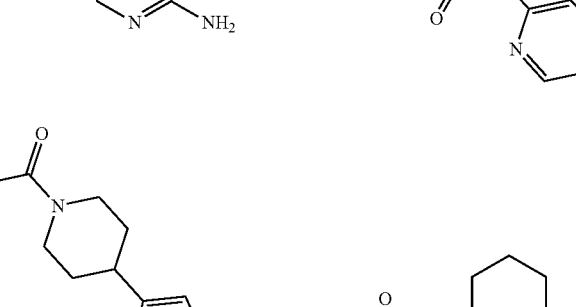 | 633.1 | refer to Example 11 |

-continued
| Compounds number | structure | MS (M + H) | Synthetic methods |
|---|---|---|---|
| Example 42 | 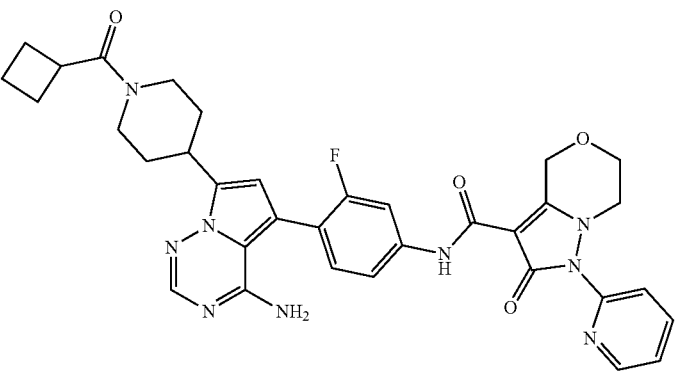 [SMILES: Nc1ncnn2c(C3CCN(C(=O)C4CCC4)CC3)cc(-c3ccc(NC(=O)c4c5n(n(-c6ccccn6)c4=O)CCOC5)cc3F)c12] | 652.3 | refer to Example 14 |
| Example 43 | 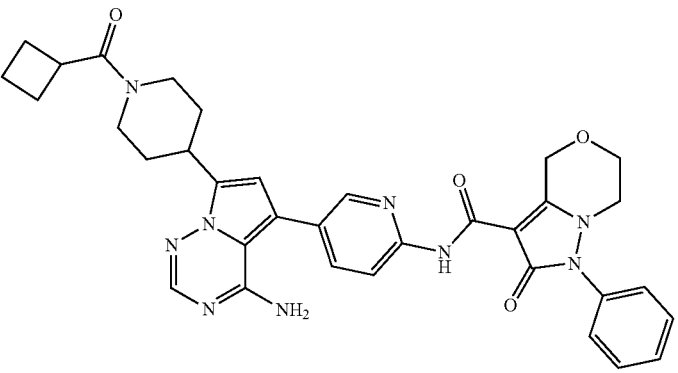 [SMILES: Nc1ncnn2c(C3CCN(C(=O)C4CCC4)CC3)cc(-c3ccc(NC(=O)c4c5n(n(-c6ccccc6)c4=O)CCOC5)nc3)c12] | 634.3 | refer to Example 11 |
| Example 44 | 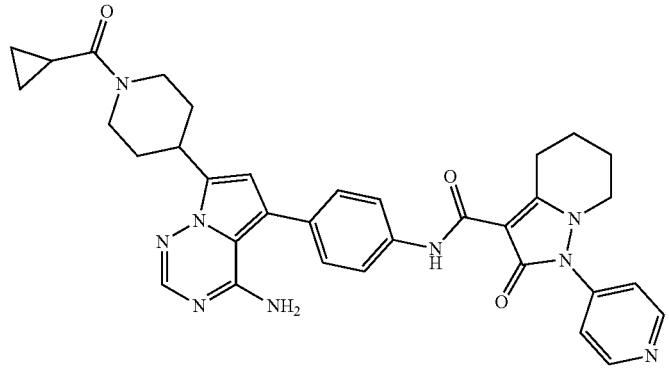 [SMILES: Nc1ncnn2c(C3CCN(C(=O)C4CC4)CC3)cc(-c3ccc(NC(=O)c4c5n(n(-c6ccncc6)c4=O)CCCC5)cc3)c12] | 618.3 | refer to Example 36 |
| Example 45 | 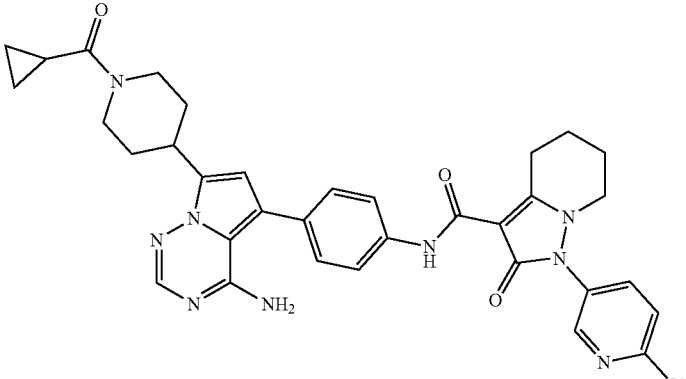 | 648.3 | refer to Example 36 |

-continued

| Compounds number | structure | MS (M + H) | Synthetic methods |
|---|---|---|---|
| Example 46 | | 619.1 | refer to Example 10 |
| Example 47 | | 621.3 | refer to Example 36 |
| Example 48 | | 621.3 | refer to Example 36 |
| Example 49 | | 618.3 | refer to Example 18 |

| Compounds number | structure | MS (M + H) | Synthetic methods |
|---|---|---|---|
| Example 50 | 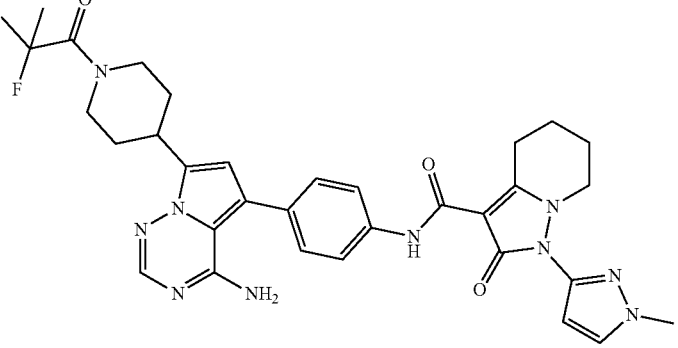 | 641.3 | refer to Example 36 |
| Example 51 | 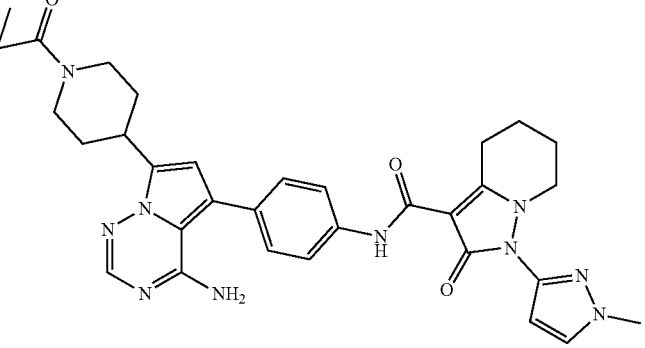 | 641.3 | refer to Example 34 |
| Example 52 | 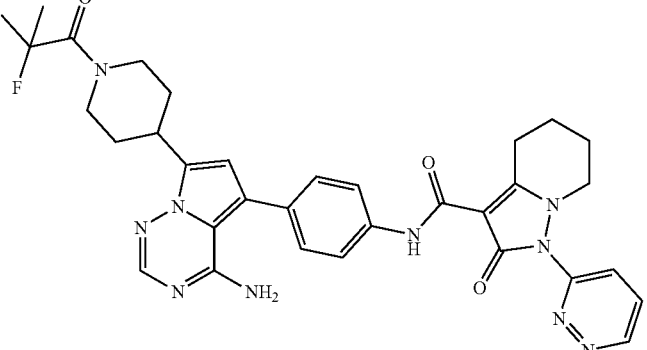 | 639.3 | refer to Example 34 |

Biological Test

The LC/MS/MS system for analysis includes Agilent 1200 series vacuum degassing furnace, binary injection pump, orifice plate automatic sampler, oven column, Agilent G6430 triple quadrupole electrospray ionization (ESI) mass spectrometer. Quantitative analysis is carried out in MRM mode, and the parameters of MRM transformation are shown in Table A:

TABLE A

| | |
|---|---|
| Multi reaction monitoring | 490.2→383.1 |
| Fragmentor | 230 V |
| Capillary | 55 V |
| Dry gas temperature | 350° C. |
| Atomizer | 0.276 MPa |
| Dry gas flow rate | 10 L/min |

Agilent XDB-C18, 2.1×30 mm, 3.5 μM column, injected 5 μL sample. Analysis conditions: the mobile phase was 0.1% formic acid solution (A) and 0.1% formic acid methanol solution (B). The flow rate was 0.4 mL/min. The mobile phase gradient is shown in Table B:

TABLE B

| Time | Gradient of mobile phase B |
|---|---|
| 0.5 min | 5% |
| 1.0 min | 95% |
| 2.2 min | 95% |
| 2.3 min | 5% |
| 5.0 min | Termination |

In addition, Agilent 6330 series LC/MS/MS spectrometer is used for analysis, which is equipped with G1312A binary injection pump, G1367A automatic sampler and G1314C UV detector; LC/MS/MS spectrometer uses ESI radioactive source. Appropriate action modeling and MRM conversion were performed on each analyte using standard solution for optimal analysis. Capcell MP-C18 column was used during analysis, size: 100×4.6 mm I.D., 5 μM (Phenomenex, Torrance, California, USA). The mobile phase was 5 mM ammonium acetate, 0.1% methanol solution (A): 5 mM ammonium acetate, 0.1% methanol acetonitrile solution (B) (70:30, v/v); The flow rate was 0.6 mL/min. Column temperature is kept at room temperature; Inject 20 μL sample.

Embodiment A Kinase Activity Test

The effect of the disclosed compounds as protein kinase inhibitors can be evaluated by the following experiments. The AXL (h) kinase activity of the compounds of the invention is tested by the following methods:

Reagents used in the experiment were AXL (Carna Bioscience, Cat No.: 08-107) and FLPeptide30 (PerkinElmer, Cat No.: 760430). The instruments involved were thermotank (Thermo Scientific), oscillator (QILINBEIER), EZ Reader (PerkinElmer, Cat No.: 122919), Non-contact stage pipetting system (Labcyte Inc., Cat No.: Echo 550), and non-contact nanoliter pipetting system (TECAN, Cat No.: EVO200).

Experimental Method

Compound dilution: 1) Dissolve the compound in DMSO to the appropriate concentration; 2) Using TECAN EVO200 to dilute 10 concentrations in 384 microplates by three times gradient, the highest concentration is 1 mM; Echo550 was used to transfer 20 nL solution from the dilution plate to the test plate.

Experimental Method of Kinase

1) Prepare solution 1, as shown in Table C below:

TABLE C

| Reagent | Solution 1 |
| --- | --- |
| MgCl$_2$ | 10 mM |
| Brij-35 | 0.050% |
| DTT | 2 mM |
| BSA | 0.05% |
| EGTA | 1 mM |
| HEPE (pH 7.5) | 50 mM |
| AXL | 1.333 nM |

2) Add 15 μL solution 1 to each well of the test plate and incubate at room temperature for 30 minutes.

3) Prepare solution 2, as shown in Table D below:

TABLE D

| Reagent | Solution 2 |
| --- | --- |
| MgCl$_2$ | 10 mM |
| Brij-35 | 0.050% |
| DTT | 2 mM |
| BSA | 0.05% |
| EGTA | 1 mM |
| HEPE (pH 7.5) | 50 mM |
| FLPeptide | 6 μM |
| ATP | 400 μM |

4) Add 5 μL solution 2 to start the reaction, and the final volume of each well is 20 μL. The composition of the system is shown in Table E below:

TABLE E

| Reagent | Final concentration |
| --- | --- |
| MgCl$_2$ | 10 mM |
| Brij-35 | 0.050% |
| DTT | 2 mM |
| BSA | 0.05% |
| EGTA | 1 mM |
| HEPE (pH 7.5) | 50 mM |
| FLPeptide | 1.5 μM |
| ATP | 100 μM |
| AXL | 1 nM |

5) Incubated at 25° C. for 90 min, and then added 75 μL stop solution (containing 0.5 M EDTA) to terminate the reaction.

6) The sample of each well was analyzed using EZ reader.

Data Analysis

1) Based on the measured conversion rate (CR), the Remaining Activity (%) of the kinase was calculated according to the following function:

$$\text{Remaining Acticity (\%)} = 100\% \times \frac{CR_{cpd} - CR_{LC}}{CR_{HC} - CR_{LC}}$$

2) XLFit (Equation 201) software was used to fit IC50.

The above methods can be used to obtain the inhibitory IC50 and/or inhibitory constant Ki. IC50 is defined as the concentration of a compound that inhibits 50% kinase activity under experimental conditions.

Using the dilution ratio of ½log to make a curve with 10 concentration points, and estimate the IC50 (for example, make a typical curve with the concentrations of the following compounds: 3 μM, 1 μM, 0.3 μM, 0.1 μM, 0.03 μM, 0.01 μM, 0.003 μM, 0.001 μM, 0.0003 μM, 0 μM), or 10 μM, 3 μM, 1 μM, 0.3 μM, 0.1 μM, 0.03 μM, 0.01 μM, 0.003 μM, 0.001 μM, 0 μM).

These are just two of many detection methods for people skilled in their field, and others are also available.

Embodiment B Cell Activity Test

This experiment was conducted by detecting the inhibitory effect of compounds on the growth of Ba/F3 AXL cell line and Ba/F3 parental cell line. Cells in logarithmic growth stage were harvested and counted by platelet counter. Trypan blue rejection method was used to detect cell viability to ensure that the cell viability was above 90%. Adjust cell concentration; 90 μL cell suspension was added to 96-well plates, respectively; Cells in 96-well plates were cultured overnight at 37° C., 5% CO$_2$ and 95% humidity. A 10-fold drug solution was prepared, with the highest concentration of 10 μM, and a total of 9 concentrations were diluted at 3.16 times the ratio. 10 μL drug solution was added to each well of the 96-well plate inoculated with cells, and three wells were set for each drug concentration; 96-well plates were incubated at 37° C., 5% CO$_2$ and 95% humidity for 72 h, and CTG analysis was performed. Thaw the CTG reagent and balance the cell plates to room temperature for 30 minutes. Add the same volume of CTG solution to each well and vibrate on a fixed-rail shaker for 5 minutes to crack the cells. Place the cell plates at room temperature for 20 minutes to stabilize the cold light signal and read the cold light value. The GraphPad Prism 5.0 software was used to analyze the data, and the nonlinear S-curve regression was used to fit the data to obtain the dose-effect curve, and the IC50 value was calculated accordingly. Cell survival rate (%)=(Lum drug to be tested −Lum culture medium control)/(Lum cell control−Lum culture medium control)×100%.

Table 1 below provides the AXL (h) kinase experimental results of the compound of the present invention. +: >100 nM; ++: 50-100 nM; +++: 5-50 nM; ++++: <5 nM. The experimental results show that compounds of the invention has a very good inhibitory effect on AXL kinase.

TABLE 1

Inhibitory activity of compounds on AXL (h) kinase and Ba/F3 AXL cells

| Test compounds | AXL kinase $IC_{50}$ (nM) | Ba/F3 AXL $IC_{50}$ (nM) | Test compounds | AXL kinase $IC_{50}$ (nM) | Ba/F3 AXL $IC_{50}$ (nM) |
|---|---|---|---|---|---|
| example 2  | +    | ++   | example 3  | +++  | ++++ |
| example 5  | +    | +    | example 6  | NA   | ++++ |
| example 7  | ++++ | NA   | example 8  | +++  | ++++ |
| example 9  | +++  | +++  | example 10 | NA   | ++++ |
| example 11 | NA   | ++++ | example 12 | NA   | +++  |
| example 13 | +++  | +++  | example 14 | ++   | +++  |
| example 15 | +++  | +++  | example 16 | +++  | ++++ |
| example 17 | NA   | +++  | example 18 | +++  | +++  |
| example 19 | +++  | ++++ | example 20 | NA   | +++  |
| example 21 | NA   | ++++ | example 22 | +++  | ++++ |
| example 23 | NA   | ++++ | example 24 | NA   | ++++ |
| example 25 | +++  | ++++ | example 26 | +++  | ++++ |
| example 27 | ++   | +++  | example 28 | NA   | +++  |
| example 29 | +++  | ++++ | example 30 | ++++ | ++++ |
| example 31 | +++  | ++++ | example 32 | ++++ | +++  |
| example 33 | +++  | NA   | example 34 | NA   | +++  |
| example 35 | NA   | ++++ | example 36 | +++  | ++++ |
| example 37 | +++  | ++++ | example 38 | +++  | +++  |
| example 40 | +    | NA   | example 44 | ++   | NA   |
| example 47 | +++  | ++++ | example 49 | +++  | +++  |
| example 52 | +++  | NA   |            |      |      |

Embodiment C: In Vitro Induction of CYP450 in Human Hepatocytes

1) Incubation and Treatment of Human Hepatocytes

Cryopreservation of human primary hepatocytes was resuscitated in medium after take out from liquid nitrogen. The hepatocytes were diluted to a density of $0.7 \times 10^6$ cells/mL in adherent culture medium and placed in a 48-well plate that was coated type I collagen. Plates were incubated at 37° C. and 5% $CO_2$ for 4-6 hours to confirm the formation of monolayer cells attached to the wall. Then the adherent culture medium was changed into hepatocyte culture medium and the culture was continued overnight. On the second day, 10 μM test compounds or positive inducers (CYP1A2 inducer: omeprazole, final concentration was 50 μM; CYP2B6 inducer: phenobarbital, the final concentration was 1000 μM; CYP3A4 inducer: rifampicin, final concentration was 10 μM) were added in medium. The samples of each group were cultured with hepatocytes at 37° C. and 5% $CO_2$ for 2 days, and the culture medium containing drugs was changed every day. There were 3 parallel samples in each group. After 2 days of continuous administration, kinase activity and mRNA expression were detected.

2) Kinase Activity Detection

After the test compounds and positive control inducers were co-incubated with cells, the incubation medium was removed. Then, the probe substrate (CYP1A2 substrate: finacetin, final concentration 100 μM; CYP2B6 substrate: bupropion, final concentration 500 μM; CYP3A4 substrate: midazolam, final concentration 25 μM) solution was added and incubated at 37° C. and 5% $CO_2$ for 30 min. After the samples were extracted and processed, the generation of metabolites and the kinase activities of CYP1A2, 2B6 and 3A4 was quantitatively detected by LC-MS/MS, respectively.

3) mRNA Expression Analysis

After the test compound and positive control inducer were co-incubated with cells, the medium was removed and mercaptoethanol was added for cell lysis. Total RNA in cells was extracted with RNA extraction kit, and then transcribed into cDNA with cDNA reverse transcription kit. The 10 μL cDNA template was taken and analyzed on the fluorescence quantitative PCR instrument to obtain the Ct value.

The gene expression data were corrected by internal reference 18S, and the relative expression differences were determined by the method of ΔΔCt commonly used in fluorescence quantitative PCR.

4) Data Analysis

Induction of Kinase Activity:

The induction of test substance on each subenzyme was determined by detecting the generation rate of metabolites of CYP450 subenzyme substrates. The relative activity of each subenzyme was expressed as a percentage of the relative blank control, and the data were calculated according to the following formula:

Fold of induction=sample subenzyme activity/blank subenzyme activity

Relative positive control activity (PC %)=(Fold of induction of sample group−Fold of induction of blank group)/(Fold of induction of positive control group−Fold of induction of blank group)× 100

Induction of mRNA Expression:

The ΔCt, ΔΔCt and relative expression difference values of the target genes were calculated according to the following formula:

ΔCt=Ct value of target gene−Ct value of internal reference 18S

ΔΔCt=ΔCt of experimental group or positive control group−ΔCt of blank control group Relative expression difference (fold of induction)=$2^{-ΔΔCt}$ Table 2 below shows the results of in vitro induction evaluation experiments of CYP450 in frozen human liver cells for the compounds of the invention.

TABLE 2

Results of compounds of the invention in vitro
induction assay of human hepatocyte CYP450

| Donor | Sample ID | Concentration (μM) | Enzymatic activity CYP3A4 | | Gene expression CYP3A4 | | Comment |
|---|---|---|---|---|---|---|---|
| | | | Fold of induction | % of positive control | Fold of induction | % of positive control | |
| QBU | 0.1% DMSO | — | 1.00 | — | 1.00 | — | |
| | Rifampicin | 10 | 9.54 | 100 | 28.1 | 100 | CYP3A4 inducer |
| | example 3 | 10 | 0.801 | −2.33 | 4.40 | 12.5 | |
| | example 9 | 10 | 0.709 | −3.69 | 7.31 | 6.46 | |
| | example 10 | 10 | 0.779 | −2.81 | 24.7 | 3.61 | |
| | example 16 | 10 | 1.26 | 4.88 | 276 | 87.3 | |
| | example 17 | 10 | 0.97 | −0.455 | 3.81 | 1.73 | |
| | example 19 | 10 | 1.5 | 9.4 | 284 | 89.8 | |
| | example 22 | 10 | 1.02 | 0.277 | 1.31 | 0.192 | |
| | example 25 | 10 | 2.69 | 16.3 | 4.92 | 0.261 | |
| | example 27 | 10 | 1.2 | 1.88 | 2.06 | 0.0702 | |
| | example 29 | 10 | 1.06 | 0.735 | 6.37 | 0.82 | |
| | example 30 | 10 | 0.836 | −8.31 | 1.58 | 1.42 | |
| | example 31 | 10 | 0.913 | −2.00 | 0.944 | −0.276 | |

Embodiment D Inhibition of Human Liver Microsomes CYP450

1) Preparation of Buffer Solution

Weigh 11.4 g of $K_2HPO_4 \cdot 3H_2O$ and dissolve in 950 mL purified water. Adjust pH to 7.4 with hydrochloric acid and add water to 1000 mL. Filter with 0.45 μm membrane, and store the solution in the refrigerator at 4° C.

2) Preparation of Test Compounds Working Solution

The test compounds were prepared into a 10 mM reserve solution with DMSO, and then diluted to a 2 mM working solution with DMSO.

3) Incubation Process 238.5 μL of liver microsomal working fluid was added to 1.1 mL of high tube.

Add 1.5 μL compounds working solution/positive drug working solution/DMSO, mix with manual multichannel pipette (n=2).

Pre-incubate in 37° C. water bath for 5 min. Add 60 μL of NADPH solution, mix with manual multichannel pipette.

Incubate in 37° C. water bath for 10 min. Quickly inactivated with 300 μL precipitator, vortex mixing for 1 min.

All samples were centrifuged at 4° C. and 4,000 rpm for 15 min, and the supernatant was taken for LC-MS/MS analysis the change of specific metabolites of the isoenzyme probe substrate.

3) Sample Analysis

Samples were performed by liquid chromatography (Atlantis T3 5 μM (2.1*50 mm); Mobile phase: phase A: 0.1% formic acid aqueous solution; Phase B: 0.1% formate acetonitrile solution; Run time: 5 min) and mass spectrometry (ESI, positive) were performed.

4) Data Analysis

The relative amount (Ci) of probe substrate metabolites is obtained by the ratio of the peak area of substrate metabolites to the peak area of internal standard. The relative activity $E_{rel}$ of each isoenzyme can be calculated by the following formula:

$$E_{rel} (\%) = Ci_{(n)}/Ci_{(0)} \times 100\%$$

$Ci_{(n)}$ is the relative amount of substrate metabolites obtained after adding positive inhibitors or tested compounds to the incubation solution; $Ci_{(0)}$ is the relative amount of substrate metabolites obtained without the addition of positive inhibitors or tested compounds. The inhibition rate of CYP isoenzyme by positive inhibitors or tested compounds was calculated as follows:

$$\text{Inhibition} (\%) = 1 - E_{rel} (\%),$$

Positive control, 1A2: β-Naphthoflavone; 2C9: Sulfaphenazole; 2C19: Tranylcypromine; 2D6: Quinidine; 3A4/5: Ketoconazole.

Table 3 below shows the experimental results of evaluating the inhibition of compounds in the present invention on human liver microsomes CYP450.

TABLE 3

Experimental results of the inhibition of compounds in
the present invention on human liver microsomes CYP450

| Compounds | Concentration (μM) | Inhibitory rate (%) | | | | |
|---|---|---|---|---|---|---|
| | | 1A2 | 2C9 | 2C19 | 2D6 | 3A4/5 |
| Positive control | — | 96.2 | 93.7 | 91.2 | 98.8 | 96.2 |
| example 3 | 10 | 21.9 | 65.4 | 41.6 | 5.2 | No inhibition |
| example 7 | 10 | 19.2 | 66.8 | 48.7 | 14.9 | No inhibition |
| example 8 | 10 | 11.6 | 48.2 | 30.6 | No inhibition | 1.05 |
| example 9 | 10 | 11.4 | 47.8 | 40.1 | 5.8 | 16.1 |
| example 10 | 10 | 0.7 | 66.3 | 33.2 | 1.4 | No inhibition |
| example 11 | 10 | 13.9 | 38.3 | 24.7 | No inhibition | No inhibition |

TABLE 3-continued

Experimental results of the inhibition of compounds in the present invention on human liver microsomes CYP450

| Compounds | Concentration (μM) | Inhibitory rate (%) | | | | |
|---|---|---|---|---|---|---|
| | | 1A2 | 2C9 | 2C19 | 2D6 | 3A4/5 |
| example 16 | 10 | 33.6 | 62.4 | 42.7 | 25.8 | No inhibition |
| example 17 | 10 | 7.2 | 58.3 | 42.2 | 1.7 | No inhibition |
| example 18 | 10 | 5.63 | 73.86 | 70.49 | 6.6 | −5.04 |
| example 20 | 10 | 22.0 | 59.0 | 54.2 | 0.0 | No inhibition |
| example 21 | 10 | No inhibition | 56.7 | 33.4 | No inhibition | No inhibition |
| example 22 | 10 | 7.9 | 63.8 | 39.8 | 1.7 | No inhibition |
| example 25 | 10 | 3.0 | 74.2 | 48.7 | 3.8 | No inhibition |
| example 26 | 10 | 9.5 | 50.1 | 33.4 | 8.1 | No inhibition |
| example 27 | 10 | 15.0 | 21.3 | 15.2 | 8.0 | 11.0 |
| example 29 | 10 | 1.2 | 42.7 | 28.6 | 10.3 | 5.8 |
| example 30 | 10 | 4.7 | 53.8 | 41.2 | 0.4 | No inhibition |
| example 31 | 10 | 19.0 | 59.3 | 32.2 | 6.2 | No inhibition |
| example 36 | 10 | 35.6 | 88.8 | 74.2 | 6.7 | No inhibition |

The test shows that compounds of the invention have good stability in the system of liver microsomes. Finally, it should be noted that there are other ways to implement the invention. Accordingly, embodiments of the invention will be illustrated as examples, but are not limited to what the invention describes and may be modifications made within the scope of the invention or equivalent additions to the claims. All publications or patents referenced by the invention will be used as references for the invention.

What is claimed is:

1. A compound that has the structure of Formula (II) or (IIa):

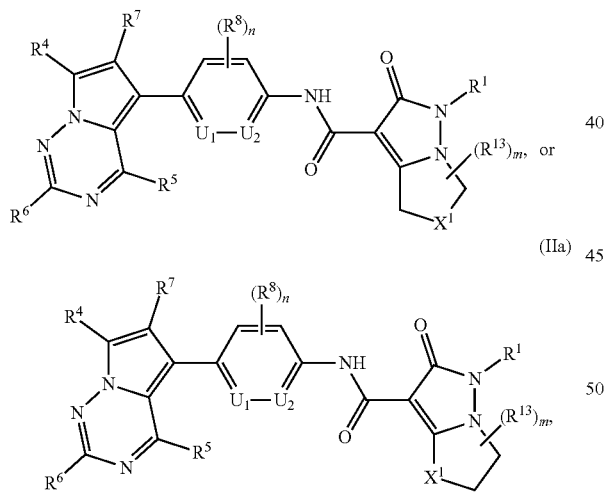

or its stereoisomer, tautomer, nitrogen oxide, solvate, or pharmaceutically acceptable salt;
wherein:
$U_1$ is —CH—, and $U_2$ is —N—, or —CH—;
$R^5$ is —NH$_2$;
each of $R^6$ and $R^7$ is independently H, or D;
$R^8$ is F, Cl, or Br;
$R^{13}$ is —OH;
n is 0 or 1;
$X^1$ is —(CH$_2$)$_{t1}$— or —X$^2$—(CH$_2$)$_{t1}$—, wherein t1 in —(CH$_2$)$_{t1}$— is 1 or 2, and t1 in —X$^2$—(CH$_2$)$_{t1}$— is 1;
$X^2$ is O, or S;
m is 0, or 1;
$R^1$ is phenyl, pyridyl, pyridazinyl, pyrazinyl, pyrimidinyl, or pyrazolyl, wherein each of phenyl, pyridyl, pyridazinyl, pyrazinyl, pyrimidinyl, and pyrazolyl is optionally substituted with 0, or 1 substituents selected from $R^{11}$;
$R^{11}$ is F, C$_{1-6}$ alkyl, or C$_{1-6}$ alkoxy;
$R^4$ is

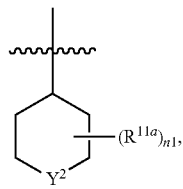

wherein, $Y^2$ is —CH$_2$—, or —N(R$^{11b}$)—;
$R^{11a}$ is D, or —OH;
$R^{11b}$ is H, —C(=O)C$_{1-4}$ alkyl, —C(=O)C$_{1-4}$ haloalkyl, —C(=O)C$_{1-4}$ hydroxyalkyl, —C(=O)C$_{3-6}$ cycloalkyl, or —C(=O)O—C$_{1-4}$ alkyl; and
n1 is 0, 1, or 2.

2. The compound of claim 1, wherein:
$R^4$ is

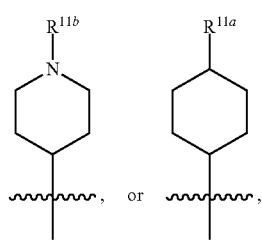

wherein, $R^{11b}$ is H, Boc-, CH$_3$CH$_2$CH$_2$C(=O)—, CH$_3$(CH$_3$)CHC(=O)—, t-Bu-C(=O)—, n-Bu-C(=O)—, i-Bu-C(=O)—, s-Bu-C(=O)—, CH$_3$(CH$_3$) CFC(=O)—, CH$_3$(CH$_3$)C(OH)C(=O)—, cyclopropyl-C(=O)—, cyclobutyl-C(=O)—, or cyclopentyl-C(=O)—.

3. The compound of claim 1 of one of the following structures:
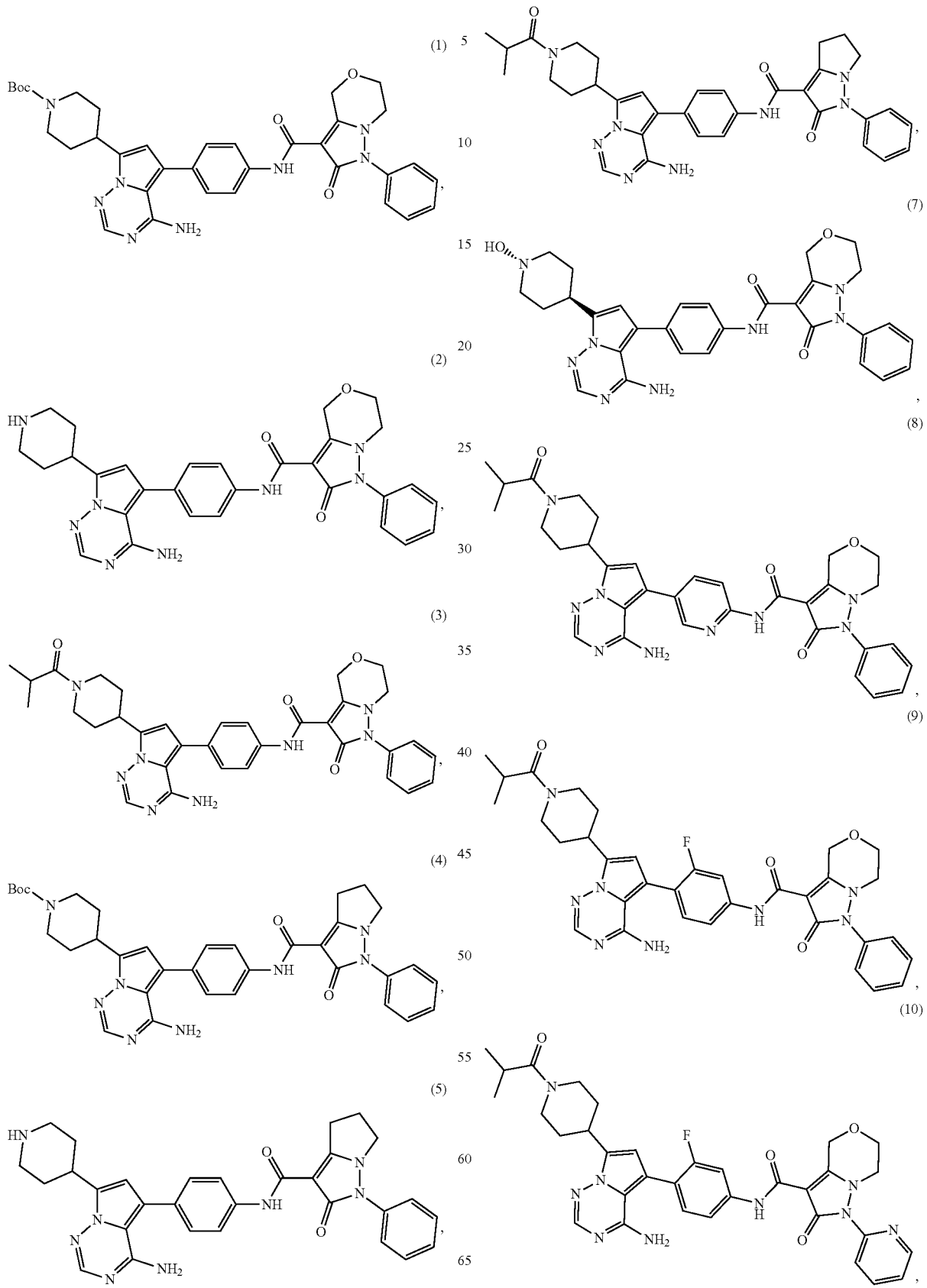

(11)
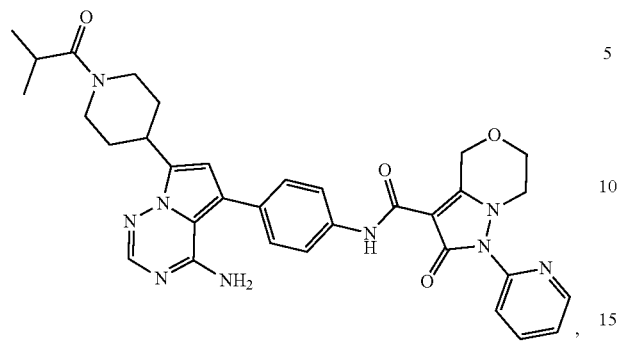
(15)
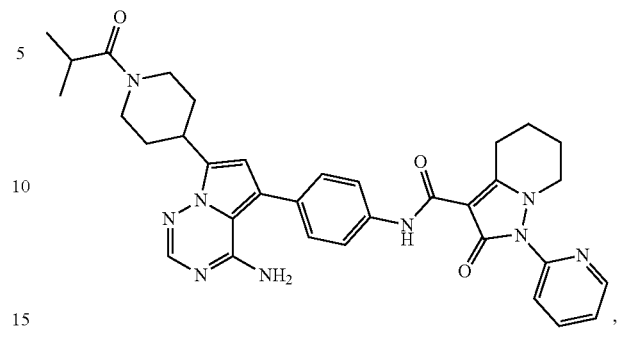
(12)
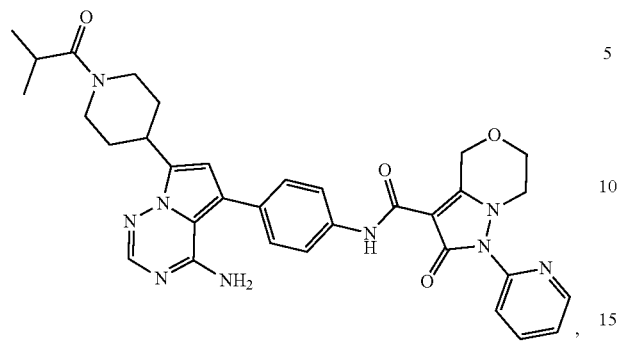
(16)
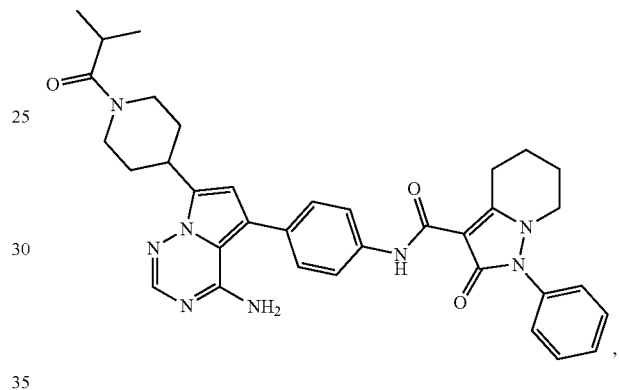
(13)
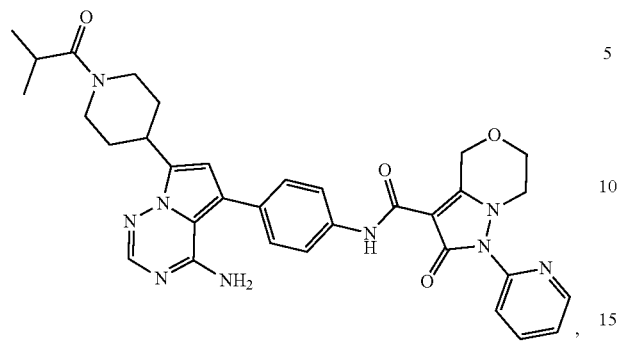
(36)
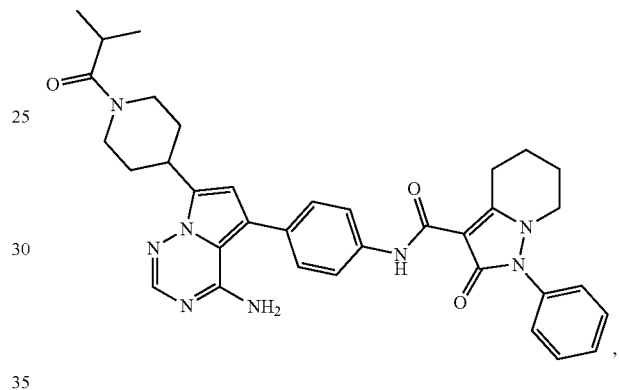
(14)
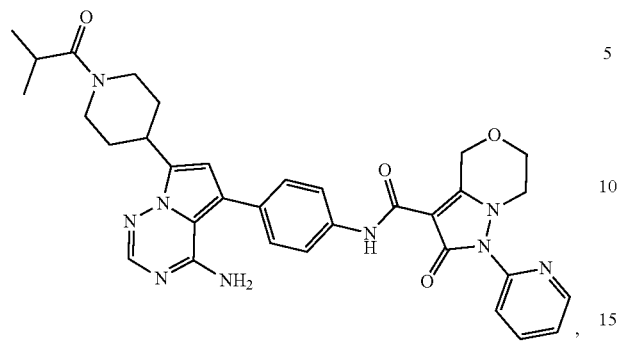
(37)
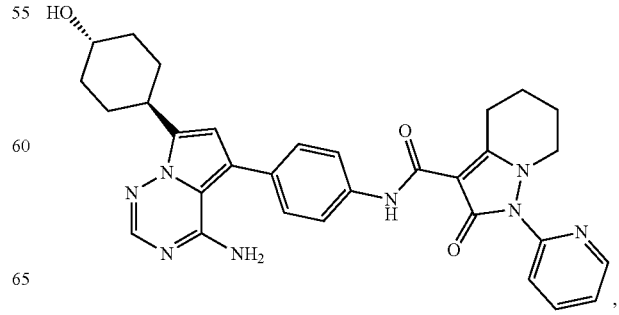

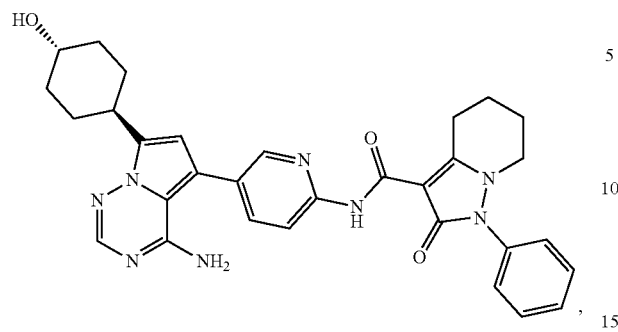
(38)
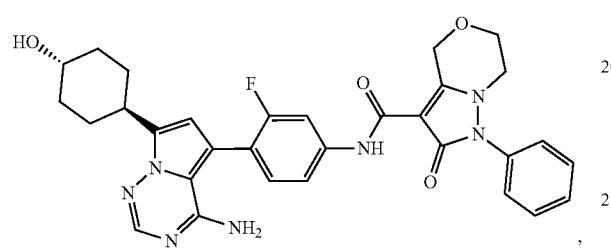
(39)
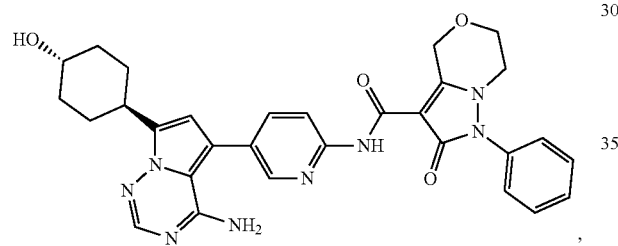
(40)
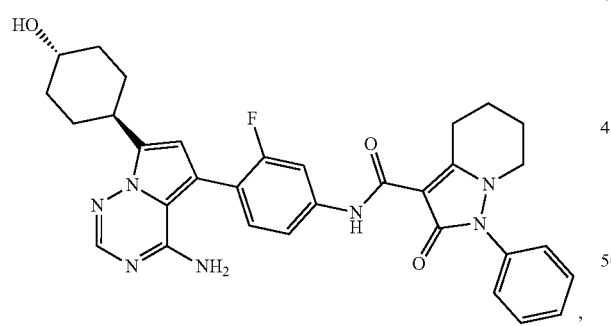
(41)
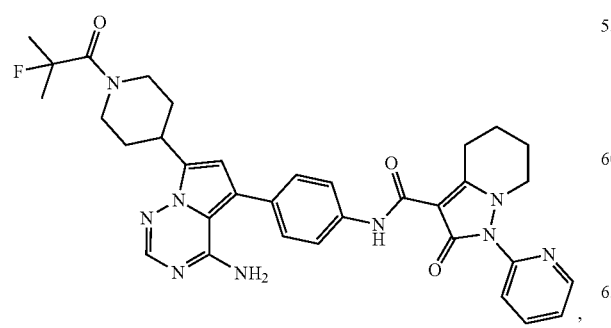
(47)
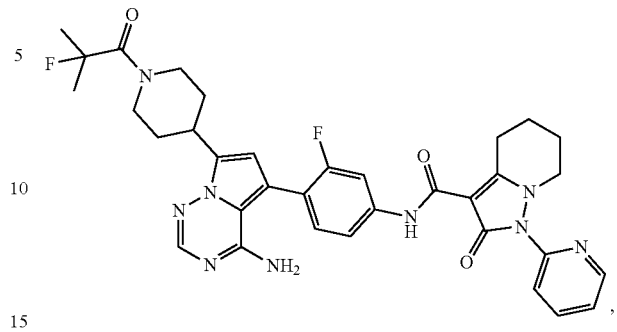
(48)
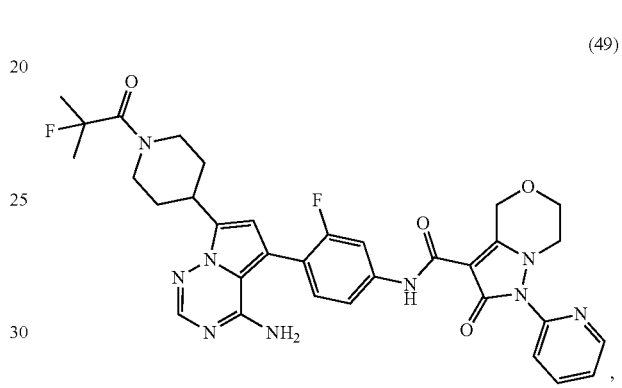
(49)
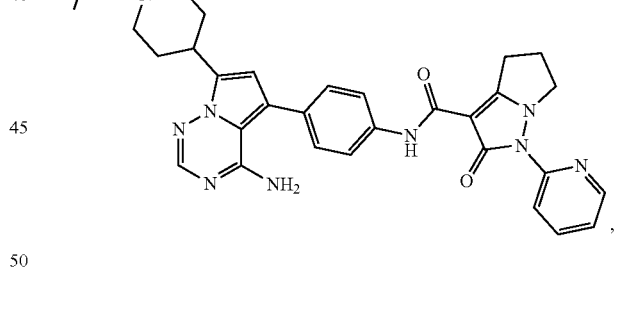
(50)
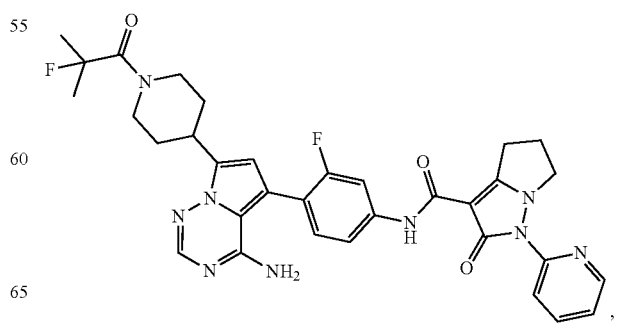
(51)

(52)
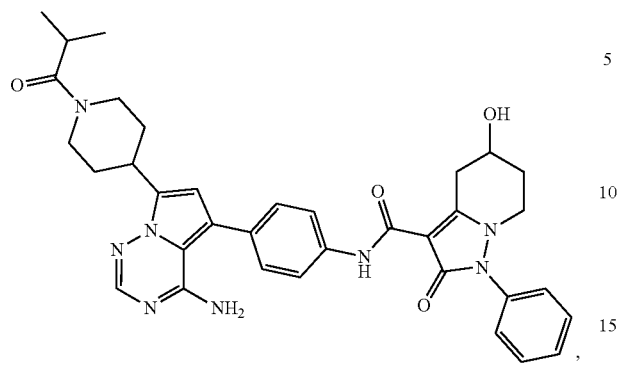
(53)
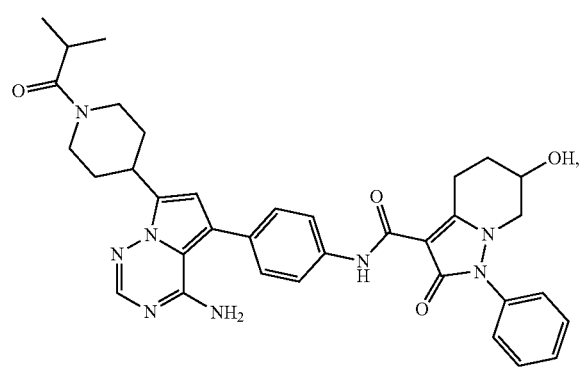
(54)
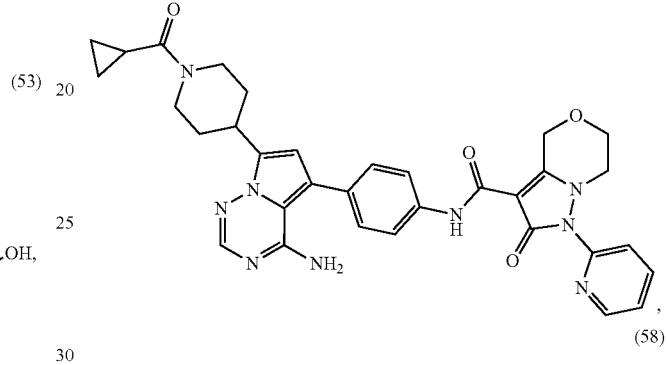
(55)
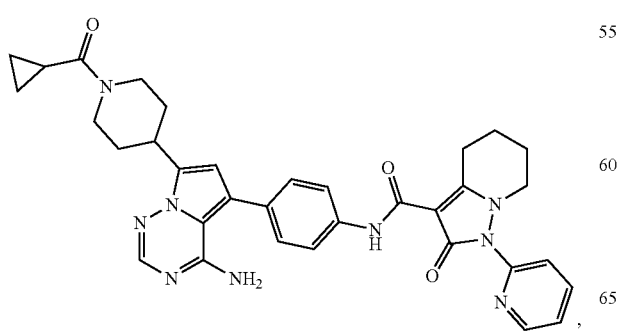
(56)
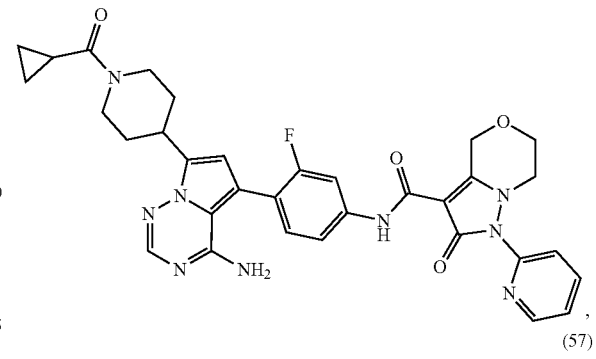
(57)
(58)
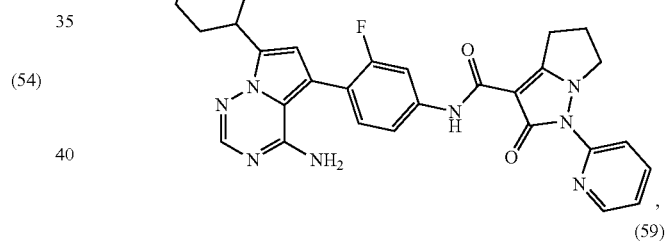
(59)
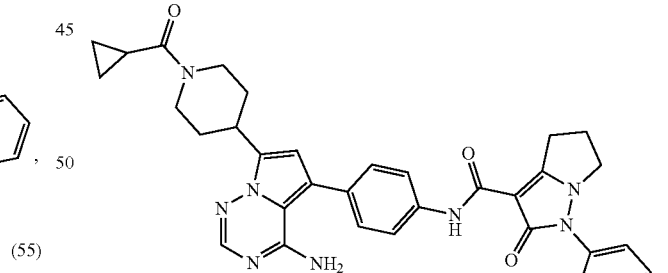
(60)
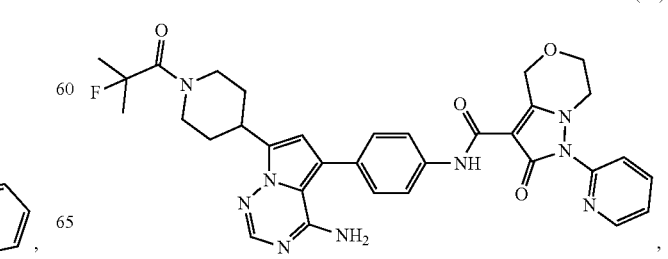

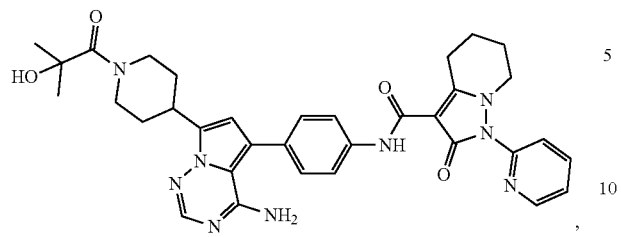
(61)
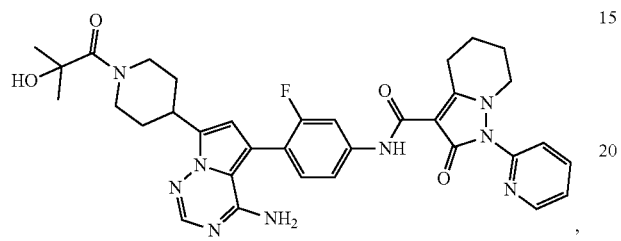
(62)
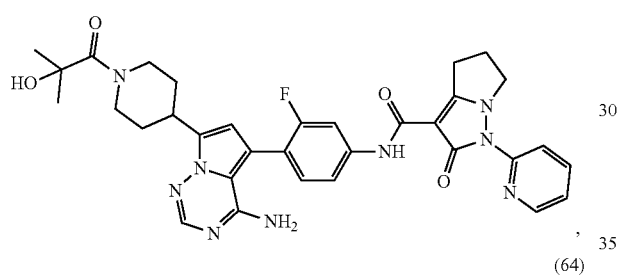
(63)
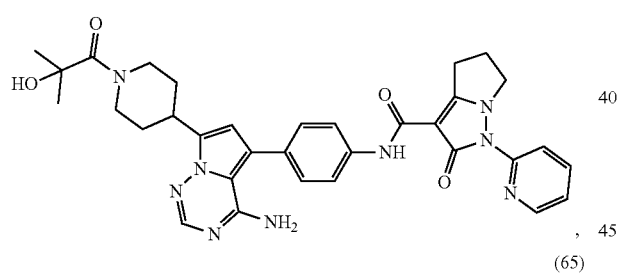
(64)
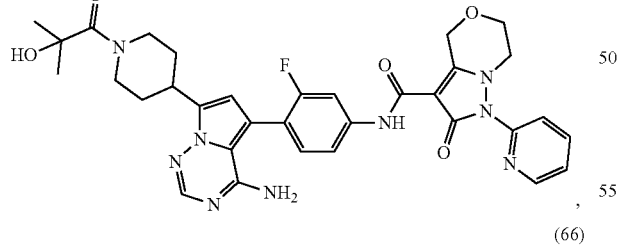
(65)
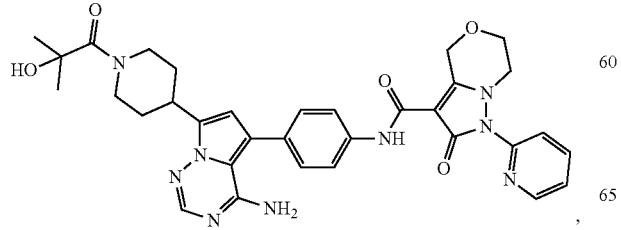
(66)
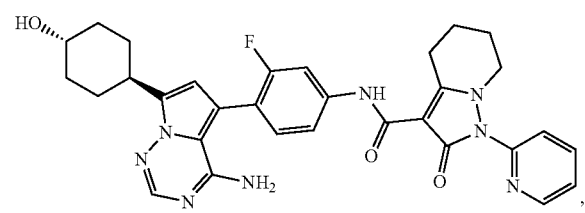
(67)
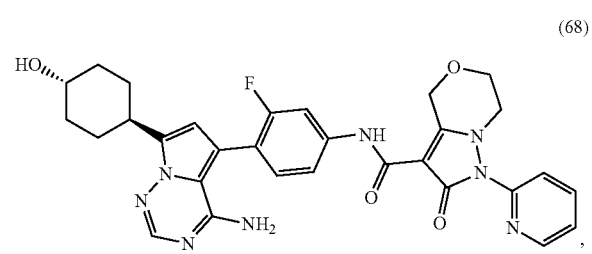
(68)
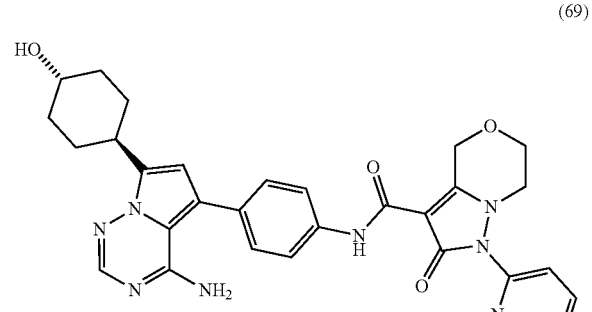
(69)
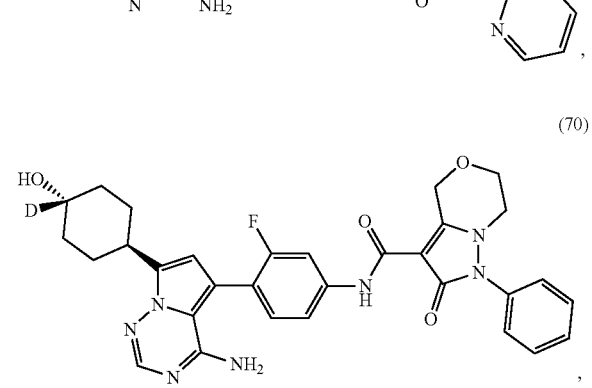
(70)
(71)
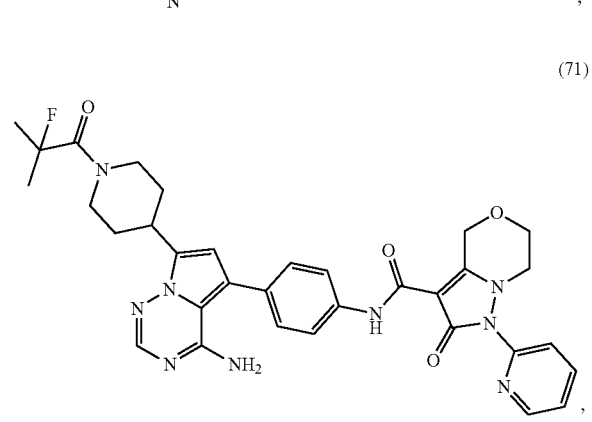

(72)
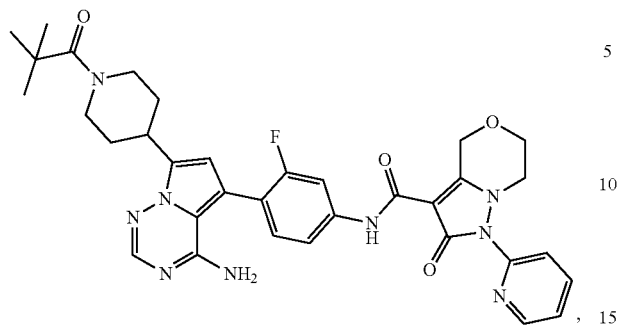
(76)
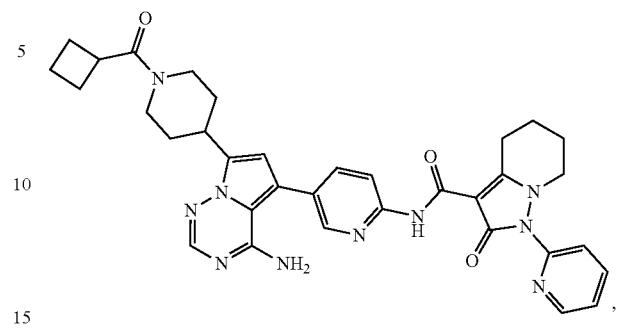
(73)
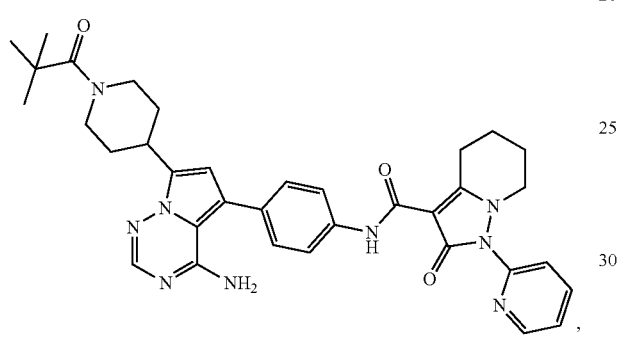
(77)
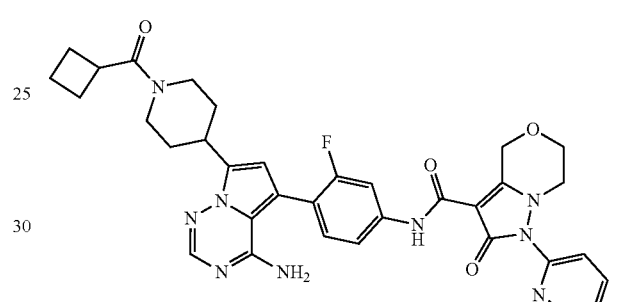
(74)
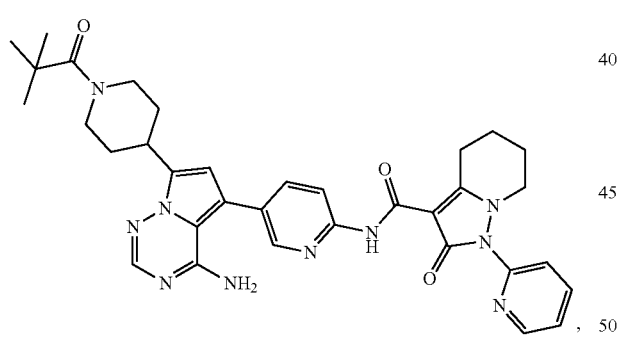
(78)
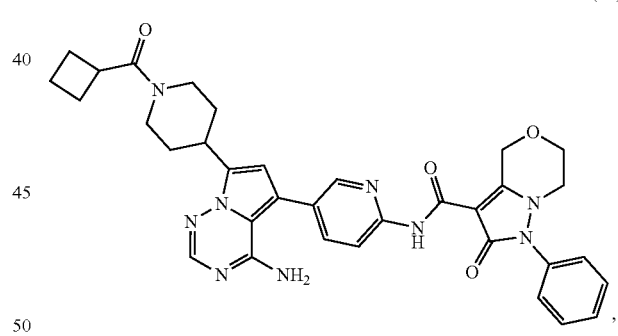
(75)
(79)
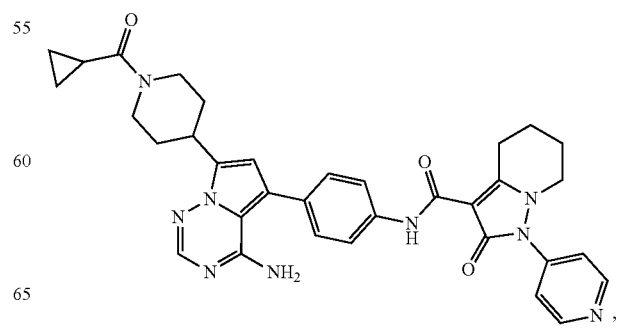

-continued

(80)
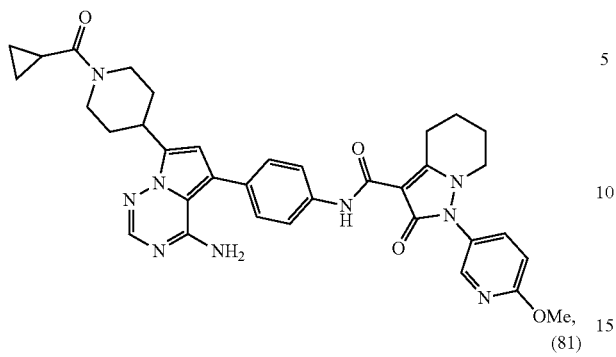

(81)
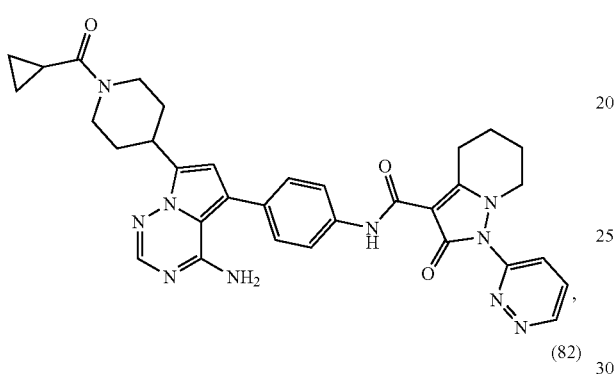

(82)
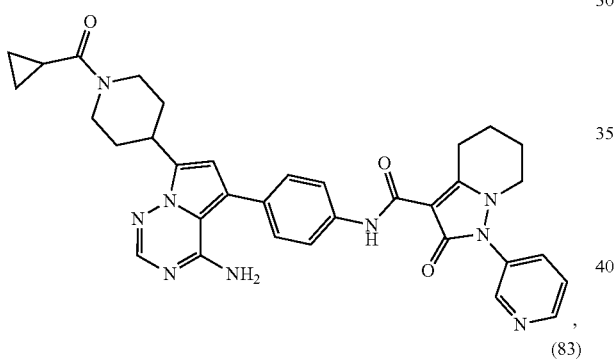

(83)
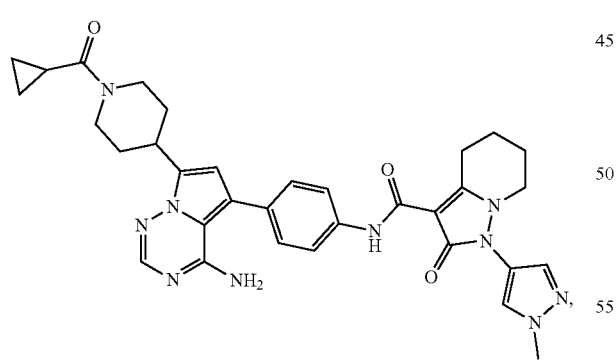

-continued

(84)
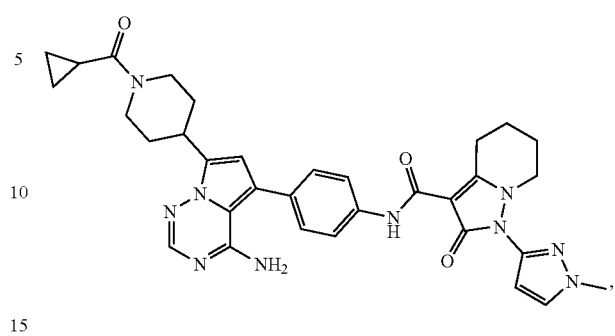

(85)

(87)

or its stereoisomer, tautomer, nitrogen oxide, solvate, or pharmaceutically acceptable salt.

4. A pharmaceutical composition comprising a compound of claim 1 or a stereoisomer, tautomer, nitrogen oxide, solvate, or pharmaceutically acceptable salt thereof and a pharmaceutically acceptable excipient, diluent, carrier, or a combination thereof.

* * * * *